US007990663B2

(12) United States Patent
Ziegler et al.

(10) Patent No.: US 7,990,663 B2
(45) Date of Patent: Aug. 2, 2011

(54) DETECTING AND SENSING ACTUATION IN A CIRCUIT INTERRUPTING DEVICE

(75) Inventors: William Ziegler, East Northport, NY (US); James Richter, Bethpage, NY (US); Benjamin Moadel, New York, NY (US); Michael Kamor, North Massapequa, NY (US); James Porter, Farmingdale, NY (US); David Chan, Bellrose, NY (US); Mario Angelides, Oceanside, NY (US)

(73) Assignee: Leviton Manufucturing Co., Inc., Melville, NY (US)

( * ) Notice: Subject to any disclaimer, the term of this patent is extended or adjusted under 35 U.S.C. 154(b) by 123 days.

(21) Appl. No.: 12/498,073

(22) Filed: Jul. 6, 2009
(Under 37 CFR 1.47)

(65) Prior Publication Data

US 2010/0259347 A1 Oct. 14, 2010

Related U.S. Application Data

(63) Continuation of application No. 12/398,550, filed on Mar. 5, 2009.

(51) Int. Cl.
*H02H 3/00* (2006.01)

(52) U.S. Cl. ........................................................ 361/42

(58) Field of Classification Search ..................... 361/42
See application file for complete search history.

(56) References Cited

U.S. PATENT DOCUMENTS 4,356,526 A * 10/1982 Russell .......................... 361/59
4,455,654 A 6/1984 Bhaskar et al.
4,595,894 A 6/1986 Doyle et al.
5,136,458 A 8/1992 Durivage, III
5,270,900 A 12/1993 Alden et al.
5,309,310 A 5/1994 Baer et al.
5,386,183 A 1/1995 Cronvich et al.
5,475,609 A 12/1995 Apothaker
5,541,800 A * 7/1996 Misencik ........................ 361/45
5,600,524 A 2/1997 Neiger et al.
5,715,125 A 2/1998 Neiger et al.
5,956,218 A 9/1999 Berthold
5,978,191 A 11/1999 Bonniau et al.
6,040,967 A 3/2000 DiSalvo
6,052,265 A 4/2000 Zaretsky et al.
6,052,266 A 4/2000 Aromin (Continued)

FOREIGN PATENT DOCUMENTS

WO WO 2000/014842 3/2000

*Primary Examiner* — Stephen W Jackson

(74) *Attorney, Agent, or Firm* — Carter, Deluca, Farrell & Schmidt, LLP

(57) ABSTRACT

A circuit interrupting device is disclosed that includes a first conductor, a second conductor, a switch between the first conductor and the second conductor wherein the switch is disposed to selectively connect and disconnect the first conductor and the second conductor, a circuit interrupter disposed to generate a circuit interrupting actuation signal, a solenoid coil and plunger assembly disposed to open the switch wherein the solenoid coil and plunger assembly is actuatable by the circuit interrupting actuation signal wherein movement of the plunger causes the switch to open, and a test assembly that is configured to enable a test of the circuit interrupter initiating at least a partial movement of the plunger in a test direction, from a pre-test configuration to a post-test configuration, without opening the switch.

78 Claims, 33 Drawing Sheets

U.S. PATENT DOCUMENTS

| | | | | |
|---|---|---|---|---|
| 6,111,733 | A | 8/2000 | Neiger et al. | |
| 6,169,405 | B1 | 1/2001 | Baltzer et al. | |
| 6,191,589 | B1 | 2/2001 | Clunn | |
| 6,253,121 | B1 | 6/2001 | Cline et al. | |
| 6,282,070 | B1 | 8/2001 | Ziegler et al. | |
| 6,426,632 | B1 | 7/2002 | Clunn | |
| 6,426,634 | B1 | 7/2002 | Clunn et al. | |
| 6,437,700 | B1 | 8/2002 | Herzfeld et al. | |
| 6,577,133 | B1 * | 6/2003 | Barron | 324/415 |
| 6,807,035 | B1 | 10/2004 | Baldwin et al. | |
| 6,807,036 | B2 | 10/2004 | Baldwin | |
| 6,980,005 | B2 | 12/2005 | Finlay, Sr. et al. | |
| 7,149,065 | B2 | 12/2006 | Baldwin et al. | |
| 7,177,129 | B2 | 2/2007 | Arenz et al. | |
| 7,268,559 | B1 | 9/2007 | Chen et al. | |
| 2002/0078511 | A1 | 6/2002 | Blair et al. | |
| 2004/0223272 | A1 | 11/2004 | Germain et al. | |
| 2004/0252425 | A1 | 12/2004 | Baldwin et al. | |
| 2005/0036250 | A1 | 2/2005 | Asano | |
| 2005/0063109 | A1 | 3/2005 | Baldwin et al. | |
| 2006/0125622 | A1 | 6/2006 | Baldwin et al. | |
| 2007/0091520 | A1 | 4/2007 | Angelides et al. | |
| 2007/0165342 | A1 | 7/2007 | Elms | |
| 2007/0279814 | A1 | 12/2007 | Bonilla et al. | |
| 2008/0002313 | A1 | 1/2008 | DiSalvo et al. | |
| 2009/0040667 | A1 | 2/2009 | DiSalvo et al. | |
| 2009/0086389 | A1 | 4/2009 | Huang et al. | |
| 2009/0086390 | A1 | 4/2009 | Huang | |
| 2009/0161271 | A1 | 6/2009 | Huang et al. | |
| 2010/0013491 | A1 | 1/2010 | Hooper et al. | |

* cited by examiner $$\Delta X_1 = \Delta X_0 - G_1$$

DETECTING AND SENSING ACTUATION IN A CIRCUIT INTERRUPTING DEVICE

CROSS-REFERENCE TO RELATED APPLICATION

This application is a continuation-in-part of U.S. patent application Ser. No. 12/398,550 by Kamor et al. filed on Mar. 5, 2009 entitled "DETECTING AND SENSING ACTUATION IN A CIRCUIT INTERRUPTING DEVICE", the entire contents of which is hereby incorporated by reference herein.

BACKGROUND

1. Field

The present disclosure relates to circuit interrupting devices. In particular, the present disclosure is directed to re-settable circuit interrupting devices and systems that comprises ground fault circuit interrupting devices (GFCI devices), arc fault circuit interrupting devices (AFCI devices), immersion detection circuit interrupting devices (IDCI devices), appliance leakage circuit interrupting devices (ALCI devices), equipment leakage circuit interrupting devices (ELCI devices), circuit breakers, contactors, latching relays and solenoid mechanisms. More particularly, the present disclosure is directed to circuit interrupting devices that include a circuit interrupter that can break electrically conductive paths between a line side and a load side of the devices.

2. Description of the Related Art

Many electrical wiring devices have a line side, which is connectable to an electrical power supply, and a load side, which is connectable to one or more loads and at least one conductive path between the line and load sides. Electrical connections to wires supplying electrical power or wires conducting electricity to the one or more loads are at line side and load side connections. The electrical wiring device industry has witnessed an increasing call for circuit breaking devices or systems which are designed to interrupt power to various loads, such as household appliances, consumer electrical products and branch circuits. In particular, electrical codes require electrical circuits in home bathrooms and kitchens to be equipped with circuit interrupting devices, such as ground fault circuit interrupting devices (GFCI), for example.

In particular, GFCI devices protect electrical circuits from ground faults which may pose shock hazards. To prevent continued operation of the particular electrical device under such conditions, a GFCI device monitors the difference in current flowing into and out of the electrical device. Load-side terminals provides electricity to the electrical device.

A differential transformer measures the difference in the amount of current flow through the wires (i.e.—hot and neutral) disposed on the primary side (or core in the case of a toroid differential transformer) via a current signal analyzer, when the difference in current exceeds a predetermined level, e.g., 5 milliamps, indicating that a ground fault may be occurring, the GFCI device interrupts or terminates the current flow within a particular time period, e.g., 25 milliseconds or greater. The current may be interrupted via a solenoid coil that mechanically opens switch contacts to shut down the flow of electricity. A GFCI device includes a reset button that allows a user to reset or close the switch contacts to resume current flow to the electrical device. A GFCI device may also include a user-activated test button that allows the user to activate or trip the solenoid to open the switch contacts to verify proper operation of the GFCI device.

Presently available GFCI devices, such as the device described in U.S. Pat. No. 4,595,894 (the '894 patent) which is incorporated herein in its entirety by reference, use an electrically activated trip mechanism to mechanically break an electrical connection between the line side and the load side. Such devices are resettable after they are tripped by, for example, the detection of a ground fault. In the device discussed in the '894 patent, the trip mechanism used to cause the mechanical breaking of the circuit (i.e., the conductive path between the line and load sides) includes a solenoid (or trip coil). A test button is used to test the trip mechanism and circuitry used to sense faults, and a reset button is used to reset the electrical connection between line and load sides.

In addition, intelligent ground fault circuit interrupting (IGFCI) devices are known in the art that can automatically test internal circuitry on a periodic basis. Such GFCI devices can perform self-testing on a monthly, weekly, daily or even hourly basis. In particular, all key components can be tested except for the relay contacts. This is because tripping the contacts for testing has the undesirable result of removing power to the user's circuit. However, once a month, for example, such GFCI devices can generate a visual and/or audible signal or alarm reminding the user to manually test the GFCI device. The user, in response to the signal, initiates a test by pushing a test button, thereby testing the operation of the contacts in addition to the rest of the GFCI circuitry. Following a successful test, the user can reset the GFCI device by pushing a reset button.

Examples of such intelligent ground fault circuit interrupter devices can be found in U.S. Pat. Nos. 5,600,524, 5,715,125, and 6,111,733 each by Nieger et al. and each entitled "INTELLIGENT GROUND FAULT CIRCUIT INTERRUPTER," and each of which is incorporated herein by reference in its entirety. Additionally, another example of an intelligent ground fault current interrupter device can be found in U.S. Pat. No. 6,052,265 by Zaretsky et al., entitled "INTELLIGENT GROUND FAULT CIRCUIT INTERRUPTER EMPLOYING MISWIRING DETECTION AND USER TESTING," which is incorporated herein by reference in its entirety.

SUMMARY

The present disclosure is directed to detecting and sensing solenoid plunger movement in a current interrupting device. In particular, the present disclosure relates to a circuit interrupting device that includes a first conductor, a second conductor, a switch between the first conductor and the second conductor wherein the switch is disposed to selectively connect and disconnect the first conductor and the second conductor, a circuit interrupter disposed to generate a circuit interrupting actuation signal, a solenoid coil and plunger assembly disposed to open the switch wherein the solenoid coil and plunger assembly is actuatable by the circuit interrupting actuation signal wherein movement of the plunger causes the switch to open, and a test assembly that is configured to enable a test of the circuit interrupter initiating at least a partial movement of the plunger in a test direction, from a pre-test configuration to a post-test configuration, without opening the switch.

The present disclosure relates also to a method of testing a circuit interrupting device that includes the steps of: generating an actuation signal; causing a plunger to move in response to the actuation signal, without causing a switch, that when in the closed position enables flow of electrical current through said circuit interrupting device, to open; measuring the movement of the plunger; and determining whether the movement reflects at least a partial movement of the plunger in a test direction, from a pre-test configuration to a post-test configuration, without opening the switch.

BRIEF DESCRIPTION OF THE DRAWINGS

Various embodiments of the present disclosure are described herein with reference to the drawings wherein.

DETAILED DESCRIPTION

The present disclosure relates to a current interrupting device configured to perform an automatic self-test sequence on a periodic basis (e.g.,—every few cycles of alternating current (AC), hourly, daily, weekly, monthly, or other suitable time period) without the need for user intervention and, in addition, wherein the current interrupting device includes members configured to enable the self-test sequence or procedure to test the operability and functionality of the device's components up to and including the movement of the solenoid plunger.

The description herein is described with reference to a ground fault circuit interrupting (GFCI) device for exemplary purposes. However, aspects of the present disclosure are applicable to other types of circuit interrupting devices, such as arc fault circuit interrupting devices (AFCI devices), immersion detection circuit interrupting devices (IDCI devices), appliance leakage circuit interrupting devices (ALCI devices), equipment leakage circuit interrupting devices (ELCI devices), circuit breakers, contactors, latching relays and solenoid mechanisms.

As defined herein, the terms forward, front, etc. refers to the direction in which the standard plunger moves in order to trip the GFCI. Terms such as front, forward, rear, back, backward, top, bottom, side, lateral, transverse, upper, lower and similar terms are used solely for convenience of description and the embodiments of the present disclosure are not limited thereto.

As defined herein, a test assembly includes features added herein to a circuit interrupting device to effect the movement of the plunger and detect the movement thereof or to effect actuation of the solenoid coil and to detect actuation thereof (e.g., via a non-contact switch such as a reed switch or a Hall-effect sensor). Such features may include, but are not limited to, electrical or optical circuitry, sensors (including mechanical, electrical, optical or acoustical), magnets, or stationary or movable support members such as support surfaces or partitions, or the like, that facilitate and/or enable performance of an automatic self-test sequence on a periodic basis of a circuit interrupting device without the need for user intervention.

Figure 1:
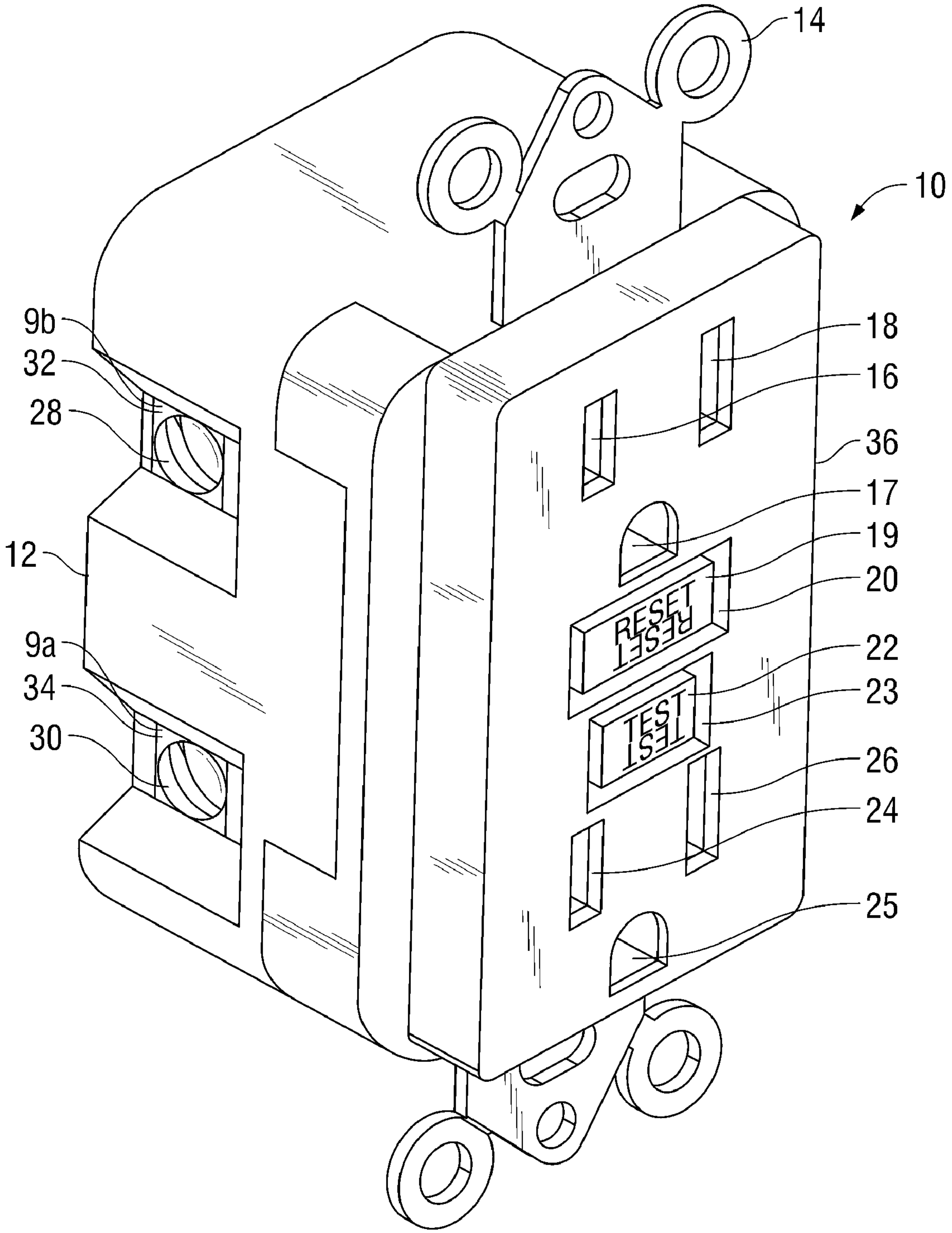
FIG. 1 is a perspective view of one embodiment of a circuit interrupting device according to the present disclosure.

Turning now to FIG. 1, an exemplary GFCI device 10, which may be configured to perform an automatic self-test sequence on a periodic basis as described above without the need for user intervention. The self-test sequence tests the operability and functionality of the GFCI components up to and including the movement of the solenoid according to the present disclosure. GFCI device 10 has a housing 12 to which a face or cover portion 36 is removably secured. The face portion 36 has entry ports or openings 16, 18, 24 and 26 aligned with contacts for receiving normal or polarized prongs of a male plug of the type normally found at the end of a household device electrical cord (not shown), as well as ground-prong-receiving openings 17 and 25 to accommodate three-wire plugs. The GFCI device 10 also includes a mounting strap 14 used to fasten the device to a junction box.

A description of such a circuit interrupting device can be found in U.S. Patent Application Publication US 2004/0223272 A1, by Germain et al., entitled "CIRCUIT INTERRUPTING DEVICE AND SYSTEM UTILIZING BRIDGE CONTACT MECHANISM AND RESET LOCKOUT," the entire contents of which are incorporated herein by reference.

A test button 22 extends through opening 23 in the face portion 36 of the housing 12. The test button 22 is used when it is desired to manually trip the device 10. The circuit interrupter, to be described in more detail below, breaks electrical continuity in one or more conductive paths between the line and load side of the device. The one or more conductive paths form a power circuit in the GFCI 10. A reset button 20 forming a part of the reset portion extends through opening 19 in the face portion 36 of the housing 12. The reset button 20 is used to activate a reset operation, which reestablishes electrical continuity through the conductive paths.

Still referring to FIG. 1, electrical connections to existing household electrical Wiring are made via binding screws 28 and 30 where, for example, screw 30 is an input (or line) phase connection, and screw 28 is an output (or load) phase connection. Screws 28 and 30 are fastened (via a threaded arrangement) to terminals 32 and 34 respectively. However, the GFCI device 10 can be designed so that screw 30 can be an output phase connection and screw 28 an input phase or line connection. Terminals 32 and 34 are one half of terminal pairs. Thus, two additional binding screws and terminals (not shown) are located on the opposite side of the device 10. These additional binding screws provide line and load neutral connections, respectively. It should also be noted that the binding screws and terminals are exemplary of the types of wiring terminals that can be used to provide the electrical connections. Examples of other types of wiring terminals include set screws, pressure clamps, pressure plates, push-in type connections, pigtails and quick-connect tabs. The face terminals are implemented as receptacles configured to mate with male plugs. A detailed depiction of the face terminals is shown in FIG. 2.

For the purposes of describing embodiments of the circuit interrupter according to the present disclosure, the terminal 34 (and its corresponding terminal on the opposite side of the device 10 that is not shown) form a first conductor or line conductor 9*a* while the terminal 32 (and its corresponding terminal on the opposite side of the device 10 that is not shown) form a second conductor or load conductor 9*b*.

Figure 2:
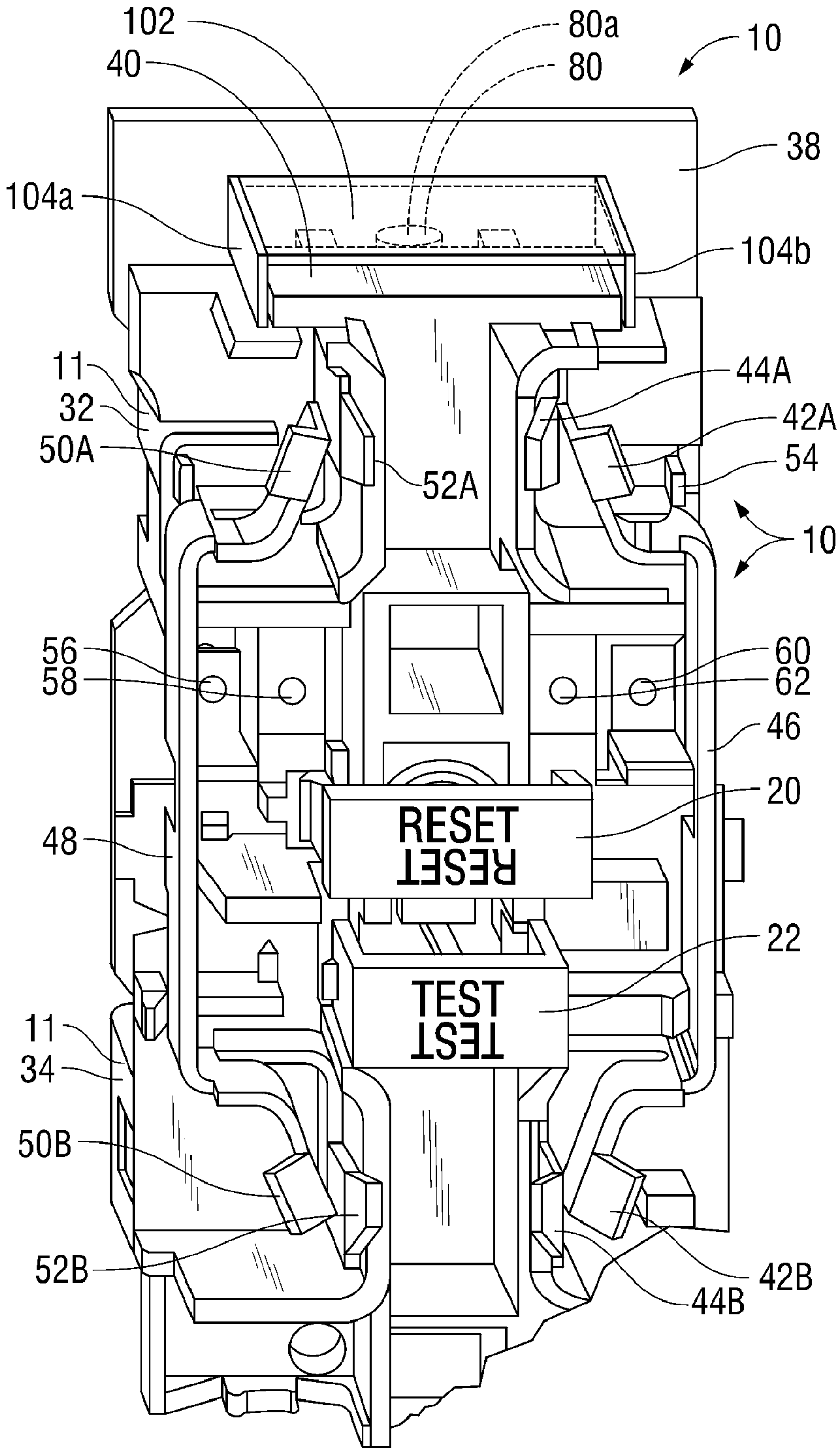
FIG. 2 is a top view of a portion of the circuit interrupting device according to the present disclosure shown in FIG. 1, with the face portion removed.

Referring to FIG. 2, a top view of the GFCI device 10 (without face portion 36 and strap 14) is shown. An internal housing structure 40 provides the platform on which the components of the GFCI device are positioned. Reset button 20 and test button 22 are mounted on housing structure 40. Housing structure 40 is mounted on printed circuit board 38. The receptacle aligned to opening 16 of face portion 36 is made from extensions 50A and 52A of frame 48.

Frame or contact 48 is made from an electricity conducting material from which the receptacles aligned with openings 16 and 24 are formed. The receptacle aligned with opening 24 of face portion 36 is constructed from extensions 50B and 52B of frame 48. Also, frame 48 has a flange the end of which has electricity conducting contact 56 attached thereto. Frame 46 is made from an electricity conducting material from which contacts aligned with openings 18 and 26 are formed.

Figure 3:
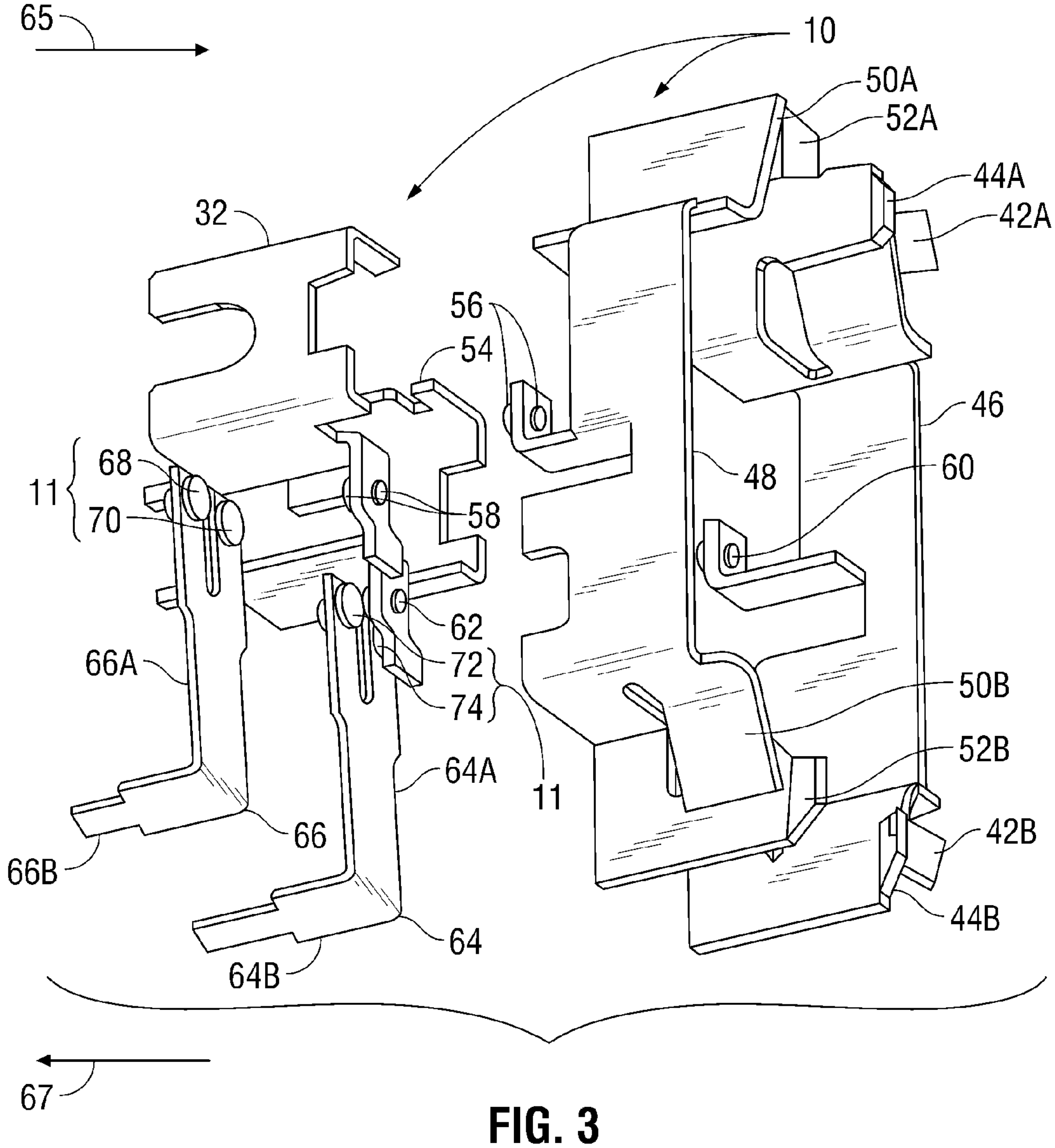
FIG. 3 is an exploded perspective view of the face terminal internal frames, load terminals and movable bridges.

The contact aligned with opening 18 of frame portion 36 is constructed with frame extensions 42A and 44A. The contact aligned with opening 26 of face portion 36 is constructed with extensions 42B and 44B. Frame 46 has a flange the end of which has electricity conducting contact 60 attached thereto. Therefore, frames 46 and 48 form the face terminals implemented as contacts aligned to openings 16, 18, 24 and 26 of face portion 36 of GFCI 10 (see FIG. 1). Load terminal 32 and line terminal 34 are also mounted on internal housing structure 40. Load terminal 32 has an extension the end of which electricity conducting load contact 58 is attached. Similarly, load terminal 54 has an extension to which electricity conducting contact 62 is attached. The line, load and face terminals are electrically isolated from each other and are electrically connected to each other by a pair of movable bridges. The relationship between the line, load and face terminals and how they are connected to each other is shown in FIG. 3. Other configurations of line, load and face conductive paths and their points of connectivity, with and without movable bridges are well known and within the scope of this disclosure.

Referring now to FIG. 3, there is shown the positioning of the face and load terminals with respect to each other and their interaction with the movable bridges (64, 66). Although the line terminals are not shown, it is understood that they are electrically connected to one end of the movable bridges. The movable bridges (64, 66) are generally electrical conductors that are configured and positioned to connect at least the line terminals to the load terminals. In particular movable bridge 66 has an arm portion 66B and a connecting portion 66A that are formed at an angle to each other (approximately 90 degrees in the exemplary embodiment illustrated in FIGS. 2-5). Arm portion 66B is electrically connected to line terminal 34 (not shown).

Similarly, movable bridge 64 has an arm portion 64B and a connecting portion 64A that are also formed at an angle to each other (approximately 90 degrees in the exemplary embodiment illustrated in FIGS. 2-5). Arm portion 64B is electrically connected to the other line terminal (not shown); the other line terminal being located on the side opposite that of line terminal 34. Connecting portion 66A of movable bridge 66 has two fingers each having a bridge contact (68, 70) attached to its end. Connecting portion 64A of movable bridge 64 also has two fingers each of which has a bridge contact (72, 74) attached to its end. The bridge contacts (68, 70, 72 and 74) are made from conductive material. Also, face terminal contacts 56 and 60 are made from conductive material. Further, the load terminal contacts 58 and 62 are made from conductive material. The movable bridges 64, 66 are preferably made from flexible metal that can be flexed when subjected to mechanical forces.

The connecting portions (64A, 66A) of the movable bridges 64, 66, respectively, are mechanically biased downward or in the general direction shown by arrow 67. When the GFCI device 10 is reset, the connecting portions of the movable bridges are caused to move in the direction shown by arrow 65 and engage the load and face terminals thus connecting the line, load and face terminals to each other.

Figure 4:
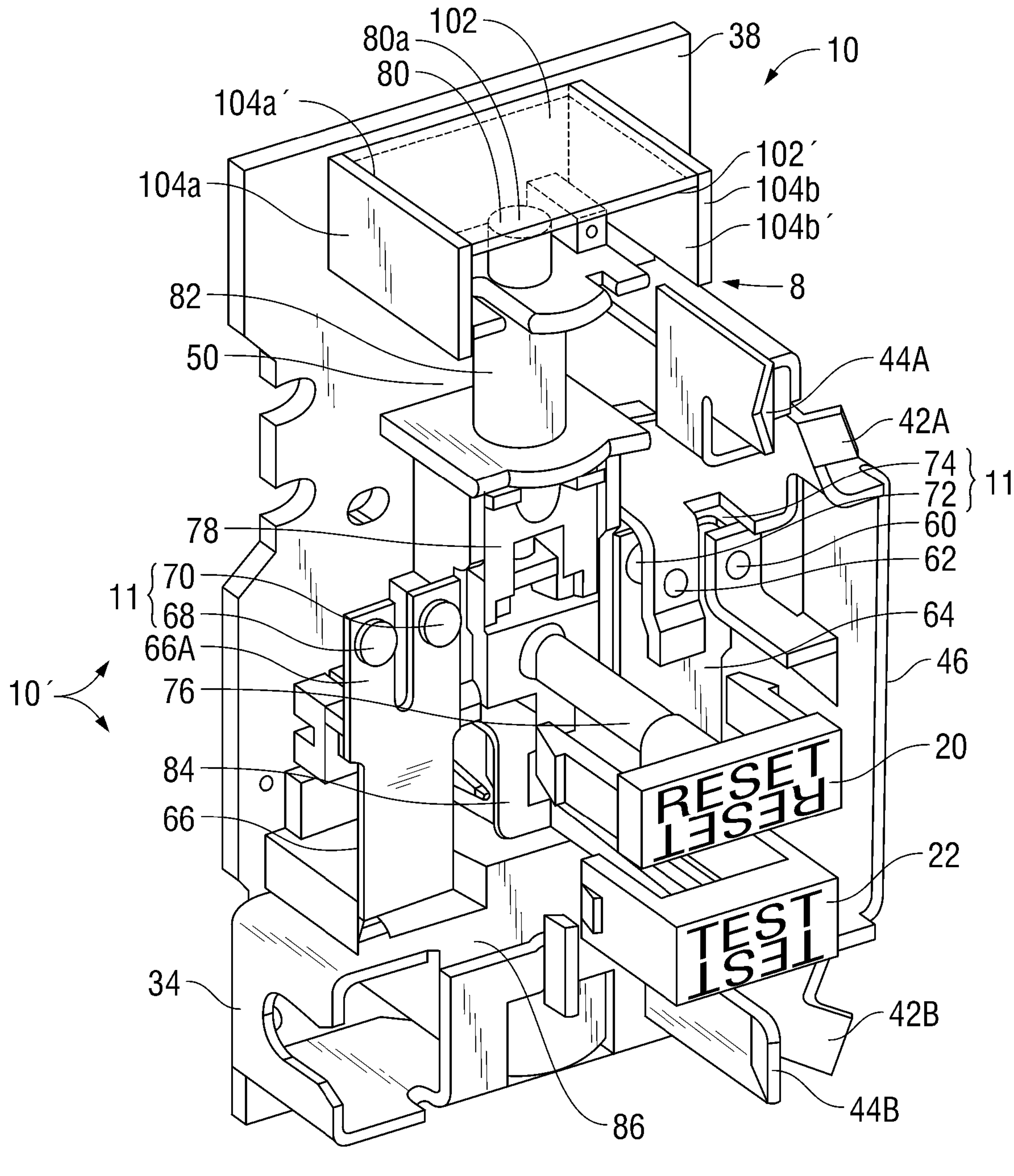
FIG. 4 is a perspective view of the arrangement of some of the components of the circuit interrupter of the device of FIGS. 1-3 according to the present disclosure.

In particular connecting portion 66A of movable bridge 66 is formed at an angle with respect to arm portion 66B to face in an upward direction (direction shown by arrow 65) to allow contacts 68 and 70 to engage contacts 56 of frame 48 and contact 58 of load terminal 32 respectively. Similarly, connecting portion 64A of movable bridge 64 is formed at an angle with respect to prong portion 64A to face in an upward (direction shown by arrow 65) to allow contacts 72 and 74 to engage contact 62 of load terminal 54 and contact 60 of frame 46 respectively. The connecting portions 64A, 66A of the movable bridges 64, 66 are moved in an upwards direction by a latch/lifter assembly positioned underneath the connecting portions where this assembly moves in an upward direction (direction shown by arrow 65) when the GFCI device is reset. It should be noted that the contacts of a movable bridge engaging a contact of a load or face terminals occurs when electric current flows between the contacts; this is done by having the contacts touch each other. Some of the components that cause the connecting portions of the movable bridges to move upward are shown in FIG. 4.

For the purposes of describing embodiments of the circuit interrupter according to the present disclosure, referring again also to FIG. 1, the bridge contacts 68 and 70, engaging contacts 56 of frame 48 and contact 58 of load terminal 32, respectively, and bridge contacts 72 and 74, engaging contact 62 of load terminal 54 and contact 60 of frame 46, respectively, are defined herein collectively as a circuit interrupting switch 11 between the first conductor or line conductor 9*a* and the second conductor or load conductor 9*b*.

Referring again also to FIG. 2, FIGS. 4 and 5 illustrate a partial view of the GFCI device 10 according to the present disclosure that is configured to perform an automatic self-test sequence on a periodic basis that includes movement of a solenoid plunger. More particularly, the GFCI device 10 includes a fault sensing circuit residing in a printed circuit board 38. The fault sensing circuit is not explicitly shown in FIGS. 2, 4 or 5 and is incorporated into the layout of the printed circuit board 38. Components for the circuit are electrically coupled to the printed circuit board 38 which receives electrical power from the power being supplied externally to the GFCI device 10. The fault sensing circuit is configured to detect a predetermined condition and to generate a circuit interrupting actuation signal. FIG. 4 illustrates mounted on printed circuit board 38 a fault circuit interrupting solenoid coil and plunger assembly or combination 8 that includes bobbin 82 having a cavity 50 in which elongated cylindrical plunger 80 is slidably disposed. For clarity of illustration, frame 48 and load terminal 32 are not shown.

One end 80*a* of plunger 80 is shown extending outside of the bobbin cavity 50. The other end of plunger 80 (not shown) is coupled to or engages a spring that provides the proper force for pushing a portion of the plunger 80 outside of the bobbin cavity 50 after the plunger 80 has been pulled into the cavity 50 due to a resulting magnetic force when the coil is energized. Electrical wire is wound around bobbin 82 to form a coil of the combination solenoid coil and plunger assembly 8. Although for clarity of illustration the coil wire wound around bobbin 82 is not shown in FIGS. 4 and 5, reference numeral 82 in those figures refer to the coil wire forming a coil 82. Further, reference number 82 in FIGS. 10-13 and 16-17 refers to the coil wire or coil wound around the bobbin.

Accordingly, the fault circuit interrupting coil and plunger assembly 8 (hereinafter referred to as coil and plunger assembly 8 or combination coil and plunger assembly 8) has at least one coil 82 and is actuatable by the circuit interrupter actuation signal generated by the fault sensing circuit and is configured to cause electrical discontinuity of power supplied to a load (not shown) by the GFCI device 10 via actuation by the fault sensing circuit upon detection of the occurrence of the predetermined condition.

A lifter 78 and latch 84 assembly is shown where the lifter 78 is positioned underneath the movable bridges. The movable bridges 66 and 64 are secured with mounting brackets 86 (only one is shown) which is also used to secure line terminal 34 and the other line terminal (not shown) to the GFCI device 10. It is understood that the other mounting bracket 86 used to secure movable bridge 64 is positioned directly opposite the shown mounting bracket. The reset button 20 has a reset pin 76 which engages lifter 78 and latch 84 assembly.

Figure 5:
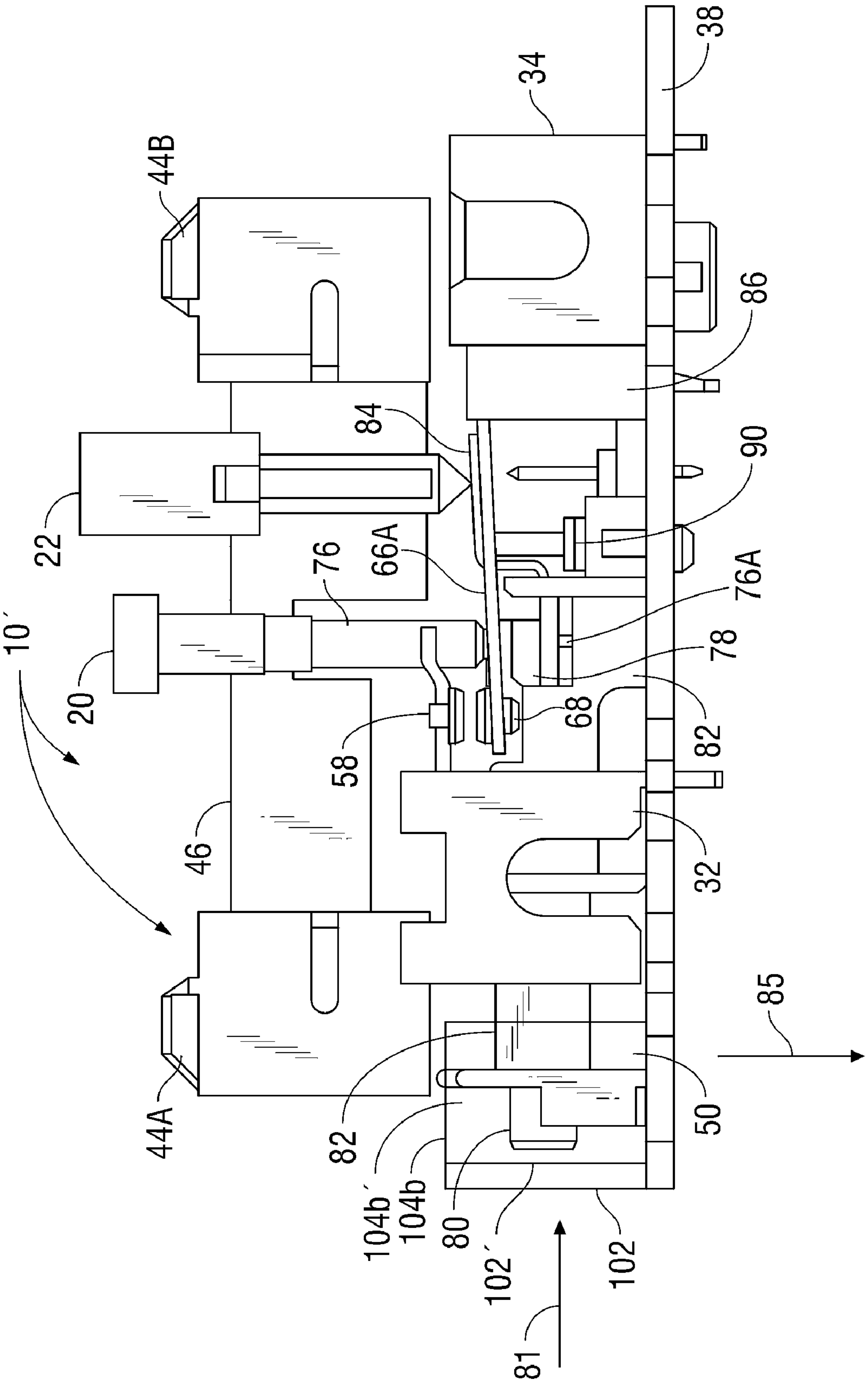
FIG. 5 is a side view of FIG. 4.

FIG. 5 illustrates a side view of the GFCI device 10 of FIG. 4. Prior to the coil 82 being energized, the GFCI device 10 is in a non-actuated configuration. Upon the detection of the occurrence of the predetermined condition, fault sensing circuit assumes that a real transfer of the GFCI device 10 from the non-actuated configuration to an actuated configuration is required such that the plunger 80 will move in a fault direction, i.e., the direction necessary for the plunger 80 to move a distance sufficient to cause disengagement of at least one set of contacts, as described below, and thereby cause electrical discontinuity along a conductive path, i.e., causing the GFCI device 10 to trip. More particularly, when the circuit interrupting actuation signal causes the coil 82 to be energized, plunger 80 is pulled into the coil in the direction shown by arrow 81. The direction shown by arrow 81 is referred to herein as the fault direction 81 of the plunger 80. Connecting portion 66A of movable bridge 66 is shown biased downward (in the direction shown by arrow 85). Although not shown, connecting portion of movable bridge 64 is similarly biased. Also part of a mechanical switch—test arm 90—is shown positioned under a portion of the lifter 78. It should be noted that because frame 48 is not shown, face terminal contact 56 is also not shown.

Thus, referring again to FIGS. 2-5, the GFCI device 10 includes a circuit interrupter 10' that is configured to cause electrical discontinuity in the GFCI device 10 upon the occurrence of at least one predetermined condition. The circuit interrupter 10' includes the switch 11, defined herein as the at least a set of contacts, e.g., bridge contacts 72, 74 (of movable bridge 64) and 68, 70 (of movable bridge 66), that are configured wherein disengagement of at least one of the sets of contacts, e.g., 72 and 74 or 68 and 70, enables the electrical discontinuity along a conductive path in the GFCI device 10. More particularly, the switch 11 is disposed to selectively connect and disconnect the first conductor or line conductor 9*a* and the second conductor or load conductor 9*b*. The circuit interrupter 10' also includes the fault sensing circuit failure sensing circuit that may reside in the printed circuit board 38, and that is configured to detect the predetermined condition and to generate a circuit interrupting actuation signal. Additionally, the circuit interrupter 10' includes at least the coil and plunger assembly 8 having the coil 82 and the plunger 80 that are actuatable by the circuit interrupting actuation signal and are configured and disposed wherein movement of the plunger 80 causes the electrical discontinuity via disengagement of at least one of the sets of contacts, e.g., 72 and 74 or 68 and 70, from each other upon detection of the occurrence of the predetermined condition. In other words, the circuit interrupter 10' is disposed to generate the circuit interrupting actuation signal upon detection of the predetermined condition. The coil and plunger assembly 8 is adapted to be actuatable by the circuit interrupting actuation signal wherein movement of the plunger 80 causes the switch 11 to open.

As defined above and as defined in greater detail below, a test assembly according to the embodiments of the present disclosure is configured to enable a test of the circuit interrupter 10', to initiate at least a partial movement of the plunger 80 in a test direction, from a pre-test configuration to a post-test configuration, without opening the switch 11.

Referring also to FIGS. 6-17, GFCI device 10 also includes a test assembly 100 that is configured to enable an at least partial operability self test of the GFCI device 10, without user intervention, to initiate movement of the plunger 80 from a pre-test configuration to a post-test configuration by testing operability of the coil and plunger assembly 8 and of the consequential capability of the fault sensing circuit to effect movement of the plunger 80, including detection of a fault in the coil 82 that is separate from the capability of the plunger 80 to move from a pre-test configuration to a post-test configuration. That is, the circuit interrupting test assembly 100 is configured to enable a test of the circuit interrupter 10, e.g., the GFCI device, to initiate or to cause at least partial movement of the plunger 80 without opening the switch 11.

As explained in more detail below with respect to FIGS. 6-17, the test assembly 100, alternatively referred to as a circuit interrupting test assembly, includes a test initiation circuit that is configured to initiate and conduct an at least partial test of the circuit interrupter 10', that is, a test of the ability of the circuit interrupter 10' to perform its intended function of causing electrical discontinuity in the GFCI device 10, e.g., a test of the circuit interrupting device 10 that includes initiating movement of the plunger 80 from a pre-test configuration to a post-test configuration. The test assembly 100 also includes a test sensing circuit that is configured to sense a result of the at least partial test of the circuit interrupter 10' or GFCI device 10. The test assembly 100 is configured to enable an at least partial test of the circuit interrupter.10' by testing at least partially movement of the plunger 80 without disengagement of the contacts such as contacts 72 and 74, and 68 and 70. That is, the test assembly 100 is configured to cause the plunger 80 to move, from a pre-test configuration, in a test direction, e.g., test direction 83 or alternate test direction 83', to a post-test configuration, a distance that is insufficient to disengage the at least one set of contacts, e.g., contacts 72 and 74, and 68 and 70, from each other, thereby causing electrical discontinuity along a conductive path in the GFCI device 10.

As defined herein, insufficient movement includes either no detectable movement of the plunger or movement of the plunger that is not sufficient to disengage the at least a set of contacts during a required real transfer of the circuit interrupting device from the non-actuated configuration to the actuated configuration, the actuated configuration resulting in a trip of the GFCI device 10.

Unless otherwise noted, the non-actuated configuration and the pre-test configuration of the GFCI device 10 are equivalent. However, since the actuated configuration of the GFCI device 10 occurs following a real transfer of the GFCI device 10 from the non-actuated configuration, during which time power is supplied to the load side connections through a conductive path in the GFCI device 10, to the actuated configuration, and thus involves causing the plunger 80 to move a distance sufficient to disengage the at least one set of contacts, e.g., contacts 72 and 74, and 68 and 70, the actuated configuration differs from the post-test configuration.

The post-test configuration as defined herein is not a static configuration of the GFCI device 10 but is a transitory state that occurs over a period of time beginning with the initiation of the test actuation signal and ending with the resultant final plunger Movement, or lack thereof depending on the results of the test.

To support the detecting and sensing members of the test assembly 100 of the present disclosure, GFCI device 10 also includes a rear support member 102 that is positioned or disposed on the printed circuit board 38 and with respect to the cavity 50 so that one surface 102' of the rear support member 102 may be in interfacing relationship with the first end 80*a* of the plunger 80 and may be substantially perpendicular or orthogonal to the movement of the plunger 80 as indicated by arrow 81.

Additionally, first and second lateral support members 104*a* and 104*b*, respectively, are positioned or disposed on the printed circuit board 38 and with respect to the cavity 50 so that one surface 104*a*' and 104*b*' of first and second lateral support members 104*a* and 104*b*, respectively, may be substantially parallel to the movement of the plunger 80 as indicated by arrow 81 and is in interfacing relationship with the plunger 80. Thus, the rear support member 102 and the first and second lateral support members 104*a* and 104*b*, respectively, partially form a box-like configuration partially around the plunger 80. The rear support member 102 and the first and second lateral support members 104*a* and 104*b*, respectively, may be unitarily formed together or be separately disposed or positioned on the circuit board 38. The printed circuit board 38 thus serves as a rear or bottom support member for the combination solenoid coil and plunger that includes the coil or bobbin 82 and the plunger 80.

Figure 6:
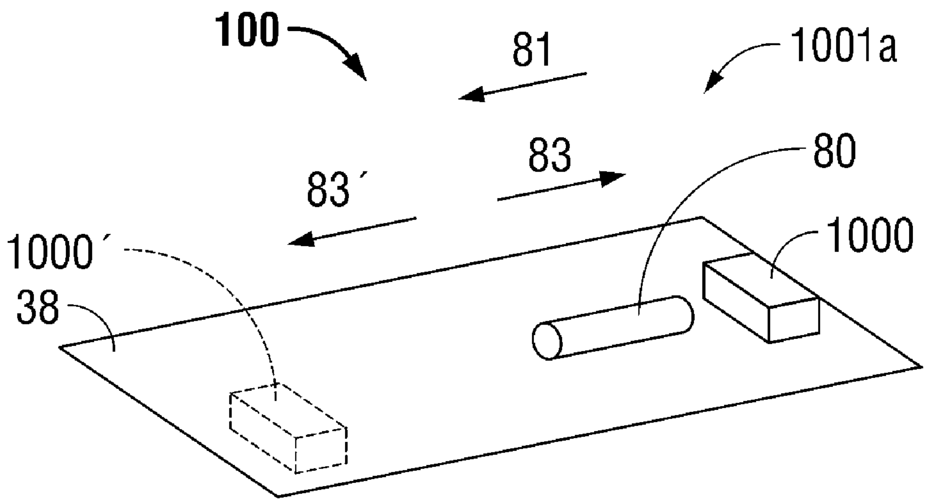
FIG. 6 is a simplified perspective view of a test assembly of a circuit interrupting device according to the present disclosure in a pre-test configuration having at least one sensor that is not in contact with a solenoid plunger in the pre-test configuration.
Figure 7:
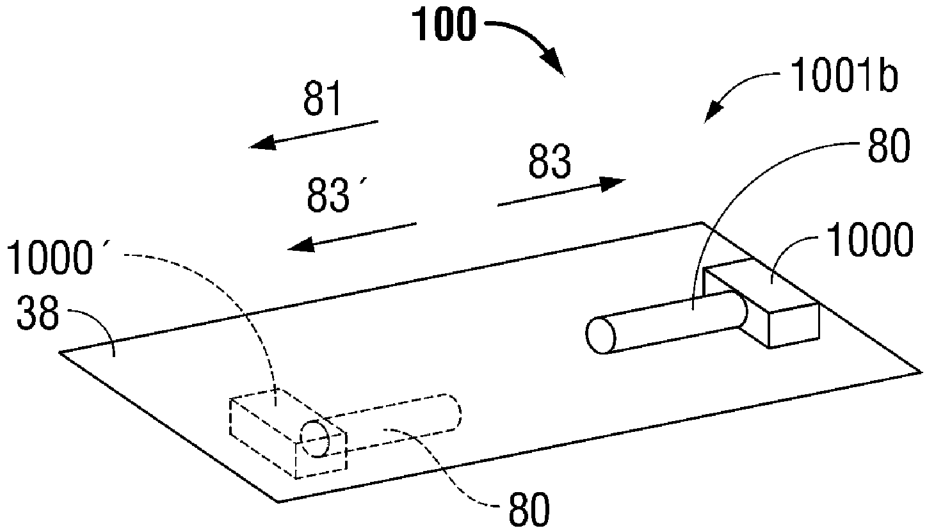
FIG. 7 is a simplified perspective view of the test assembly of the circuit interrupting device of FIG. 7 in a post-test configuration having at least one sensor that is in contact with the solenoid plunger in the post-test configuration.

In conjunction with FIGS. 2-5, while referring particularly to FIGS. 6-7, there is illustrated a view of the test assembly 100 wherein at least one sensor 1000 of the test assembly 100 is disposed wherein, when the circuit interrupter 10' is in a pre-test configuration, e.g., pre-test configuration 1001*a* as illustrated in FIG. 6, the plunger 80 is not in contact with the at least one sensor 1000. When the circuit interrupter 10' is in a post-test configuration, e.g., post-test configuration 1001*b* as illustrated in FIG. 7, the plunger 80 is in contact with the at least one sensor 1000. Thus the at least one sensor 1000 is disposed to detect a change in position of the plunger 80 from the pre-test configuration 1001*a* to the post-test configuration 1001*b*. As illustrated in FIGS. 6-7, the test assembly 100 is configured to cause the plunger 80 to move in a test direction 83 that is different from the fault direction 81, and more particularly as illustrated, in a test direction 83 that is opposite to the fault direction 81.

In an alternate embodiment, at least one sensor 1000' of the test assembly 100 is disposed at a position with respect to the plunger 80 such that when the circuit interrupter 10' transfers from the pre-test configuration 1001*a* (see FIG. 6) to the post-test configuration 1001*b* (see FIG. 7), the test assembly 100 is thus configured to cause the plunger 80 to move in a test direction 83' that is in the same direction as the fault direction 81.

In an alternate embodiment, referring to FIGS. 8-9, again in conjunction with FIGS. 2-5, there is illustrated a simplified view of the test assembly 100 wherein at least one sensor 1000 of the test assembly 100 is disposed wherein, when the circuit interrupter 10' is in a pre-test configuration, e.g., pre-test configuration 1002*a* as illustrated in FIG. 8, the plunger 80 is in contact with the at least one sensor 1000. When the circuit interrupter 10' is in a post-test configuration, e.g., post-test configuration 1002*b* as illustrated in FIG. 9, the plunger 80 is not in contact with the at least one sensor 1000. Thus, in a similar manner as with respect to FIGS. 6-7, the at least one sensor 1000 is disposed to detect a change in position of the plunger 80 from the pre-test configuration 1002*a* to the post-test configuration 1002*b*. As illustrated in FIGS. 6-7, the test assembly 100 is configured to cause the plunger 80 to move in test direction 83' that is in the same direction as the fault direction 81.

As discussed in more detail below, the one or more sensors 1000 or 1000' may include at least one electrical element.

Figure 10:
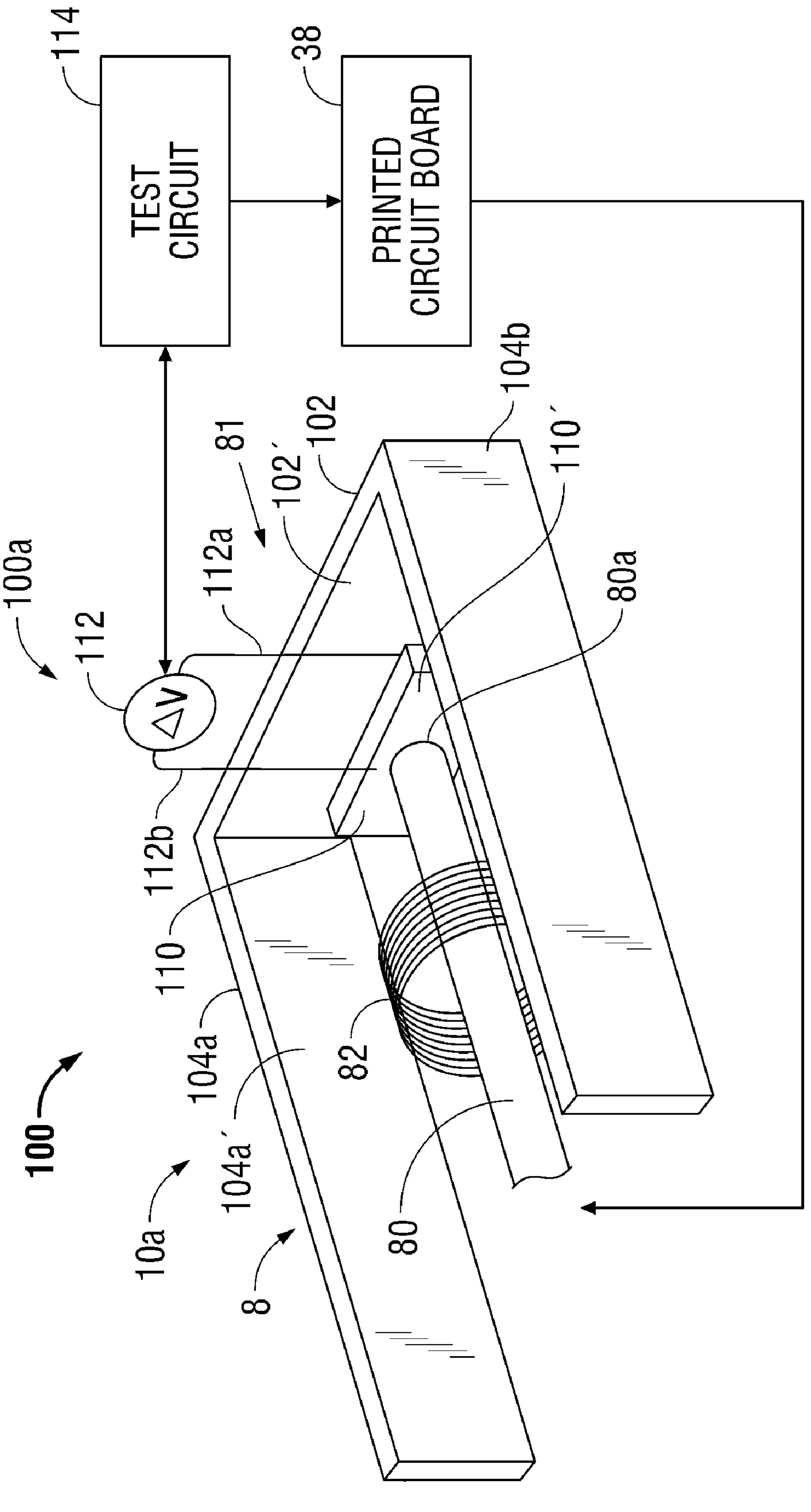
FIG. 10 is a perspective view of one embodiment of a part of a circuit interrupting device that is configured with a piezoelectric member to detect and sense solenoid plunger movement according to the present disclosure.

FIG. 10 illustrates one embodiment of the present disclosure wherein the test assembly 100 of the GFCI device 10 is defined by a test assembly 100*a* wherein at least one sensor includes an electrical element that is in contact with the plunger 80 when the GFCI device 10 is in a pre-test configuration. More particularly, test assembly 100*a* includes as at least one electrical element at least one piezoelectric member 110, e.g. a pad or a sensor, having a surface 110' that is disposed on the surface 102' of the rear support member 102 so that the surface 102' is in interfacing relationship with the first end 80*a* of the plunger 80. The combination solenoid coil and plunger assembly 8 is disposed on the printed circuit board 38 with respect to the piezoelectric member 110 so that when the GFCI device 10*a* is in the pre-test configuration exemplified by pre-test configuration 1002*a* illustrated in FIG. 8, the first end 80*a* of the plunger 80 is in substantially stationary contact with the surface 110' so that substantially no measurable voltage is produced by the piezoelectric member 110. When the plunger 80 is not in contact with the piezoelectric member 110, the piezoelectric member 110 produces substantially no voltage. In the exemplary embodiment illustrated in FIG. 10, as noted above, the circuit interrupter 10' is in the pre-test configuration 1002*a* illustrated in FIG. 8.

A voltage sensor 112 is electrically coupled to the piezoelectric sensor 110 via first and second connectors/connector terminals 112*a* and 112*b*, respectively. The test assembly 100*a* of the GFCI device 10*a* further includes a test initiation circuit and a test sensing circuit, which are illustrated schematically as a combined self-test initiation and sensing circuit 114, although the test initiation features and the sensing features can be implemented by a separate test initiation circuit and a separate test sensing circuit. The voltage sensor 112 is also electrically coupled to the sensing features of the circuit 114.

Due to the physical characteristics of piezoelectric members such as the piezoelectric member 110, a voltage is only output from the piezoelectric member 110 when it is dynamically contacted by a separate object, e.g., plunger 80, traveling with a velocity sufficient to cause an impact force or pressure to produce a measurable voltage output that is indicative of prior movement of the plunger 80 away from, and re-contact of the plunger 80 with, the piezoelectric member 110.

Thus, the GFCI device 10*a* has a three-stage post-test configuration. In the first stage of the post-test configuration, the GFCI device 10*a* assumes the post-test configuration 1002*b* illustrated in FIG. 9, wherein the plunger 80 moves away from the piezoelectric member 110, represented by the sensor(s) 1000, in the test direction 83 that is the same direction as the fault direction 81. In the second stage of the post-test configuration, the GFCI device 10*a* assumes the pre-test configuration 1001*a* illustrated in FIG. 6 wherein the plunger 80 is not in contact with the piezoelectric member 110, represented by the sensor(s) 1000.

In the third stage of the post-test configuration, the GFCI device 10*a* moves in the test direction 83 to assume the post-test configuration 1001*b* illustrated in FIG. 7 wherein plunger 80 is in contact with, and more particularly dynamically contacts, the piezoelectric member 110, represented by the sensor(s) 1000. Thus, the plunger 80, and particularly the first end 80*a*, dynamically contacts the piezoelectric member 110, and particularly the surface 110', to produce a voltage output from the piezoelectric member 110. The connectors/connector terminals 112*a* and 112*b* connected to the piezoelectric sensor 110 enable measurement of the voltage output by the voltage sensor 112 produced by the piezoelectric member 110.

As defined herein, the plunger 80 dynamically contacting the piezoelectric member 110 refers to the plunger 80, or other object, impacting the piezoelectric member 110 with a force sufficient to produce a measurable or detectable voltage output from the piezoelectric member 110, as opposed to substantially stationary contact wherein the plunger 80, or other object, does not produce a measurable or detectable voltage output.

In the event of an at least initially successful test of the combination solenoid coil and plunger assembly 8, the test initiation feature of the circuit 114 causes at least partial movement of the plunger 80 in the test direction 83' that is in the same direction as the forward or fault direction as indicated by arrow 81 so as to sever contact between the first end 80*a* of the plunger 80 and the surface 110' of the piezoelectric sensor 110, thereby maintaining the voltage sensed by the voltage sensor 112 at essentially substantially zero. Alternatively, in the event of an initially unsuccessful test of the combination solenoid coil and plunger assembly 8, the test initiation feature of the circuit 114 still attempts to cause at least partial movement of the plunger 80 in the forward or fault direction as indicated by arrow 81 by producing a magnetic field due to electrical current flow through the coil (not shown) around bobbin 82 so as to sever contact between the first end 80*a* of the plunger 80 and the surface 110' of the piezoelectric member 110, thereby also maintaining the voltage sensed by the voltage sensor 112 at essentially or substantially zero, although no movement of the plunger 80 in the forward direction as indicated by arrow 81 may have occurred.

In the event of an at least initially successful test, when the test initiation feature of the circuit 114 stops influencing or causing movement of the plunger 80, a compression spring (not shown) is housed and disposed in the bobbin 82 such that a compression force caused by the compression spring acts against the plunger 80. The force of the spring is biased against the surface 110' of the piezoelectric sensor 110 when the coil of the bobbin 82 is not energized. The plunger 80 assumes the third stage 1001*b* of the post-test configuration (see FIG. 7) and returns to the pre-test configuration 1002*a* (see FIG. 8) and dynamically strikes or contacts the surface 110' of the piezoelectric member 110 thereby creating a measurable or detectable voltage from the piezoelectric member 110 in the event of a successful return of the plunger 80 to the pre-test configuration 1002*a*.

In the event of a completely successful test, the detectable voltage sensed or detected by the sensing feature of the test initiation and sensing circuit 114 via the voltage sensor 112 is of a magnitude V1 or greater that is pre-determined to be indicative of movement of plunger 80 during the test that is a pre-cursor to adequate or sufficient movement of the plunger 80 during a required real actuation of the GFCI device 10, i.e., a required real transfer of the GFCI device 10 from the non-actuated configuration to the actuated configuration as described above with respect to FIG. 5. In the event of an only partially successful test, the detectable voltage sensed or detected by the sensing feature of the test initiation and sensing circuit 114 via voltage sensor 112 is of a magnitude V1' that is less than the magnitude V1 and so is pre-determined to be indicative of movement of plunger 80 during the test that is a pre-cursor to inadequate or insufficient movement of the plunger 80 during a required real actuation of the GFCI device 10, i.e., a required real transfer of the GFCI device 10 from the non-actuated configuration to the actuated configuration as described above with respect to FIG. 5.

In the event of an initially unsuccessful test of the combination solenoid coil and plunger assembly 8, the test initiation feature of the circuit 114, despite attempting to produce a magnetic field due to electrical current flow through the coil (not shown) around bobbin 82, causes no or insufficient movement of the plunger 80 so that no voltage is detected by the voltage sensor 112 or a voltage is detected by the voltage sensor 112 having a magnitude that is less than or equal to the magnitude V1' that is pre-determined to be indicative of movement of plunger 80 during the test that is a pre-cursor to inadequate or insufficient movement of the plunger 80 during a required real actuation of the GFCI device 10 as previously described.

In one embodiment, the sensing feature of the circuit 114 is electrically coupled to a microprocessor (not shown) residing on the printed circuit board 38 that annunciates, and/or trips the GFCI device 10*a*, in the event of failure of the self-test.

Thus, GFCI device 10*a* is an example of a GFCI device according to the present disclosure wherein the plunger is configured to move in a first direction, e.g., as indicated by arrow 81, to cause electrical discontinuity in power output to a load upon actuation by the fault sensing circuit (residing in the printed circuit board 38) and that further includes at least one sensor configured and disposed wherein the plunger 80 is in contact with the one or more sensors when the circuit interrupter 10' is in a pre-test configuration, and wherein the plunger 80 is not in contact with the one or more sensors when the circuit interrupter 10' is in a post-test configuration.

Those skilled in the art will recognize that the GFCI device 10*a* may be configured wherein when the circuit interrupter 10' is in a pre-test configuration, the plunger 80 may not be in contact with the piezoelectric member 110 but again dynamically contacts the piezoelectric surface 110' to produce a voltage upon returning from a post-test configuration, or upon being transferred from a pre-test configuration. The location of the piezoelectric member(s) 110 may be adjusted accordingly.

Additionally, those skilled in the art will recognize that GFCI device 10*a* is configured to perform an automatic self-test sequence on a periodic basis (e.g.,—every few cycles of alternating current (AC), hourly, daily, weekly, monthly, or other suitable time period) without the need for user intervention and, in addition, GFCI device 10*a* includes members, e.g., the test initiation and sensing circuit 114 and the test assembly 100*a*, that are configured to enable the self-test sequence or procedure to test the operability and functionality of the device's components up to and including the movement of the solenoid plunger 80.

Those skilled in the art will recognize that the self-test initiation to conduct the periodic self-test sequence may be implemented by a simple resistance-capacitance (RC) timer circuit, a timer chip such as a 555 timer, a microcontroller, another integrated circuit (IC) chip, or other suitable circuit. In addition, a manual operation by the user may trigger the self test sequence.

Thus, the circuit interrupter 10' includes a fault sensing circuit (not shown but may be integrated within and reside within the printed circuit board 38) that is configured to detect the predetermined condition and to generate a circuit interrupting actuation signal, and actuate the fault circuit interrupting coil and plunger assembly 8. The coil and plunger assembly 8 has at least one coil 82 and is actuatable by the circuit interrupting actuation signal generated by the fault sensing circuit and is configured and disposed wherein movement of the plunger 80 causes the electrical discontinuity by disengagement of at least one set of the sets of contacts, e.g., 72 and 74 or 68 and 70, and thereby cause electrical discontinuity along a conductive path upon detection of the occurrence of the predetermined condition.

The GFCI device 10 also includes the test assembly 100 that is configured to enable periodically an at least partial operability self test of the circuit interrupter, without user intervention, via self testing at least partially operability of coil and plunger assembly 8 and/or of the fault sensing circuit.

As will be appreciated and understood by those skilled in the art, the foregoing description of the circuit interrupter 10' is applicable to the remaining embodiments of the GFCI device 10 as described with respect to, and illustrated in, FIGS. 11-17.

Alternatively, as described below in FIGS. 11-13, the at least one electrical element may be characterized by an impedance value such that when the plunger 80 is in contact with the electrical element, a first impedance value is produced by the at least one electrical element, and when the plunger 80 is not in contact with the electrical element, a second impedance value is produced by the at least one electrical element. Correspondingly, the at least one electrical element may be at least one of a resistor or resistive member, a capacitor or capacitive member, and an inductor or inductive member.

Figure 8:
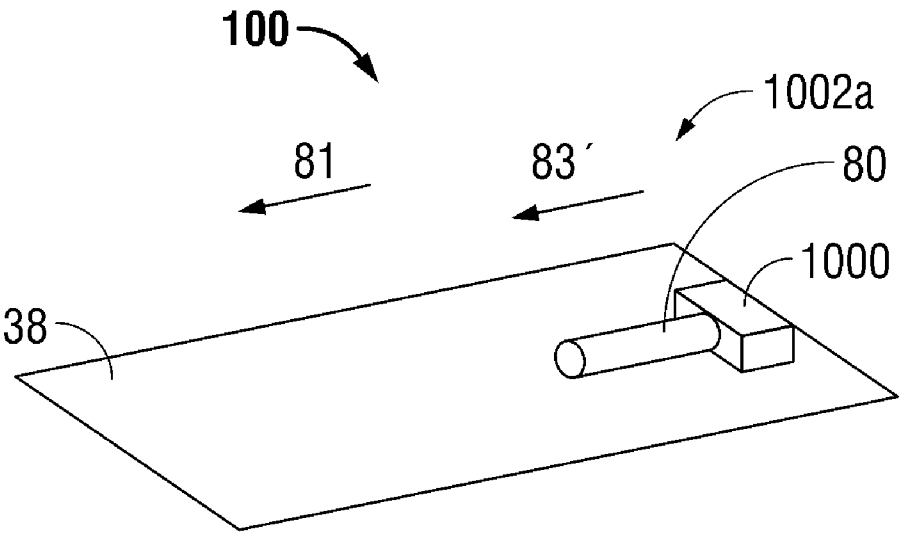
FIG. 8 is a simplified perspective view of a test assembly of a circuit interrupting device according to the present disclosure in a pre-test configuration having at least one sensor that is in contact with a solenoid plunger in the pre-test configuration.
Figure 9:
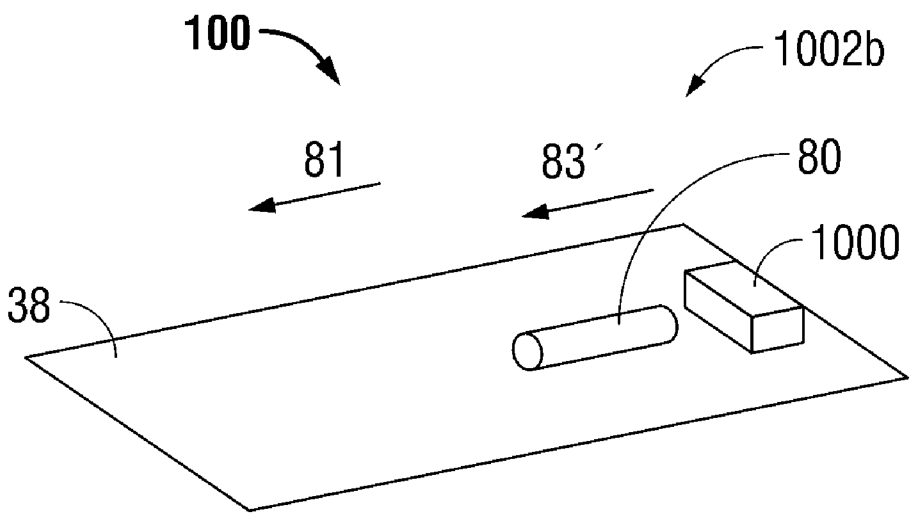
FIG. 9 is a simplified perspective view of the test assembly of the circuit interrupting device of FIG. 8 in a post-test configuration having at least one sensor that is not in contact with the solenoid plunger in the post-test configuration.
Figure 11:
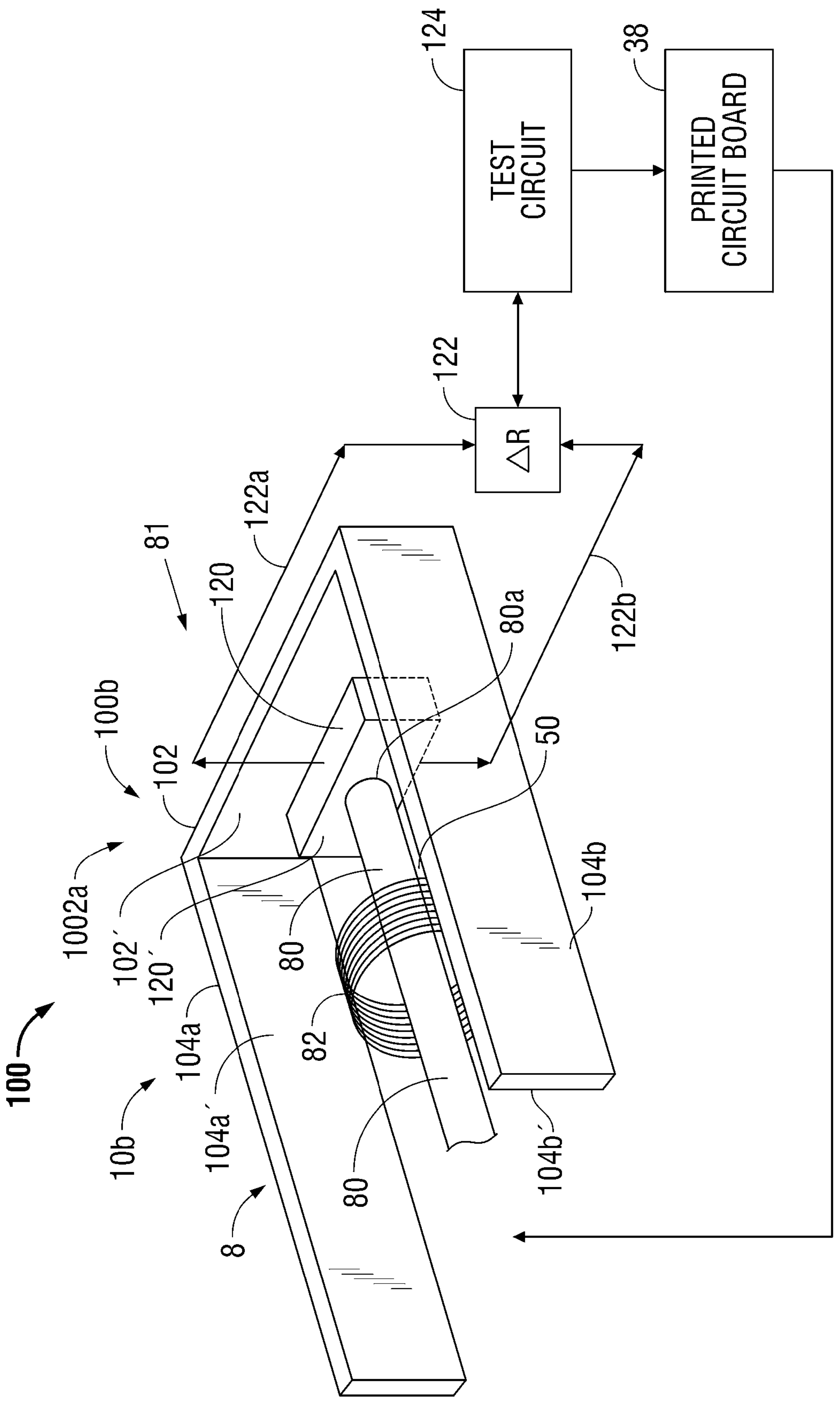
FIG. 11 is a perspective view of one embodiment of a part of a circuit interrupting device that is configured with a resistive member to detect and sense solenoid plunger movement according to the present disclosure.

Accordingly, FIG. 11 illustrates one embodiment of the GFCI device 10 of the present disclosure wherein the test assembly 100 is defined by test assembly 100*b* wherein test assembly 100*b* includes as an electrical element a resistive member in contact with plunger 80 in the pre-test configuration 1002*a* of the GFCI device 10, as illustrated in FIG. 8.

More particularly, GFCI device 10*b* is essentially identical to GFCI device 10*a* except that the piezoelectric member 110 of test assembly 100*a* is replaced by a resistive member, e.g., resistive pad or sensor 120 of test assembly 100*b*, voltage sensor 112 and connector/connector terminals 112*a* and 112*b* of test assembly 100*a* are replaced by resistance sensor 122 and connector/connector terminals 122*a* and 122*b*, respectively, of test assembly 100*b* and test initiation and test sensing circuit 114 of test assembly 100*a* is replaced by test initiation and test sensing circuit 124 of test assembly 100*b*. Thus, the first end 80*a* of the plunger 80 is now in contact with surface 120' of resistive member 120 when the combination solenoid coil and plunger assembly 8 is in the pre-test configuration 1002*a* so that the plunger 80 is disposed on the printed circuit board 38 and with respect to the resistive member 120 so that the first end 80*a* of the plunger 80 is in contact with the surface 120' to cause a sensible or measurable first impedance value or load represented by first resistance value R1 characteristic of the resistive member 120 when the GFCI device 10*b* is in pre-test configuration 1002*a*. In a similar manner, the resistance sensor 122 is electrically coupled to the resistive member or sensor 120 via first and second connectors/connector terminals 122*a* and 122*b*, respectively.

The test assembly 100*b* of GFCI device 10*b* again further includes a test initiation circuit and a test sensing circuit, which are illustrated schematically as a combined self-test initiation and test sensing circuit 124, although the test initiation features and the sensing features again can be implemented by separate test initiation and test sensing circuits as explained above. The resistance sensor 122 is also electrically coupled to the sensing features of the circuit 124.

In a similar manner as before, the GFCI device 10*b* assumes the post-test configuration 1002*b* as illustrated in FIG. 9 wherein in the event of a successful test of the combination solenoid coil and plunger assembly 8, the test initiation feature of the circuit 124 causes at least partial movement of the plunger 80 in the test direction 83' that is the same direction as the forward or fault direction as indicated by arrow 81 to move away from the resistive member 120 so as to sever contact between the first end 80*a* of the plunger 80 and the surface 120' of the resistive member 120, thereby decreasing the resistance sensed by the resistance sensor 122 from the first resistance value R1 to a second impedance value or load represented by second resistance value R2 characteristic of the resistive member 120. Conversely, in the event of an unsuccessful test of the combination solenoid coil and plunger assembly 8, the test initiation feature of the circuit 124 causes no or insufficient movement of the plunger 80 so that a sensible or measurable resistance substantially equal to the first resistance value R1 remains sensed or measurable by the resistance sensor 122. Again, in one embodiment, the sensing feature of the circuit 124 is electrically coupled to a microprocessor (not shown) residing on the printed circuit board 38 that annunciates, and/or trips the GFCI device 10*b*, in the event of failure of the self-test.

When the plunger 80 returns to the pre-test configuration 1002*a* following the post-test configuration 1002*b*, the plunger 80, and particularly the first end 80*a*, contacts the resistive member 120, and particularly the surface 120', to again produce a resistance output from the resistive member 120 that is substantially equal to the first resistance value R1 prior to the test. The connectors/connector terminals 122*a* and 122*b* connected to the resistance member 120 enable measurement by the resistance sensor 122 of the resistance output produced by the resistance member 120.

Those skilled in the art will recognize that the GFCI device 10*b* may also be configured with the test assembly 100 illustrated in FIGS. 6-7 wherein when the circuit interrupter 10' is in the pre-test configuration 1001*a* illustrated in FIG. 6, the plunger 80 is not in contact with the resistive member 120 so that the first impedance value or load represents an impedance value when the plunger 80 is not in contact with the resistive member 120. Conversely, when the circuit interrupter 10' is in the post-test configuration 1001*b* illustrated in FIG. 7, the plunger 80 is in contact with the resistive surface 120' so that the second impedance value or load represents an impedance value when the plunger 80 is in contact with the resistive member 120. The location of the resistive member(s) 120 may be adjusted accordingly.

In a similar manner as described above, those skilled in the art will recognize that GFCI device 10*b* is configured to perform an automatic self-test sequence on a periodic basis (e.g.,—every few cycles of alternating current (AC), hourly, daily, weekly, monthly, or other suitable time period) without the need for user intervention and, in addition, GFCI device 10*b* includes members, e.g., the test initiation and sensing circuit 124 and the test assembly 100*b*, that are configured to enable the self-test sequence or procedure to test the operability and functionality of the device's components up to and including the movement of the solenoid plunger 80.

Those skilled in the art will recognize that the self-test initiation to conduct the periodic self-test sequence may be implemented by a simple resistance-capacitance (RC) timer circuit, a timer chip such as a 555 timer, a microcontroller, another integrated circuit (IC) chip, or other suitable circuit. In addition, a manual operation by the user may trigger the self test sequence.

Figure 12:
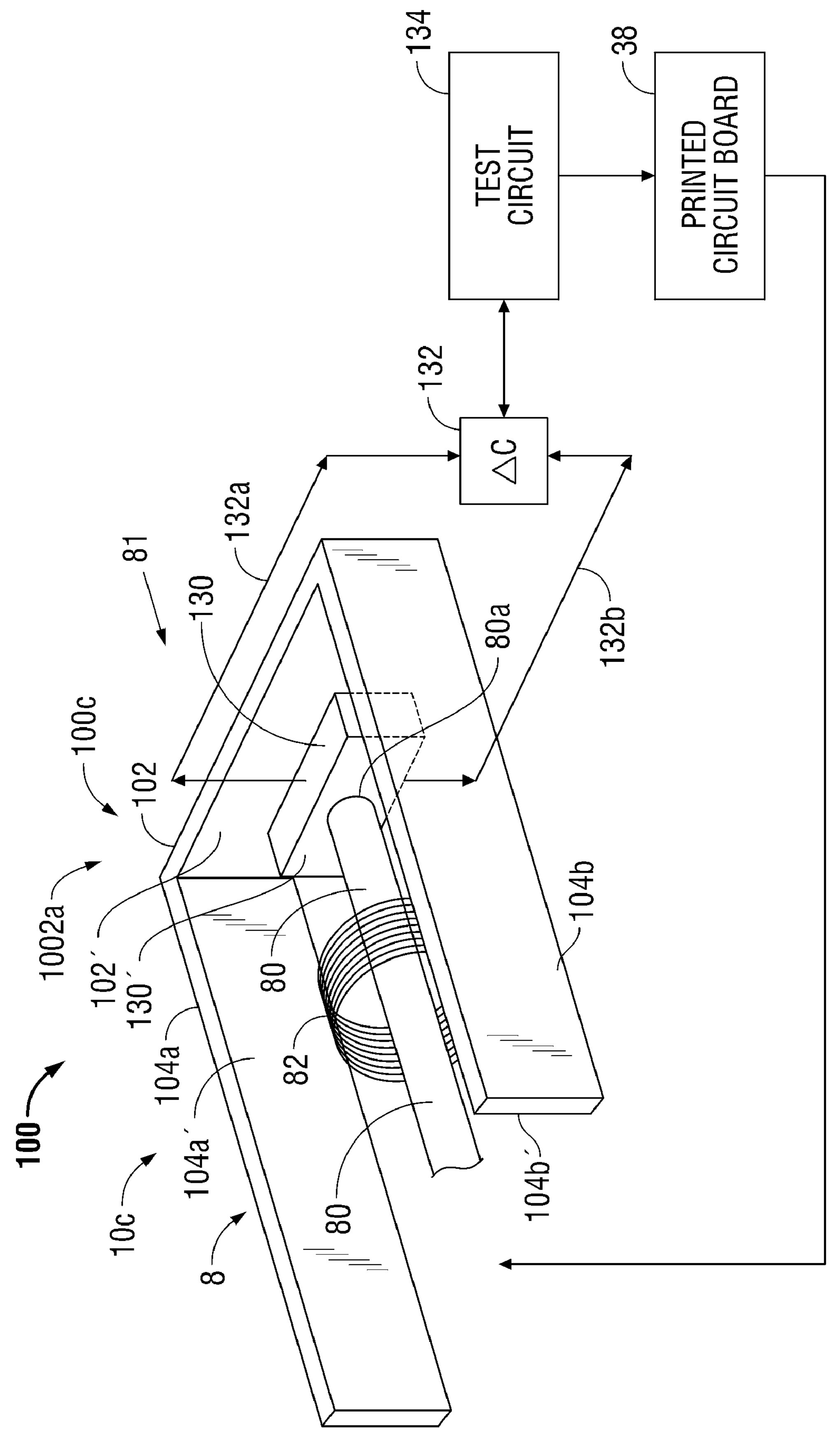
FIG. 12 is a perspective view of one embodiment of a part of a circuit interrupting device that is configured with a capacitive member to detect and sense solenoid plunger movement according to the present disclosure.

In a similar manner, FIG. 12 illustrates one embodiment of the present disclosure wherein the test assembly 100 of GFCI device 10 is defined by test assembly 100*c* wherein test assembly 100*c* includes as an electrical element a capacitive member in contact with plunger 80 in the pre-test configuration 1002*a* of the GFCI device 10, as illustrated in FIG. 8.

More particularly, GFCI device 10*c* is again similar to GFCI device 10*b* except that the resistive pad or indicator 120 of test assembly 100*b* is replaced by capacitive pad or indicator 130 of test assembly 100*c*, resistance sensor 122 and connector/connector terminals 122*a* and 122*b* of test assembly 100*b* are replaced by capacitance sensor 132 and connector/connector terminals 132*a* and 132*b*, respectively, of test assembly 100*c* and test initiation and test sensing circuit 124 of test assembly 100*b* is replaced by test initiation and test sensing circuit 134 of test assembly 100*c*. The capacitive pad or indicator or transducer, referred to as a capacitive member 130, has an initial charge providing an impedance value or load or a capacitance value or load C. Thus, the first end 80*a* of the plunger 80 is now in contact with surface 130' of capacitance member 130 when the combination solenoid coil and plunger assembly 8 is in the pre-test configuration 1002*a* so that the plunger 80 is disposed on the printed circuit board 38 with respect to the capacitive member 130 so that the first end 80*a* of the plunger 80 is in contact with the surface 130' to cause a sensible or measurable first impedance or capacitance value C1 (different from C) characteristic of the capacitive member 130 when the GFCI device 10*c* is in the pre-test configuration 1002*a*. In a similar manner, the capacitance sensor 132 is electrically coupled to the capacitive member 130 via first and second connectors/connector terminals 132*a* and 132*b*, respectively.

The test assembly 100*c* of GFCI device 10*c* again further includes a test initiation circuit and a test sensing circuit, which are illustrated schematically as a combined self-test initiation and test sensing circuit 134, although the test initiation features and the sensing features again can be implemented by separate circuits as previously described above. The capacitance sensor 132 is also electrically coupled to the sensing features of the circuit 134.

In a similar manner as before, the GFCI device 10 assumes the post-test configuration 1002*b* as illustrated in FIG. 9 wherein in the event of a successful test of the combination solenoid coil and plunger assembly 8, the test initiation feature of the circuit 134 causes at least partial movement of the plunger 80 in the test direction 83' that is the same direction as the forward or fault direction as indicated by arrow 81 to move away from the capacitive member 130 so as to sever contact between the first end 80*a* of the plunger 80 and the surface 130' of the capacitive member 130, thereby decreasing the capacitance sensed by the capacitance sensor 132 from the first capacitance value C1 to a second impedance or capacitance value C2 characteristic of the capacitive member 130 when the plunger 80 is not in contact with the capacitive member 130. Conversely, in the event of an unsuccessful test of the combination solenoid coil and plunger assembly 8, the test initiation feature of the circuit 134 causes no or insufficient movement of the plunger 80 so that a measurable capacitance substantially equal to the first capacitance value C1 remains sensed or measurable by the capacitance sensor 132. Again, in one embodiment, the sensing feature of the circuit 134 is electrically coupled to a microprocessor (not shown) residing on the printed circuit board 38 that annunciates, or trips the GFCI device 10*c*, in the event of failure of the self-test.

When the plunger 80 returns to the pre-test configuration 1002*a* following the post-test configuration 1002*b*, the plunger 80, and particularly the first end 80*a*, contacts the capacitive member 130, and particularly the surface 130', to again produce a capacitance output from the capacitive member 130 that is substantially equal to the first capacitance value prior to the test. The connectors/connector terminals 132*a* and 132*b* connected to the capacitance member 130 enable measurement by the capacitance sensor 132 of the capacitance output produced by the capacitance member 130.

Those skilled in the art will recognize that the GFCI device 10*c* may also be configured with the test assembly 100 illustrated in FIGS. 6-7 wherein when the circuit interrupter 10' is in the pre-test configuration 1001*a* illustrated in FIG. 6, the plunger 80 is not in contact with the capacitive member 130 so that the first impedance value represents an impedance value or load when the plunger 80 is not in contact with the capacitive member 130. Conversely, when the circuit interrupter 10' is in the post-test configuration 1001*b* illustrated in FIG. 7, the plunger 80 is in contact with the capacitive surface 130' so that the second impedance value represents an impedance value or load when the plunger 80 is in contact with the capacitive member 130. The location of the capacitive member(s) 130 may be adjusted accordingly.

In a similar manner as described above, those skilled in the art will recognize that GFCI device 10*c* is configured to perform an automatic self-test sequence on a periodic basis (e.g.,—every few cycles of alternating current (AC), hourly, daily, weekly, monthly, or other suitable time period) without the need for user intervention and, in addition, GFCI device 10*c* includes members, e.g., the test initiation and sensing circuit 134 and the test assembly 100*c*, that are configured to enable the self-test sequence or procedure to test the operability and functionality of the device's components up to-and including the movement of the solenoid plunger 80.

Those skilled in the art will recognize that the self-test initiation to conduct the periodic self-test sequence may be implemented by a simple resistance-capacitance (RC) timer circuit, a timer chip such as a 555 timer, a microcontroller, another integrated circuit (IC) chip, or other suitable circuit. In addition, a manual operation by the user may trigger the self test sequence.

Figure 13:
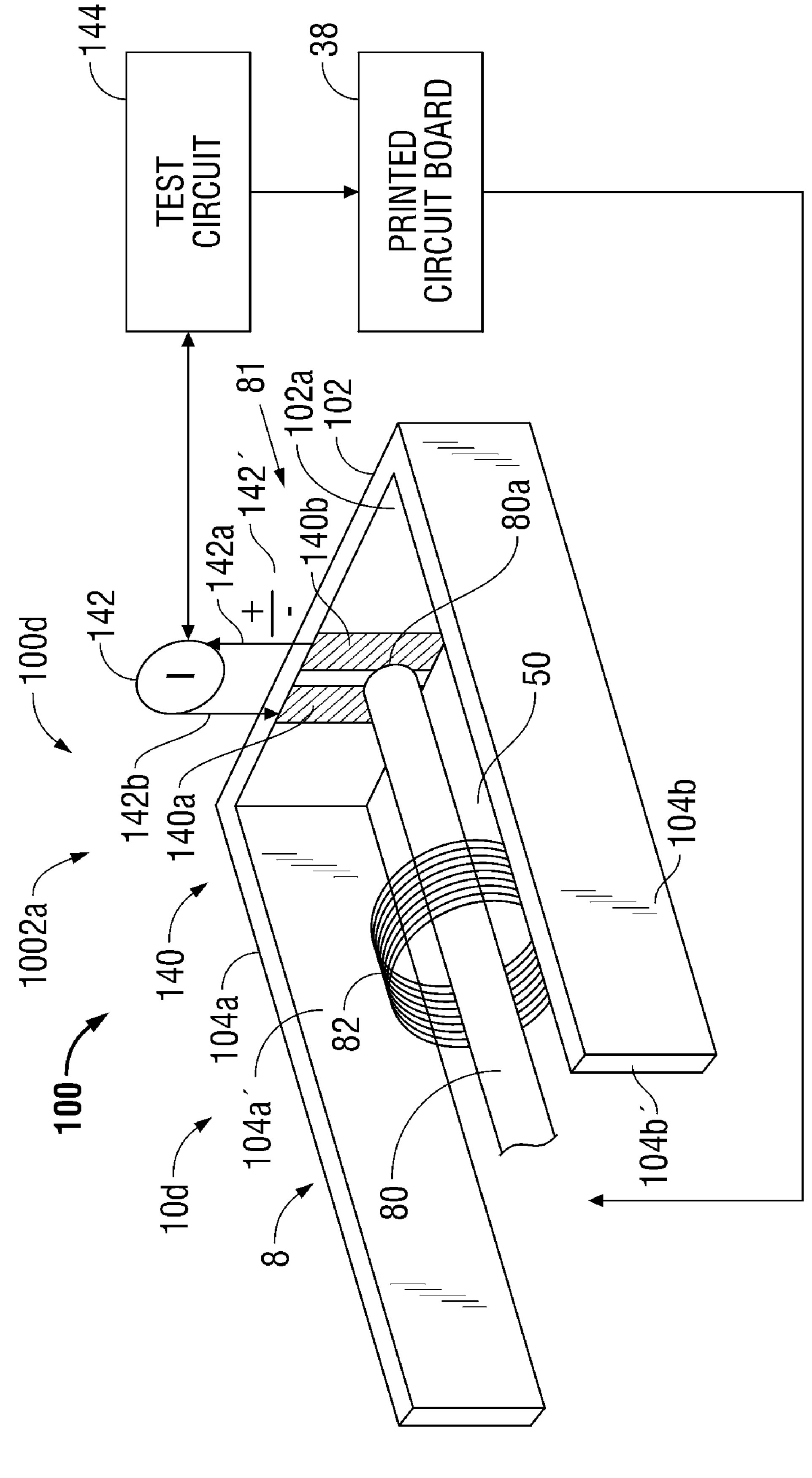
FIG. 13 is a perspective view of one embodiment of a part of a circuit interrupting device that is configured with conductive members forming a conductive path to detect and sense solenoid plunger movement according to the present disclosure.

In a still similar manner, FIG. 13 illustrates one embodiment of the present disclosure wherein test assembly 100 of GFCI device 10 is defined by test assembly 100*d* wherein test assembly 100*d* includes as at least one electrical element conductive material in contact with the plunger during the pre-test configuration 1002*a* of the GFCI device 10 as illustrated in FIG. 8. More particularly, GFCI device 10*d* is again essentially identical to GFCI device 10*b* except that the resistive member 120 of test assembly 100*b* is replaced by first and second electrically conductive members 140*a* and 140*b*, e.g., conductive tape strips or similarly configured material, respectively, of test assembly 100*d*, resistance sensor 122 and connector/connector terminals 122*a* and 122*b* of test assembly 100*b* are replaced by current sensor 142 and connector/connector terminals 142*a* and 142*b*, respectively, of test assembly 100*d*, and test initiation and test sensing circuit 124 of test assembly 100*b* is replaced by test initiation and test sensing circuit 144 of test assembly 100*d*.

In addition, test assembly 100*d* includes a current source 142' such as a power supply that is disposed with respect to a circuit 140 formed by the first and second electrically conductive tape strips 140*a* and 140*b*, respectively, the current sensor 142 and the connector/connector terminals 142*a* and 142*b* to enable an electrically conductive path therein. In place of a power supply, current may be supplied to the circuit 140, in the same manner as with respect to the fault or failure sensing circuit described above, the current for the electrically conductive tape strips 142*a* and 142*b* may be supplied by a circuit that is electrically coupled to the printed circuit board 38 and the connection points of the tape can be positioned anywhere on the printed circuit board. The first and second electrically conductive members 140*a* and 140*b*, respectively, are disposed on the surface 102' of the rear support member 102 to be electrically isolated from one another and with respect to the solenoid coil and plunger 80 such that when the plunger 80 is in pre-test configuration 1002*a*, the first end 80*a* of the plunger 80 makes electrical contact with both the first and second conductive members 140*a* and 140*b*, respectively, to form a continuous electrical circuit or conductive path.

In a similar manner as the previous embodiments, the test assembly 100*d* of GFCI device 10*d* again further includes a test initiation circuit and a test sensing circuit, which are illustrated schematically as a combined self-test initiation and sensing circuit 144, although again the test initiation features and the test sensing features again can be implemented by separate circuits as described above. The current sensor 142 is also electrically coupled to the sensing features of the circuit 144. In addition, the current source 142', when it is an independent member such as a power supply, is also electrically coupled to the sensing features of the circuit 144.

In a similar manner as before, the GFCI device 10 assumes the post-test configuration 1002*b* as illustrated in FIG. 9 wherein in the event of a successful test of the combination solenoid coil and plunger assembly 8, the test initiation feature of the circuit 144 causes at least partial movement of the plunger 80 in test direction 83' which is the same direction as the forward or fault direction as indicated by arrow 81 to move away from the first and second electrically conductive members 140*a* and 140*b*, respectively, so as to sever contact between the first end 80*a* of the plunger 80 and the conductive members 140*a* and 140*b*, thereby terminating the conductive path that allows the current I in the circuit 140.

Conversely, in the event of an unsuccessful test of the combination solenoid coil and plunger assembly 8, the test initiation feature of the circuit 144 causes no or insufficient movement of the plunger 80, the conductive path provided by the circuit 140 is maintained so that a sensible or measurable current I' substantially equal to the first current I remains sensed or measurable by the current sensor 142. Since the test sensing feature of the circuit 144 is also electrically coupled to the current source 142' to verify the presence of current I prior to the test, the chances of a false indication of a successful test are reduced. Again, in one embodiment, the sensing feature of the circuit 144 is electrically coupled to a microprocessor (not shown) residing on the printed circuit board 38 that annunciates, or trips the GFCI device 10*d*, in the event of failure of the self-test.

When the plunger 80 returns to the pre-test configuration 1002*a* following the post-test configuration 1002*b*, the plunger 80, and particularly the first end 80*a*, contacts the conductive members 140*a* and 140*b* to again provide electrical continuity to electrical circuit 140 to produce a current that that is substantially equal to the first current value I prior to the test. The connectors/connector terminals 142*a* and 142*b* connected to the current sensor 142 enable measurement by the current sensor 142 of the current I.

Thus the first and second conductive members 140*a* and 140*b*, respectively, are configured wherein when the plunger 80 is in pre-test configuration 1002*a*, the plunger 80 is in contact with the first and second conductive members 140*a* and 140*b*, respectively, forming a conductive path there between. Upon the plunger 80 entering the post-test configuration 1002*b* to move away from at least one of the first and second conductive members 140*a* and 140*b*, respectively, continuity of the conductive path of circuit 140 is terminated. Measurement, via the connectors/connector terminals 142*a* and 142*b* that is indicative of termination of the continuity of the conductive path of circuit 140 is indicative of movement of the plunger 80.

In a similar manner as described above, those skilled in the art will recognize that the GFCI device 10*d* may also be configured with the test assembly 100 illustrated in FIGS. 6-7 wherein when the circuit interrupter 10' is in pre-test configuration 1001*a*, the plunger 80 is not in contact with the conductive members 140*a* and 140*b* when the circuit interrupter 10' is in a the pre-test configuration 1001*a* and wherein when the circuit interrupter 10' is in the post-test configuration 1001*b*, the conductive members 140*a* and 140*b* are in contact with the plunger 80. The location of the conductive member (s) 140*a* and 140*b* may be adjusted accordingly.

Again, in a similar manner as described above, those skilled in the art will recognize that GFCI device 10*d* is configured to perform an automatic self-test sequence on a periodic basis (e.g.,—every few cycles of alternating current (AC), hourly, daily, weekly, monthly, or other suitable time period) without the need for user intervention and, in addition, GFCI device 10*d* includes members, e.g., the test initiation and sensing circuit 144 and the test assembly 100*d*, that are configured to enable the self-test sequence or procedure to test the operability and functionality of the device's components up to and including the movement of the solenoid plunger 80.

Those skilled in the art will recognize that the self-test initiation to conduct the periodic self-test sequence may be implemented by a simple resistance-capacitance (RC) timer circuit, a timer chip such as a 555 timer, a microcontroller, another integrated circuit (IC) chip, or other suitable circuit. In addition, a manual operation by the user may trigger the self test sequence.

Those skilled in the art will recognize that, when the at least one electrical element is characterized by an impedance load, e.g., an inductor or inductive member (not shown), the at least one electrical element may be disposed such that when the plunger 80 is in the proximity of the electrical element, a first impedance value characteristic thereof is produced by the at least one electrical element, and when the plunger 80 is not in the proximity of the at least one electrical element, a second impedance value characteristic thereof is produced by the at least one electrical element.

Turning now to FIGS. 14 and 15, again in conjunction with FIGS. 2-5, there is illustrated a simplified view of a test assembly 100' that is in all respects identical to test assembly 100 except that test assembly 100' includes at least one sensor as exemplified by first sensor 1010*a* and second sensor 1010*b* that are disposed such that the plunger 80 travels in fault direction 81 and the sensors 1010*a* and 1010*b* are oppositely positioned with respect to each other on either side of the path of travel of the plunger in the fault direction 81 such that neither end 80*a*, designated as the rear end 80*a* of the plunger 80, nor front end 80*b* of the plunger 80, come into contact with either of the sensors 1010*a* or 1010*b*, although other portions of the plunger 80 may come into contact therewith. The positioning of the sensors 1010*a* and 1010*b* establish a path 160' between sensor 1010*a* on one side of the path of travel of the plunger in the test direction 83' and sensor 1010*b* on the opposite side of the path of travel of the plunger in the test direction 83'.

Figure 14:
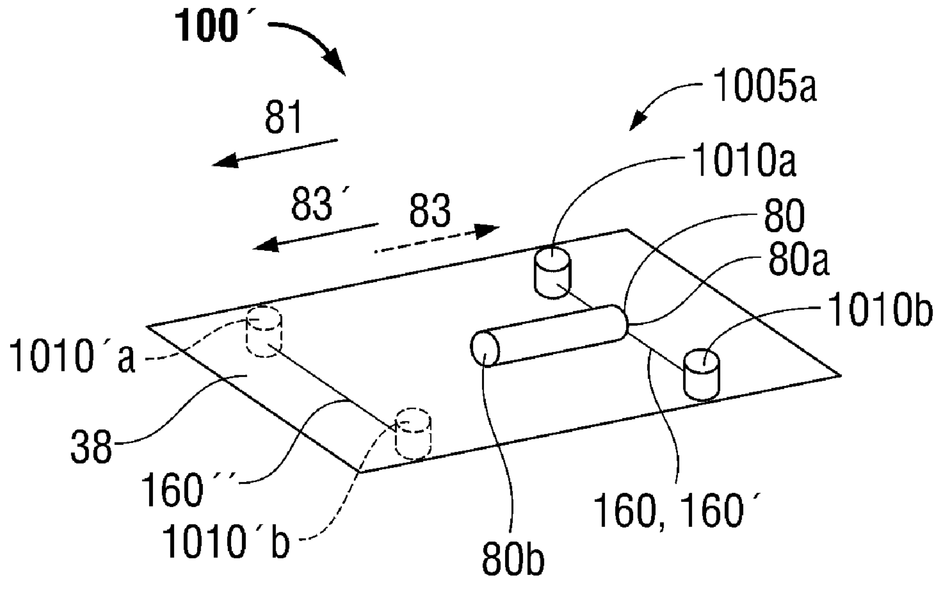
FIG. 14 is a simplified perspective view of a test assembly of a circuit interrupting device according to the present disclosure in a pre-test configuration wherein a solenoid plunger is in a position with respect to at least one sensor in a pre-test configuration.
Figure 15:
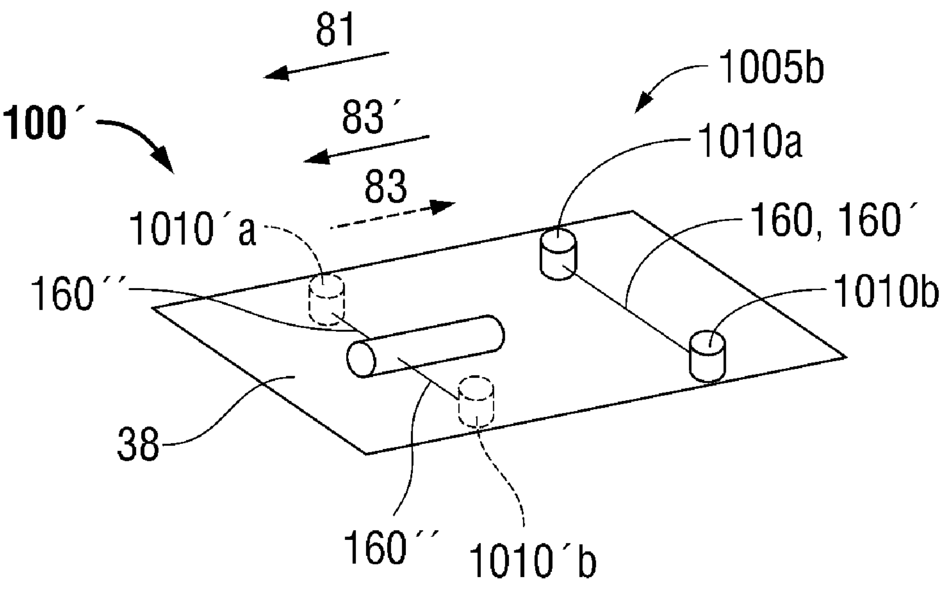
FIG. 15 is a simplified perspective view of the test assembly of the circuit interrupting device of FIG. 14 wherein the solenoid plunger is in another position with respect to at least one sensor in a post-test configuration.

The test assembly 100' is configured wherein when the plunger 80 is in a pre-test configuration 1005*a*, as illustrated in FIG. 14, the plunger 80 is in a first position with respect to the sensors 1010*a* and 1010*b* and when the plunger is in a post-test configuration 1005*b*, as illustrated in FIG. 15, the plunger 80 is in a second position with respect to the sensors 1010*a* and 1010*b*.

More particularly, in the exemplary embodiment illustrated in FIG. 14, when the GFCI device 10 assumes the pre-test configuration 1005*a*, the plunger 80 is in the first position between the sensors 1010*a* and 1010*b* in the path 160' between the sensors 1010*a* and 1010*b*. As illustrated in FIG. 15, when the GFCI device 10 assumes the post-test configuration 1005*b*, the plunger 80 travels in the test direction 83' that is in the same direction as the fault direction 81 such that the plunger 80 is in the second position that is not in the path 160' between sensor 1010*a* and sensor 1010*b*.

Those skilled in the art will recognize that when the GFCI device 10 assumes the post-test configuration 1005*b*, the plunger 80 may travel to a second position that is between sensors 1010*a* and 1010*b* in the path 160' but such that the second position with respect to the sensors 1010*a* and 1010*b* differs from the first position with respect to the sensors 1010*a* and 1010*b*.

Referring again to FIG. 14, in an alternate exemplary embodiment, the test assembly 100' may include at least one sensor as exemplified by first sensor 1010'*a* and second sensor 1010'*b* that are also disposed such that the plunger 80 travels in fault direction 81 and the sensors 1010'*a* and 1010'*b* are oppositely positioned with respect to each other on either side of the path of travel of the plunger in the fault direction 81 such that neither end 80*a*, designated as the rear end 80*a* of the plunger 80, nor front end 80*b* of the plunger 80, come into contact with either of the sensors 1010'*a* or 1010'*b*, although again other portions of the plunger 80 may come into contact therewith. In a similar manner, the positioning of the sensors 1010'*a* and 1010'*b* establish a path 160" between sensor 1010'*a* on one side of the path of travel of the plunger in the test direction 83' and sensor 1010'*b* on the opposite side of the path of travel of the plunger in the test direction 83'.

The test assembly 100' is now configured wherein when the plunger 80 is in the pre-test configuration 1005*a*, as illustrated in FIG. 14, the plunger 80 is in a first position with respect to the sensors 1010'*a* and 1010'*b* and when the plunger is in the post-test configuration 1005*b*, as illustrated in FIG. 15, the plunger 80 is in a second position with respect to the sensors 1010'*a* and 1010'*b*.

More particularly, in the exemplary embodiment illustrated in FIG. 14, when the GFCI device 10 assumes the pre-test configuration 1005*a*, the plunger 80 is in a position that is not between the sensors 1010'*a* and 1010'*b* and not in the path 160" between the sensors 1010*a* and 1010*b*. As illustrated in FIG. 15, when the GFCI device 10 assumes the post-test configuration 1005*b*, the plunger 80 travels in the test direction 83' that is in the same direction as the fault direction 81 such that the plunger 80 is in a position that is in the path 160" between sensor 1010'*a* and sensor 1010'*b*.

Those skilled in the art will again recognize that when the GFCI device 10 assumes the post-test configuration 1005*b*, the plunger 80 may travel to a second position that is not between sensors 1010'*a* and 1010'*b* in the path 160" but such that the second position with respect to the sensors 1010'*a* and 1010'*b* differs from the first position with respect to the sensors 1010'*a* and 1010'*b*.

In view of FIGS. 14 and 15, FIGS. 16 and 17 illustrate corresponding specific examples of embodiments of a GFCI device according to the present disclosure wherein the test assembly 100 of GFCI device 10 is defined by test assemblies 100*e* and 100*f* wherein test assemblies 100*e* and 100*f* have at least one sensor that is configured and disposed wherein the plunger 80 is not in contact with the one or more sensors when combination solenoid coil and plunger assembly 8 is in the pre-test configuration 1005*a*, and wherein the plunger 80 is not in contact with the one or more sensors when the combination solenoid coil and plunger assembly 8 is in the post-test configuration 1005*b*.

Figure 16:
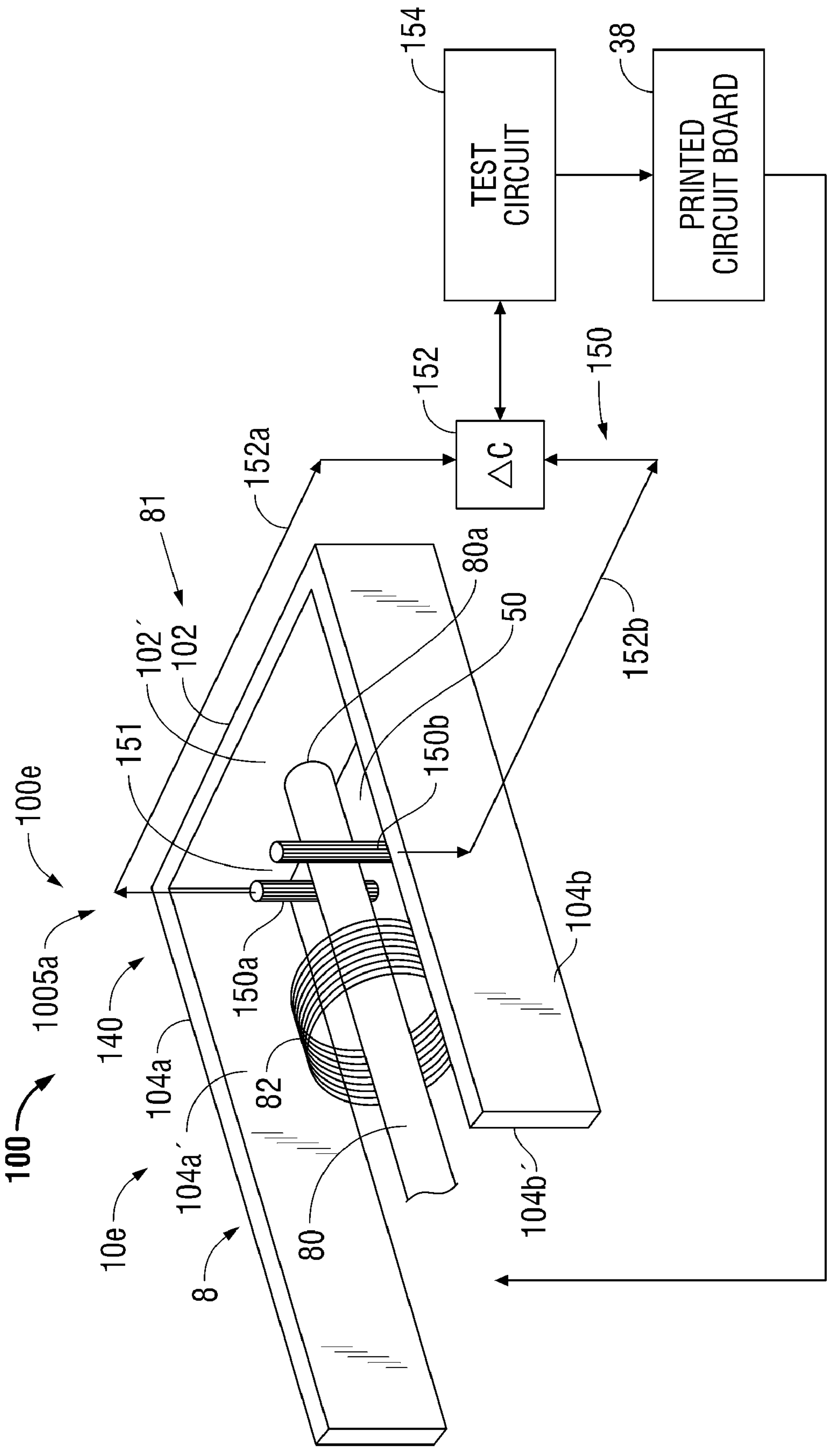
FIG. 16 is a perspective view of one embodiment of a part of a circuit interrupting device that is configured with conductive members providing capacitance to detect and sense solenoid plunger movement according to the present disclosure.

More particularly, referring to FIG. 16, test assembly 100*e* of GFCI device 10*e* includes as at least one sensor and correspondingly as at least one electrical element a first conductive member 150*a* and a second conductive member 150*b*. The first and second conductive members 150*a* and 150*b* are configured in the exemplary embodiment of FIG. 16 as a pair of cylindrically shaped pins within the cavity 50 and disposed in a parallel configuration with respect to each other to form a space or region 151 there between. (Those skilled in the art will recognize that first and second conductive members 150*a* and 150*b* correspond to first and second sensors 1010*a* and 1010*b* in FIGS. 14 and 15). A capacitance sensor 152 is electrically coupled to the first and second conductive members 150*a* and 150*b* via first and second connectors/connector terminals 152*a* and 152*b*, respectively, to form a circuit 150. The first conductive member 150*a* is electrically coupled to the first connector/connector terminal 152*a* while the second conductive member 150*b* is electrically coupled to the second connector/connector terminal 152*b*. The conductive members 150*a* and 150*b* have an initial charge providing a capacitance value or load C'.

The combination solenoid coil and plunger assembly 8 is disposed on the printed circuit board 38 with respect to the conductive members 150*a* and 150*b* so that the plunger 80 is disposed in the region 151 between the conductive members 150*a* and 150*b*. The GFCI device 10*e* again further includes a test initiation circuit and a test sensing circuit, which are illustrated schematically as a combined self-test initiation and test sensing circuit 154, although the test initiation features and the sensing features can be implemented by separate circuits again as described above. The capacitance sensor 152 is also electrically coupled to the sensing features of the circuit 154.

When the plunger 80 is in a position indicative of the pre-test configuration 1005*a* of the GFCI device 10*e*, the plunger 80 is not in contact with the first and second conductive members 150*a* and 150*b*, respectively, and is in a position with respect to the first and second conductive members 150*a* and 150*b*, respectively, that is indicative of a first capacitance value C1' that differs from capacitance value C' by a predetermined value due to the presence of the plunger 80 in the region 151. The predetermined value may be defined as a predetermined range of values that are more than, equal to, or less than the predetermined value. In the example illustrated in FIG. 16, the plunger 80 is illustrated between the first and second conductive members 150*a* and 150*b*, respectively, when the plunger 80 is in a position indicative of the pre-test configuration 1005*a* of the GFCI device 10*e*.

Conversely, when the plunger 80 is in a position indicative of the post-test configuration 1005*b* of the GFCI device 10*e*, the plunger 80 is again not in contact with the first and second conductive members 150*a* and 150*b*, respectively, and additionally the plunger 80 is in a position with respect to, e.g., that is not between, the conductive members 150*a* and 150*b* (corresponding to first and second sensors 1010*a* and 1010*b* in FIG. 15) and that is indicative of a second capacitance value C2' that differs from both capacitance C' and C1' due to the absence of the plunger 80 in the region 151. The value of the capacitance C2' returns to the value of the capacitance C1' when the plunger 80 returns to the pre-test configuration 1005*a*, within a tolerance range of values that may be predetermined depending upon the particular physical characteristics of the GFCI device 100*e* and the materials from which it is constructed. Again, the predetermined value may be defined as a predetermined range of values that are more than, equal to, or less than the predetermined value.

In the event of a successful test of the combination solenoid coil and plunger assembly 8, the test initiation feature of the circuit 154 causes at least partial movement of the plunger 80 in the test direction 83' that is in the same direction as the forward or fault direction as indicated by arrow 81 so as to move the plunger 80 out of the region 151 between conductive members 150*a* and 150*b*, thereby changing the capacitance sensed by the capacitance sensor 152 from C1' to C2'. The difference between the second capacitance value C2' and the first capacitance value C1' that is indicative of movement of the plunger 80 is a predetermined value, wherein the predetermined value may be a predetermined range of values that is more than, equal to, or less than the to predetermined value, that is also determined and is dependent upon the particular physical characteristics of the GFCI device 100*e* and the materials from which it is constructed.

Conversely, in the event of an unsuccessful test of the combination solenoid coil and plunger assembly 8, the test initiation feature of the circuit 154 causes no or insufficient movement of the plunger 80 so that capacitance sensed by the capacitance sensor 152 remains at or nearly equal to C2' in the circuit 150. In one embodiment, the test sensing feature of the circuit 154 is similarly electrically coupled to a microprocessor (not shown) residing on the printed circuit board 38 that annunciates, or trips the GFCI device 10*b*, in the event of failure of the self-test.

When the plunger 80 returns to the pre-test configuration 1005*a* following the post-test configuration 1005*b*, the plunger 80 returns substantially to its original position in the region 151 to again produce a capacitance value substantially of C1' in the circuit 150. The connectors/connector terminals 152*a* and 152*b* connected to the conductive members 150*a* and 150*b* enable measurement of the capacitance of the conductive members 150*a* and 150*b* by the capacitance sensor 152.

In a similar manner as described above, those skilled in the art will recognize that GFCI device 10*e* is configured to perform an automatic self-test sequence on a periodic basis (e.g.,—every few cycles of alternating current (AC), hourly, daily, weekly, monthly, or other suitable time period) without the need for user intervention and, in addition, GFCI device 10*e* includes members, e.g., the test initiation and sensing circuit 154 and the test assembly 100*e*, that are configured to enable the self-test sequence or procedure to test the operability and functionality of the device's components up to and including the movement of the solenoid plunger 80.

Those skilled in the art will recognize that the self-test initiation to conduct the periodic self-test sequence may be implemented by a simple resistance-capacitance (RC) timer circuit, a timer chip such as a 555 timer, a microcontroller, another integrated circuit (IC) chip, or other suitable circuit. In addition, a manual operation by the user may trigger the self test sequence.

Referring now to FIG. 17, and again in view of FIGS. 14 and 15, test assembly 100*f* of GFCI device 10*f* includes an optical emitter 160*a* and as at least one sensor an optical sensor 160*b*, e.g., an infrared sensor, that is disposed within the GFCI device 10*f* to receive light, e.g., infrared (IR) light, and particularly a light beam emitted from an optical emitter 160*a*, e.g., an infrared emitter. Those skilled in the art will recognize that although optical emitter 160*a* is not functioning herein as a sensor, for the purposes of the discussion herein, optical emitter 160*a* and optical sensor 160*b* correspond to the first sensor 1010*a* and second sensor 1010*b* in FIGS. 14 and 15, respectively. The optical sensor 160*b* may be an electrical element, or a non-electrical element such as a purely photonic element.

Figure 17:
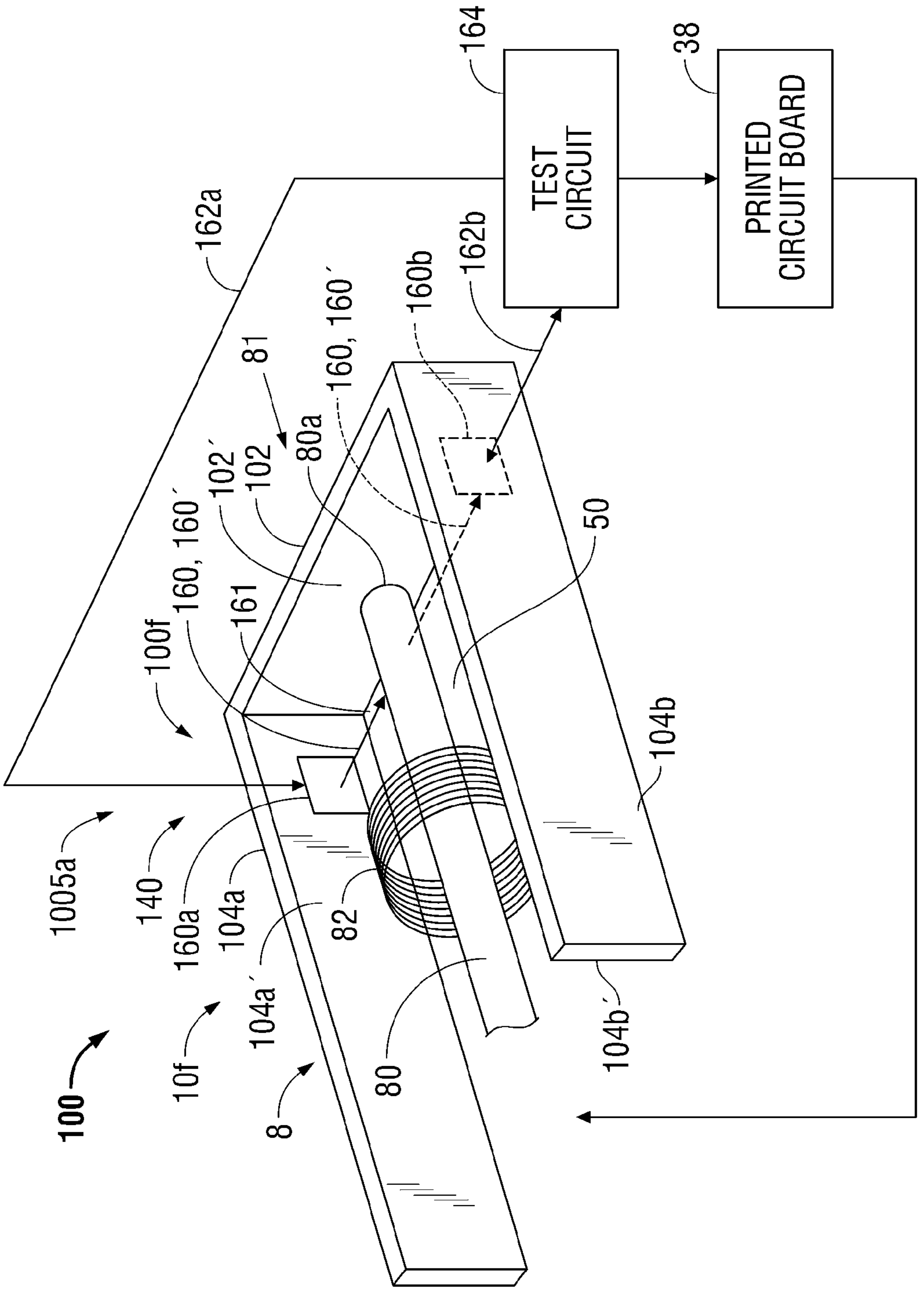
FIG. 17 is a perspective view of one embodiment of a part of a circuit interrupting device that is configured with an optical emitter and an optical sensor to detect and sense solenoid plunger movement according to the present disclosure.

The optical emitter 160*a* and the optical sensor 160*b* are configured in the exemplary embodiment of FIG. 17 as a pair of plate-like films disposed respectively on the surfaces 104*a*' and 104*b*' of the first and second lateral support members 104*a* and 104*b*, respectively, in an interfacing parallel configuration with respect to each other to form a space or region 161 there between and so as to enable the optical emitter 160*a* to emit light beam 160 in a path 160' from the emitter 160*a* to the sensor 160*b*.

The test assembly 100*f* of GFCI device 10*f* again further includes a test initiation circuit and a test sensing circuit, which are illustrated schematically as a combined self-test initiation and sensing circuit 164, although again the test initiation features and the sensing features can be implemented by separate circuits as described above. The test initiation feature of the circuit 164 is electrically coupled to the infrared emitter 160*a* while the sensing feature of the circuit 164 is electrically coupled to the infrared sensor 160*b*. The combination solenoid coil and plunger assembly 8 is disposed on the printed circuit board 38 and configured so that, when the plunger 80 is in a position indicative of the pre-test configuration 1005*a*, the plunger 80 interrupts the path 160' of the light beam 160 emitted from the optical emitter 160*a*. In one embodiment, the light 160 is emitted from the emitter 160*a* only when initiated by the test initiation feature of the circuit 164.

Conversely, when the plunger 80 transfers to the post-test configuration 1005*b* to move away from the position indicative of the pre-test configuration 1005*a*, e.g., such as by at least partial movement of the plunger 80 in the test direction 83' that is in the same direction as the forward or fault direction as indicated by arrow 81 to move out of the path 160' of the light beam 160, the movement of the plunger 80 enables the light beam 160 to propagate in a path, i.e., path 160', e.g., a continuous or direct path, from the optical emitter 160*a* to the optical sensor 160*b*. Thus, measurement via the optical sensor 160*b* of the continuity of the path 160' of the light beam 160' is indicative of movement of the plunger 80.

In a similar manner as described above for the GFCI devices 10*a* to 10*e*, in the event of a successful test of the combination solenoid coil and plunger assembly 8, a signal by the test initiation feature of the circuit 164 initiates emission of the light beam 160 and causes at least partial movement of the plunger 80 in the test direction 83' that is in the same direction as the forward or fault direction as indicated by arrow 81 so as to move the plunger 80 out of the path 160' to provide continuity of the path 160' from the emitter 160*a* to the sensor 160*b*.

Conversely, in the event of an unsuccessful test of the combination solenoid coil and plunger assembly 8, a signal by the test initiation feature of the circuit 164 causes no or insufficient movement of the plunger 80 so that the plunger 80 remains in the path 160' of the light beam 160. Since the plunger 80 is illustrated in FIG. 17 as interrupting the light beam 160, i.e., remaining in the path 160', the light beam 160 is shown as a dashed line. When the plunger 80 returns to the pre-test configuration 1005*a* following the post-test configuration 1005*b*, the plunger 80 returns substantially to its original position so as to interrupt the path 160' to enable verification of the plunger 80 being again in the proper position indicative of the pre-test configuration 1005*a* so that the plunger 80 again interrupts the path 160' of the light beam 160 emitted from the optical emitter 160*a*.

Those skilled in the art will recognize that the optical emitter 160*a* and the optical sensor 160*b* may be configured with respect to the plunger 80 wherein when the plunger 80 is in a position indicative of the pre-test configuration 1005*a*, the light beam 160 propagates in a path 160", e.g., a continuous or direct path, from the optical emitter 160*a* to the optical sensor 160*b* (corresponding to first and second sensors 1010'*a* and 1010'*b*, respectively, in FIGS. 14 and 15). Upon the plunger 80 transferring to the post-test configuration 1005*b* to move away, in the test direction 83' that is in the same direction as the fault direction 81, from the position indicative of the pre-test configuration 1005*a*, the movement of the plunger 80 enables the plunger 80 to at least partially interrupt the path 160' of the light beam 160 emitted from the optical emitter 160*a* to the optical sensor 160*b*. In this embodiment, measurement via the optical sensor 160*b* of discontinuity of the path 160' of the light beam 160 is indicative of movement of the plunger 80. Measurement via the optical sensor 160*b* of continuity of the path 160' of the light beam 160 following a test initiation signal is indicative of no or insufficient movement of the plunger 80.

Those skilled in the art will recognize also that the optical emitter 160*a* and the optical sensor 160*b* may be configured with respect to the plunger 80 in a pre-test configuration that is identical to the post-test configuration 1005*b* illustrated in FIG. 15 and such that the plunger 80 transfers from the pre-test configuration to a post-test configuration that is identical to the pre-test configuration 1005*a* illustrated in FIG. 14 by at least partial movement of the plunger 80 in the test direction 83 that is opposite to the fault direction 81 so that the plunger 80 interrupts the path 160' of the light beam 160 emitted from the optical emitter 160*a*. Those skilled in the art will recognize also that measurement via the optical sensor 160*b* of discontinuity of the path 160' of the light beam 160 is indicative of movement of the plunger 80 and that measurement via the optical sensor 160*b* of continuity of the path 160' of the light beam 160 following a test initiation signal is indicative of no or insufficient movement of the plunger 80.

Again, in a similar manner as described above, those skilled in the art will recognize that GFCI device 10*f* is configured to perform an automatic self-test sequence on a periodic basis (e.g.,—every few cycles of alternating current (AC), hourly, daily, weekly, monthly, or other suitable time period) without the need for user intervention and, in addition, GFCI device 10*f* includes members, e.g., the test initiation and sensing circuit 164 and the test assembly 100*f*, that are configured to enable the self-test sequence or procedure to test the operability and functionality of the device's components up to and including the movement of the solenoid plunger 80.

Those skilled in the art will recognize that the self-test initiation to conduct the periodic self-test sequence may be implemented by a simple resistance-capacitance (RC) timer circuit, a timer chip such as a 555 timer, a microcontroller, another integrated circuit (IC) chip, or other suitable circuit. In addition, a manual operation by the user may trigger the self test sequence.

Those skilled in the art will recognize that although the test assembly 100, includes a test initiation circuit that is configured to initiate and conduct an at least partial operability test of the circuit interrupter, e.g., GFCI device 10, and a test sensing circuit that is configured to sense a result of the at least partial operability test of the circuit interrupter or GFCI device 10,has been illustrated in FIGS. 10-13 and 16-17 to be disposed at one particular location within the GFCI device 10 with respect to the combination coil and plunger assembly 8, the test assembly 100 may be disposed at other suitable locations within the GFCI device 10 or otherwise suitably dispersed or suitably integrated within the GFCI device 10 to perform the intended function of self initiating and conducting an at least partial operability test of the GFCI device 10.

As can be appreciated from the aforementioned disclosure, referring to FIGS. 1-17, the present disclosure relates also to a corresponding method of testing a circuit interrupting device, e.g., GFCI device 10, that includes the steps of generating an actuation signal, e.g., such as an actuation signal generated by test initiation and sensing circuit 114 in FIG. 10, test initiation and sensing circuit 124 in FIG. 11, test initiation and sensing circuit 134 in FIG. 12, test initiation and sensing circuit 144 in FIG. 13; test initiation and sensing circuit 154 in FIG. 16, and test initiation and sensing circuit 164 in FIG. 17; and causing a plunger, e.g., plunger 80, to move in response to the actuation signal, without causing the circuit interrupting device, e.g., GFCI device 10, to trip.

The method also includes measuring the movement of the plunger 80, e.g., measuring via piezoelectric member 110 in FIG. 10, or resistive member 120 in FIG. 11, or capacitive member 130 in FIG. 12, or conductive members 140*a* and 140*b* in FIG. 13, or conductive pins 150*a* and 150*b* in FIG. 16, or optical emitter 160*a* and optical sensor 160*b* in FIG. 17; and determining whether the movement reflects an operable circuit interrupting device, e.g., whether movement of the plunger 80 is indicative of sufficient movement of the plunger 80 during a required real transfer of the circuit interrupting device, e.g. GFCI device 10, from a non-actuated configuration to an actuated configuration.

The step of causing the plunger 80 to move in response to the actuation signal may be performed by causing the plunger 80 to move in a test direction that is in the same direction as the fault direction, e.g., test direction 83' that is in the same direction as the fault direction 81. Alternatively, the step of causing the plunger 80 to move in response to the actuation signal may be performed by causing the plunger 80 to move in a test direction that is in a direction different from the fault direction, e.g., test direction 83 that is in a direction different from the fault direction 81, including a direction that is opposite to the fault direction 81.

The method of testing the GFCI device 10, wherein when the GFCI device 10*a* is in a pre-test configuration, e.g., pre-test configuration 1002*a* described above with respect to FIG. 8, at least one piezoelectric member, e.g., piezoelectric pad or sensor 110 described above with respect to FIG. 10 produces substantially no voltage when the plunger 80 is in substantially stationary contact with the piezoelectric member 110 or when the plunger 80 is not in contact with the piezoelectric member, may be implemented wherein the step of causing the plunger 80 to move in response to the actuation signal may be performed by causing the plunger 80 to dynamically contact the at least one piezoelectric pad or sensor 110 to produce a voltage output.

The step of determining whether the movement reflects an operable circuit interrupting device may be performed by determining whether the voltage output is indicative of movement of the plunger 80 that is indicative of sufficient movement of the plunger 80 during a required real transfer of the circuit interrupting device, e.g., GFCI device 10*a*, from a non-actuated configuration to an actuated configuration, or alternatively is indicative of no or insufficient movement of the plunger 80 during a required real transfer of the circuit interrupting device, e.g., GFCI device 10*a*, from a non-actuated configuration to an actuated configuration. (As defined herein, a step of determining can also be determined by whether an action occurs).

In one embodiment of the method of testing a circuit interrupting device, the circuit interrupting device, e.g., GFCI device 10, includes at least one electrical element, e.g., resistive member 120 in FIG. 11 for GFCI device 10*b*, or capacitive member 130 in FIG. 12 for GFCI device 10*c*, that is characterized by an impedance value. The step of measuring the movement of the plunger 80 is performed by measuring an electrical property, e.g., a first impedance value, of the at least one electrical element that is characteristic of when the plunger 80 is in contact with the at least one electrical element, e.g., measuring resistance R1 of resistive member 120 or capacitance value C1 of capacitive member 130; measuring the electrical property, e.g., a second impedance value, of the at least one electrical element that is characteristic of when the plunger 80 is not in contact with the at least one electrical element, e.g., measuring resistance R2 of resistive member 120 or capacitance value C2 of capacitive member 130 ; and measuring the difference between the first electrical property and the second electrical property, e.g., R2 minus R1 or C2 minus C1, or differences in impedance values.

The step of determining whether the movement of the plunger 80 reflects an operable circuit interrupting device may be performed by determining whether the difference between the first electrical property and the second electrical property is indicative of sufficient movement of the plunger 80 during a required real transfer of the circuit interrupting device, e.g., GFCI device 10, from a non-actuated configuration to an actuated configuration, or alternatively, is indicative of no or insufficient movement of the plunger 80 during a required real transfer of the circuit interrupting device, e.g., GFCI device 10, from a non-actuated configuration to an actuated configuration.

In another embodiment of the method of testing a circuit interrupting device, the circuit interrupting device, e.g., GFCI device 10*d* of FIG. 13, includes first and second electrically conductive members, e.g., first and second electrically conductive members 140*a* and 140*b*, respectively, as described above with respect to FIG. 13 that may be conductive tape strips or similarly configured material, of test assembly 100*d*, that are electrically isolated from one another and with respect to the coil and plunger assembly 8 such that the plunger 80 makes electrical contact with both the first and second conductive members 140*a* and 140*b*, respectively, to form a continuous conductive path. The step of measuring the movement of the plunger 80 is performed by measuring electrical continuity of the conductive path following the step of causing the plunger 80 to move in response to the actuation signal.

When the circuit interrupting device, e.g., GFCI device 10*d*, transfers from pre-test configuration 1002*a* to post-test configuration 1002*b*, as per FIGS. 8 and 9, respectively, the step of determining whether the movement reflects an operable circuit interrupting device is performed by determining whether the plunger 80 moves away from at least one of the first and second conductive members, 140*a* and 140*b*, respectively, wherein termination of the continuity of the conductive path is indicative of sufficient movement of the plunger 80 during a required real transfer of the circuit interrupting device, e.g., GFCI device 10*d*, from a non-actuated configuration to an actuated configuration. Alternatively, continued electrical continuity of the conductive path is indicative of no or insufficient movement of the plunger 80 during a required real transfer of the circuit interrupting device, e.g., GFCI device 10*d*, from the non-actuated configuration to the actuated configuration.

In an alternate embodiment of the method of testing a circuit interrupting device, when the circuit interrupting device, e.g., a GFCI device analogous to GFCI device 10*d* illustrated in FIG. 13, transfers from pre-test configuration 1001*a* to post-test configuration 1001*b*, as illustrated in FIGS. 6 and 7, respectively, the step of determining whether the movement reflects an operable circuit interrupting device is performed by determining whether the plunger 80 moves towards at least one of the first and second conductive members 140*a* and 140*b*, respectively, wherein establishment of continuity of the conductive path is indicative of sufficient movement of the plunger 80 during a required real transfer of the circuit interrupting device from a non-actuated configuration to an actuated configuration. Discontinuity of the conductive path is indicative of insufficient movement of the plunger 80 during a required real transfer of the circuit interrupting device from the non-actuated configuration to the actuated configuration. (As defined herein, the step of determining can also be determined by whether the plunger 80 moves).

In still another embodiment of the method of testing a circuit interrupting device, the circuit interrupting device, e.g., GFCI device 10*e* illustrated in FIG. 16, includes first conductive member 150*a* and second conductive member 150*b*, and wherein, when the circuit interrupting device, e.g., GFCI device 10*e*, is in one of pre-test configuration 1005*a* and post-test configuration 1005*b* as illustrated in FIGS. 14 and 15, respectively, the plunger 80 is in a position with respect to, and may include being between, the first and second conductive members 150*a* and 150*b*, respectively, that is indicative of one of corresponding pre-test capacitance value C1' and corresponding post-test capacitance value C2', respectively. The step of measuring movement of the plunger 80 is performed by measuring the pre-test capacitance value C1' and the post-test capacitance value C2'.

The step of determining whether the movement reflects an operable circuit interrupting device is performed by determining if the post-test capacitance value C2' differs from the pre-test capacitance value C1' by a predetermined value that is indicative of sufficient movement of the plunger 80 during a required real transfer of the circuit interrupting device, e.g., GFCI device 10*e*, from a non-actuated configuration to an actuated configuration, or alternatively, is indicative of no or insufficient movement of the plunger 80 during a required real transfer of the circuit interrupting device, e.g., GFCI device 10*e*, from a non-actuated configuration to an actuated configuration.

In yet another embodiment of the method of testing a circuit interrupting device, the circuit interrupting device, e.g., GFCI device 10*f* illustrated in FIG. 17, further includes an optical emitter; e.g., optical emitter 160*a* (corresponding to sensor 1010*a* in FIG. 14), emitting a light beam, e.g., light beam 160, in a path therefrom, e.g., path 160' as illustrated in FIGS. 14, 15 and 17. The step of measuring movement of plunger 80 is performed by measuring whether the plunger 80 at least partially interrupts the path 160' of the light beam 160 emitted from the optical emitter 160*a*. The step of causing the plunger 80 to move in response to the actuation signal is performed wherein movement of the plunger 80 enables the light beam 160 to propagate in a continuous path from the optical emitter 160*a* to an optical sensor, e.g., optical sensor 160*b*. The step of determining whether the movement reflects an operable circuit interrupting device may be performed by measuring continuity of the path 160' of the light beam 160 wherein the continuity of the light path 160' is indicative of sufficient movement of the plunger 80 during a required real transfer of the circuit interrupting device, e. g., GFCI device 10*f*, from the non-actuated configuration to the actuated configuration. Alternatively, measuring discontinuity of the path 160' of the light beam 160 is indicative of no or insufficient movement of the plunger 80 during a required real transfer of the circuit interrupting device, e. g., GFCI device 10*f*, from the non-actuated configuration to the actuated configuration.

In still another embodiment of the method of testing a circuit interrupting device, the circuit interrupting device includes optical emitter 160*a* (corresponding to sensor 1010'*a* in FIG. 14) emitting light beam 160 in a path there from, e.g., light path 160" in FIG. 14. The step of measuring movement of the plunger 80 is performed by measuring whether the light beam 160 propagates in a continuous path 160" from the optical emitter, e.g., optical emitter 160*a* (corresponding to sensor 1010'*a* in FIG. 14) to an optical sensor, e.g., optical sensor 160*b* (corresponding to sensor 1010'*b* in FIG. 14). The step of causing the plunger 80 to move in response to the actuation signal is performed wherein movement of the plunger 80 enables the plunger 80 to at least partially interrupt the continuous path 160" of the light beam 160 emitted from the optical emitter 160*a*.

The step of determining whether the movement reflects an operable circuit interrupting device is performed by measuring discontinuity of the path 160" of the light beam 160 wherein the discontinuity of the path 160" of the light beam 160 is indicative of sufficient movement of the plunger 80 during a required real transfer of the circuit interrupting device, e.g., GFCI device 10*f*, from the non-actuated configuration to the actuated configuration. Alternatively, measuring continuity of the path 160" of the light beam 160 is indicative of no or insufficient movement of the plunger 80 during a required real transfer of the circuit interrupting device, e.g., GFCI device 10*f*, from the non-actuated configuration to the actuated configuration.

In a similar manner as with respect to GFCI device 10, GFCI device 20 again also includes a circuit interrupting test assembly 200 that is configured to enable an at least partial operability self test of the GFCI device 10, without user intervention, via at least partially testing operability of at least one of the coil and plunger assembly 8 and of the fault sensing circuit. As also explained in more detail below with respect to FIGS. 18-21, the circuit interrupting test assembly 200 includes a test initiation circuit that is configured to initiate and conduct an at least partial operability test of the circuit interrupter, e.g., GFCI device 20, and a test sensing circuit that is configured to sense a result of the at least partial operability test of the circuit interrupter or GFCI device 20.

In a similar manner as described previously, to support the detecting and sensing members of the circuit interrupting test assembly 200 of the present disclosure, GFCI device 20 also includes rear support member 102 that is positioned or disposed on the printed circuit board 38 and with respect to the cavity 50 so that one surface 102' of the rear support member 102 may be in interfacing relationship with the first end 80*a* of the plunger 80 and may be substantially perpendicular or orthogonal to the movement of the plunger 80 as indicated by arrow 81.

Additionally, first and second lateral support members 104*a* and 104*b*, respectively, are positioned or disposed on the printed circuit board 38 and with respect to the cavity 50 so that one surface 104*a*' and 104*b*' of first and second lateral support members 104*a* and 104*b*, respectively, may be substantially parallel to the movement of the plunger 80 as indicated by arrow 81 and in interfacing relationship with the plunger 80. Thus, the rear support member 102 and the first and second lateral support members 104*a* and 104*b*, respectively, partially form a box-like configuration around the plunger 80. The rear support member 102 and the first and second lateral support members 104*a* and 104*b*, respectively, may be unitarily formed together or be separately disposed or positioned on the circuit board 38. The printed circuit board 38 thus serves as a rear or bottom support member for the combination solenoid coil and plunger that includes the coil or bobbin 82 and the plunger 80.

In a similar manner as described above for GFCI device 10, and as explained in more detail below, at least one sensor is disposed within the test assembly 200 such that, when the GFCI device 20 is in a pre-test configuration, the plunger 80 is either in contact with the one or more sensors or the plunger 80 is not in contact with the one or more sensor(s). Similarly, when the GFCI device 20 is in a post-test configuration, the plunger 80 is either in contact with the one or more sensors or the plunger 80 is not in contact with the one or more sensors. The sensor(s) may include at least one electrical element.

Figure 18:
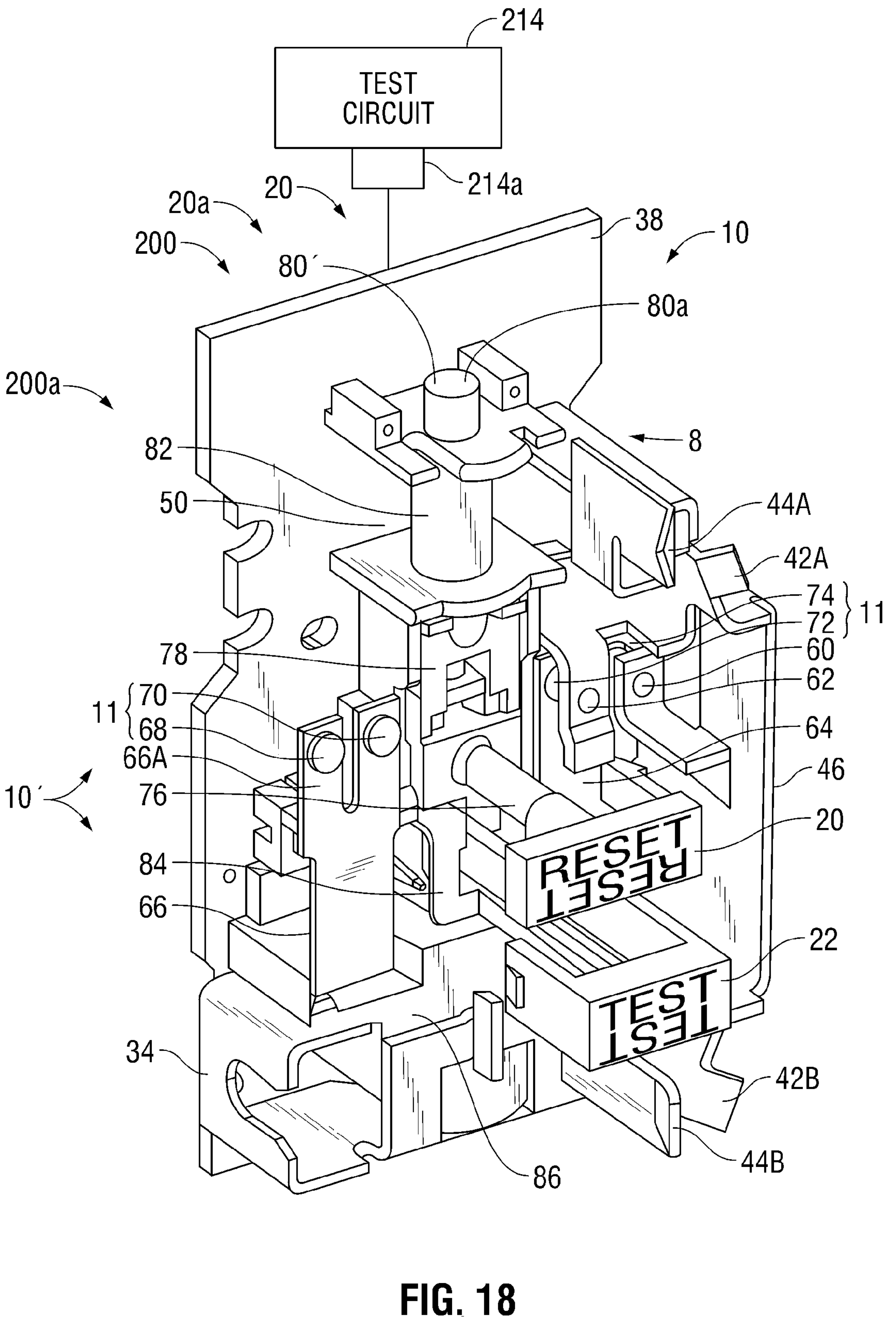
FIG. 18 is a perspective view of one embodiment of a part of a circuit interrupting device having a coil and plunger assembly according to the present disclosure wherein the plunger is magnetic or contains a magnet.
Figure 19:
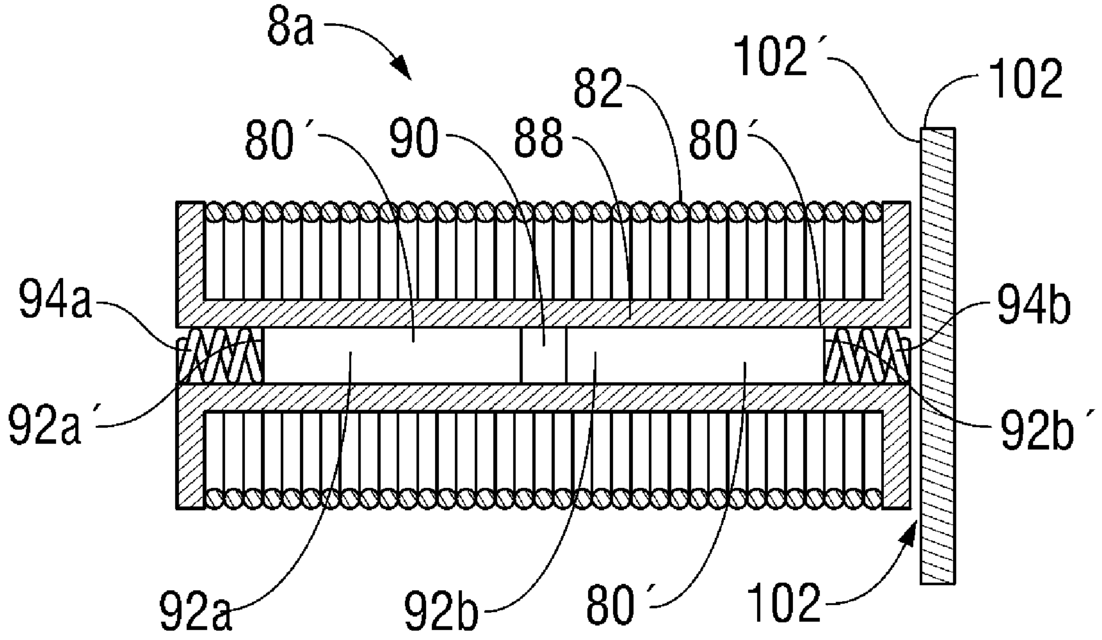
FIG. 19 is a cross-sectional view of the coil and plunger assembly of FIG. 18 illustrating the plunger that is magnetic or includes a magnet.

FIGS. 18-19 illustrate one embodiment of the present disclosure wherein the circuit interrupting test assembly 200 of GFCI device 20*a* is defined by a circuit interrupting test assembly 200*a* wherein, as specifically illustrated in FIG. 19, coil and plunger assembly 8*a* differs from coil and plunger assembly 8 in that the plunger 80' of coil and plunger assembly 8*a* is magnetic. That is, the plunger 80' is made from a magnetized material, e.g., iron or nickel or other suitable magnetic material, or the plunger 80' includes a magnet 90 that is disposed either internally within an interior space (not shown) of the plunger 80' or is disposed between a first plunger segment 92*a* and a second plunger segment 92*b*. In the exemplary embodiment illustrated in FIG. 19, the plunger 80' therefore comprises the first plunger segment 92*a*, the magnet 90, and the second plunger segment 92*b*. The magnet 90 may be a permanent magnet or alternatively an electromagnet. Those skilled in the art will recognize that conductor leads (not shown) can be operatively coupled to a power supply (not shown) either continuously when the GFCI device 20*a* is in a pre-test configuration similar to pre-test configuration 1001*a* illustrated in FIG. 6 (the exception being that no sensor 1000 is present in the embodiment of GFCI device 20*a*) or alternatively when the GFCI device 20' is in a post-test configuration similar to post-test configuration 1002*b* illustrated in FIG. 9 (again, the exception being that no sensor 1000 is present in the embodiment of GFCI device 20*a*).

In a similar manner to GFCI device 10 described above, GFCI device 20*a* includes the fault or failure sensing circuit that is not explicitly shown in FIG. 2, 4 or 5 and is incorporated into the layout of the printed circuit board 38. The plunger 80' of the coil and plunger assembly 8*a* is configured to move from pre-test configuration 1001*a* in first direction 81 to cause the circuit interrupting switch 11 to open upon actuation by the fault sensing circuit during a required real actuation of the GFCI device 20'. The GFCI device 20*a* also includes a test initiation and sensing circuit 214 that is similar to the test initiation and sensing circuits 114 through 164 described above except that the test sensing circuit of test circuit 214 comprises a magnetic pickup sensor 214*a* that is disposed to detect at least partial movement of the magnetic plunger 80'.

The test sensing circuit of test initiation and sensing circuit 214 of GFCI device 20*a* is electrically coupled to the solenoid coil 82 and configured to measure inductance of the solenoid coil 82 after the electrical actuation thereof. In one embodiment, the test sensing circuit of test initiation and sensing circuit 214 is further electrically coupled to the solenoid coil 82 and configured to measure a change in inductance between the inductance of the solenoid coil 82 before the electrical actuation thereof and the inductance of the solenoid coil 82 after the electrical actuation of the solenoid coil 82. During the transfer of the GFCI device 20*a* from the pre-test configuration similar to pre-test configuration 1001*a* (see FIG. 6) to the post-test configuration similar to post-test configuration 1002*b* (see FIG. 9), the coil 82 of GFCI device 20' is pulsed by the test initiation circuit of the test initiation and sensing circuit 214 for a brief period of time so as to result in a partial forward movement of the magnet plunger 80 in the test direction 83' that is the same as the fault direction 81, but for less time than that required for the plunger 80' to move a distance sufficient to open the switch 11 (that would adversely result in a spurious interruption of the current being provided to a load by the GFCI device 20*a*).

The solenoid coil 82 of the solenoid coil and plunger assembly 8*a* further includes a first spring 94*a* that is disposed at free end 92*a'* of the first plunger segment 92*a* and a second spring 94*b* that is disposed at free end 92*b'* of the second plunger segment 92*b* (see FIG. 19). The first spring 94*a* is positioned to actuate a latch (not shown) during fault condition operation of the plunger 80'. The second spring 94*b* is positioned at free end 92*b'* of the second plunger segment 92*b* so as to limit travel and impact of the plunger 80' with inner surface 102' of the rear support member 102 that may be in interfacing relationship with the free end 92*b'* of the second plunger segment 92*b*, and to return the plunger 80' to the pre-test configuration.

Thus, the circuit interrupting device 20*a* is further configured to measure a change in inductance between the inductance of the solenoid coil 82 in the pre-test configuration 1001*a* and the inductance of the solenoid coil 82 in the post-test configuration 1002*b*.

Figure 20:
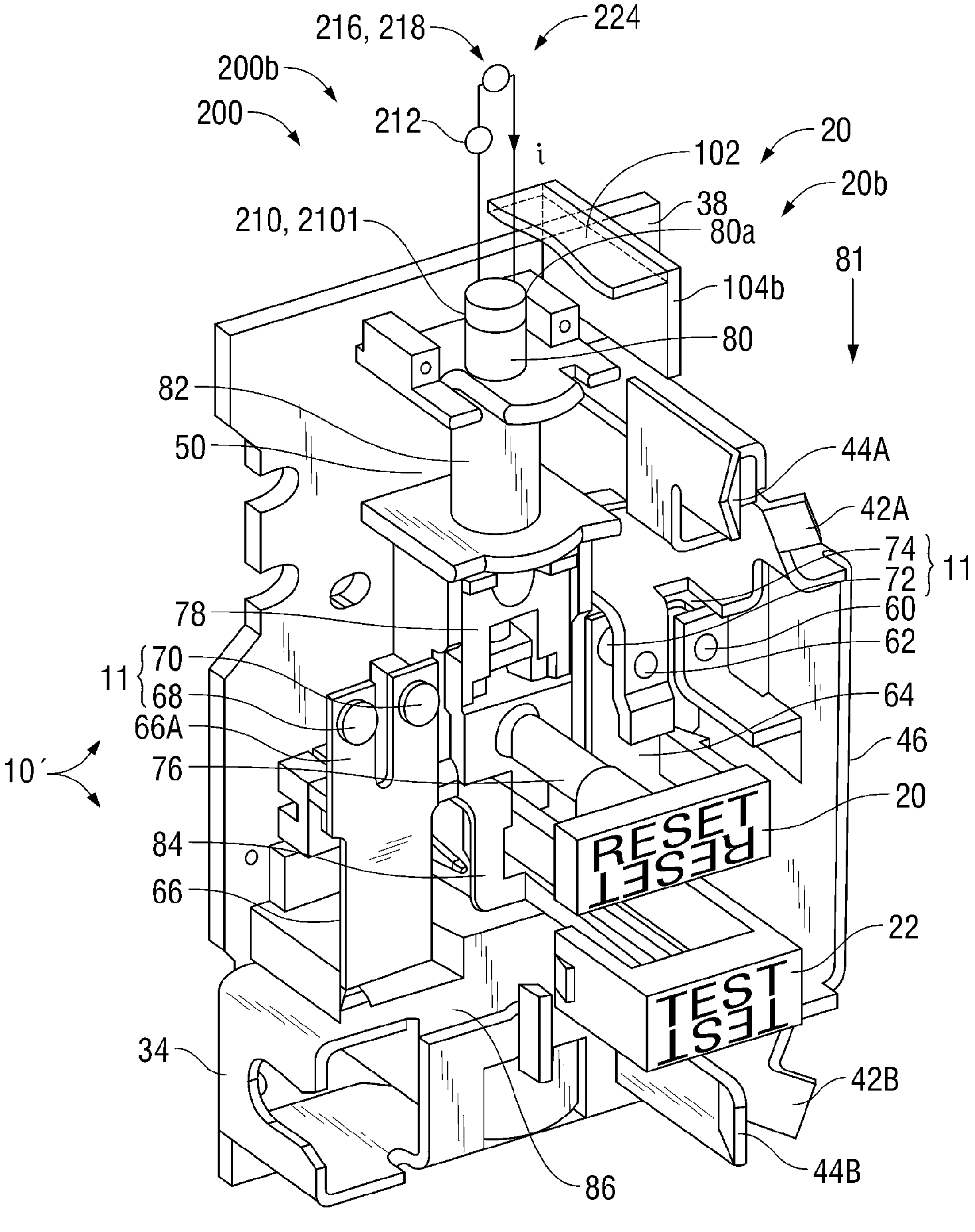
FIG. 20 is a perspective view of one embodiment of a part of a circuit interrupting device according to the present disclosure wherein the coil of the circuit interrupting device is pulsed for a brief period of time so as to result in a partial forward movement of the plunger but less than that required to open the circuit interrupting switch.

FIG. 20 illustrates one embodiment of the present disclosure wherein the circuit interrupting test assembly 200 of GFCI device 20*b* is defined by a circuit interrupting test assembly 200*b* wherein a test sensing switch 210, e.g., contact switch 2101, is configured and disposed as shown on the surface 102' of the rear support member 102, and is not in contact with plunger 80 during the pre-test or configuration 1001*a* of the GFCI device 20*a*.

The coil 82 of GFCI device 20*b* is pulsed for a brief period of time so as to result in a partial forward movement of the plunger 80 but less than that required to open the circuit interrupting switch 11 (see FIG. 2).

A current sensor 212 is electrically coupled to the contact switch 2101 in series. The circuit interrupting test assembly 200*b* of the GFCI device 20*b* again further includes a test initiation circuit and a test sensing circuit, which are illustrated schematically as a combined self-test initiation and sensing circuit 224, although the test initiation features and the sensing features can be implemented by a separate test initiation circuit and a separate test sensing circuit. The current sensor 212 is also electrically coupled to the sensing features of the circuit 224.

In a similar manner as described previously, the self-test initiation and sensing circuit 224 functions as a trigger or initiator to conduct the periodic self-test sequence. The circuit 224 may include a simple resistance capacitance (RC) timer circuit, a timer chip such as a 555 timer, a microcontroller, another integrated circuit (IC) chip, or other suitable circuit. In addition, the circuit 224 also may be manually initiated by a user to trigger the self test sequence.

Thus, the test initiation circuit 224 emits a signal lasting for a duration of time sufficient to not more than partially actuate the coil and plunger assembly 8, i.e., the signal lasts for a duration of time less than that required to open the circuit interrupting switch 10' (see FIG. 3).

Alternatively, the test initiation circuit 224 emits a signal having a voltage level sufficient to not more than partially actuate the coil and plunger assembly 8, i.e., the signal has a voltage level less than that required to open the circuit interrupting switch 10' (see FIG. 3). In this mode of operation, the coil 82 may be pulsed for the normal amount of time necessary to fully actuate the plunger 80 to trip to cause electrical discontinuity in the power circuit upon the occurrence of a predetermined condition within the power circuit but at a lesser voltage. That is to say, the voltage level may be near the zero crossing, or curtailed or "clipped" by a clipped voltage.

In either scenario, at least one sensor sensing partial actuation of the coil and plunger assembly 8, or partial movement of the plunger 80, includes at least one test sensing contact switch 2101 that is mechanically actuated by at least partial movement of the plunger 80 to generate a test sensing signal indicating contact of the plunger 80 with the contact sensing switch 2101. When the switch 2101 is disposed at the rear or first end 80*a* of the plunger 80, as illustrated in FIG. 12, the partial movement of the plunger 80 opens the switch 2101 upon partial movement of the plunger 80

When switch 2101 is disposed at the front or second end (not shown) of the plunger 80, the partial movement of the plunger 80 closes the switch 2101 upon partial movement of the plunger 80.

In one embodiment, the test initiation circuit 224 includes a metal oxide semiconductor field effect transistor (MOSFET) 216 or a bipolar transistor 218 that are each configured and disposed in series within the test initiation circuit 214 to enable the test initiation circuit 214 to emit a signal lasting for a duration of time sufficient to not more than partially actuate the coil and plunger assembly 8, or to a signal having a voltage level or current level sufficient to not more than partially actuate the coil and plunger assembly 8, as described above, without opening the circuit interrupting switch 11. MOSFET 216 and bipolar transistor 218 are illustrated with either one electrically coupled in series in the test initiation circuit 224. Thus the MOSFET 216 and the bipolar transistor 218 function as test control switches while the contact switch 2101 functions as a test sensing switch. At least one electrical element included within the test initiation circuit 224 includes the contact or test sensing switch 2101 that is mechanically actuated by at least partial movement of the plunger 80 to generate a test sensing signal indicating change of state of the test sensing switch 2101 corresponding to the at least partial movement of the plunger 80 without opening the circuit interrupting switch 11.

Figure 21:
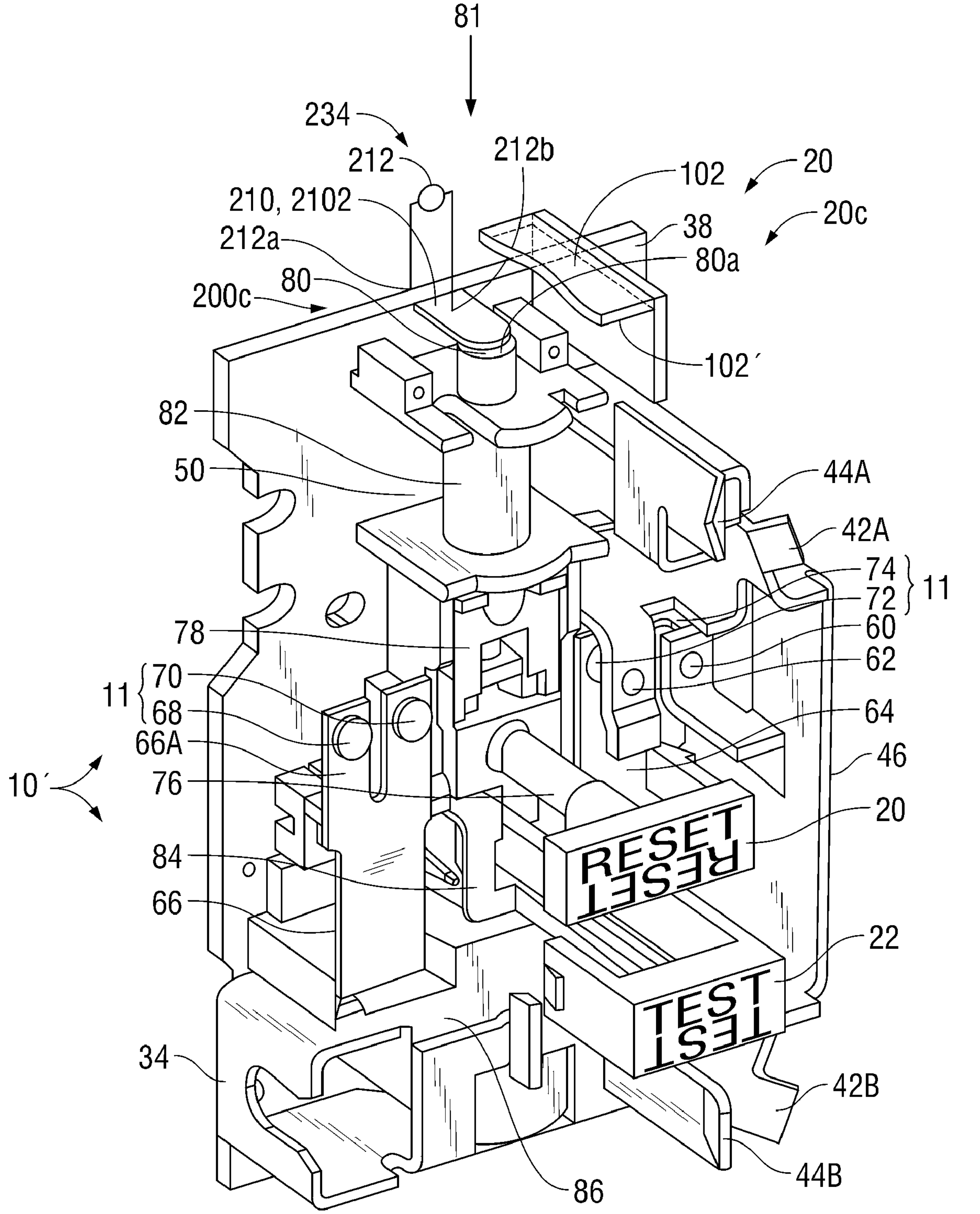
FIG. 21 is a perspective view of one embodiment of a part of a circuit interrupting device according to the present disclosure wherein a sensor such as a piezoelectric element generates a test sensing signal indicating movement of the plunger upon sensing an acoustic signal generated by actuation and movement of the plunger.

FIG. 21 illustrates one embodiment of the present disclosure wherein the circuit interrupting test assembly 200 of GFCI device 20*c* is defined by a circuit interrupting test assembly 200*c* wherein at least one sensor 210, e.g., piezoelectric element or member 2102, is configured and disposed, for example, as shown on the surface 102' of the rear support member 102, to generate a test sensing signal indicating movement of the plunger 80 upon sensing an acoustic signal generated by actuation and movement of the plunger 80 in the direction as indicated by arrow 81, upon conversion of the acoustic signal to an electrical signal by the piezoelectric element or member 2102.

The piezoelectric element or member 2102 is not in contact with plunger 80 during the pre-test configuration 1001*a* of the circuit interrupter, e.g., GFCI device 20*c*. Additionally, the plunger 80 is not in contact with the piezoelectric element or member 2102, when the circuit interrupter 20*c* is in the post-test configuration 1002*b*.

Again, an electrical sensor such as current sensor 212 is electrically coupled to the non-contact piezoelectric test sensing switch 2102 via first and second connectors/connector terminals 212*a* and 212*b*, respectively. The circuit interrupting test assembly 200*c* of the GFCI device 20*c* again further includes a test initiation circuit and a test sensing circuit, which are illustrated schematically as a combined self-test initiation and sensing circuit 234, although the test initiation features and the sensing features can be implemented by a separate test initiation circuit and a separate test sensing circuit. The current sensor 212 is also electrically coupled to the sensing features of the circuit 234.

In a similar manner as described previously, the self-test initiation and sensing circuit 234 functions as a trigger or initiator to conduct the periodic self-test sequence. The circuit 234 may include a simple resistance capacitance (RC) timer circuit, a timer chip such as a 555 timer, a microcontroller, another integrated circuit (IC) chip, or other suitable circuit. In addition, the circuit 234 also may be manually initiated by a user to trigger the self test sequence.

As described above, the test initiation and sensing circuit 234 may also include the MOSFET 216 and the bipolar transistor 218 electrically coupled to the circuit 234 that function as test control switches while the contact switch 2102 functions as a test sensing switch. At least one electrical element included within the test initiation circuit 234 includes the contact or test sensing switch 2101 that is mechanically actuated by at least partial movement of the plunger 80 to generate a test sensing signal indicating change of state of the test sensing switch 210 corresponding to the at least partial movement of the plunger 80 without opening the circuit interrupting switch 11.

Figure 22:
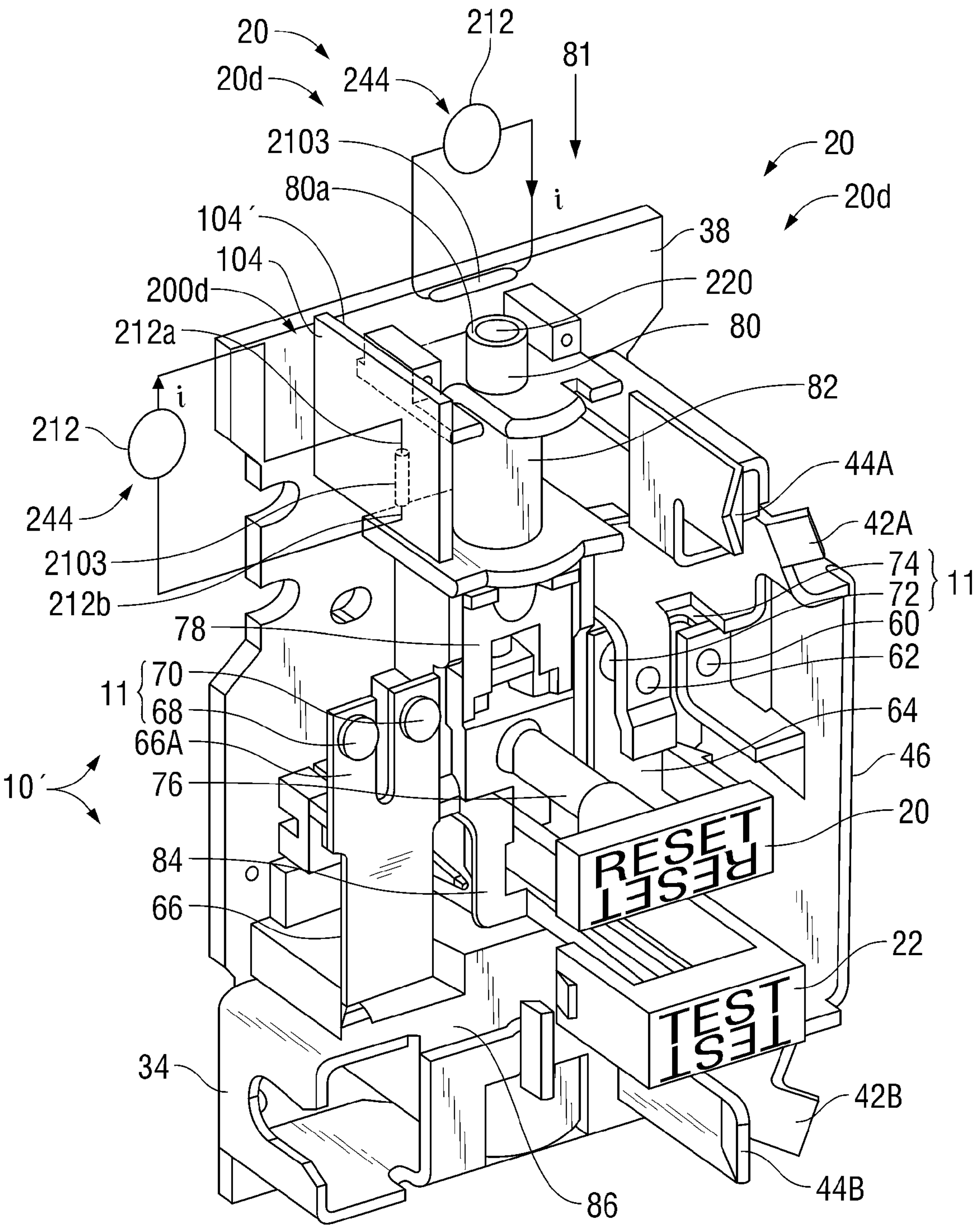
FIG. 22 is a perspective view of one embodiment of a part of a circuit interrupting device according to the present disclosure wherein a magnetic reed switch generates a test sensing signal indicating movement of the plunger upon sensing a magnetic field generated by actuation and movement of the plunger.

FIG. 22 illustrates one embodiment of the present disclosure wherein the circuit interrupting test assembly 200 of GFCI device 20*d* is defined by a circuit interrupting test assembly 200*d* wherein at least one sensor 210, e.g., at least magnetic reed switch 2103, is configured and disposed, for example, as shown on the surface 104' of the lateral support member 104*a*, to generate a test sensing signal indicating movement of the plunger 80 upon sensing a magnetic field generated by actuation and movement of the plunger 80 in the direction as indicated by arrow 81.

The magnetic reed switch 2103 is not in contact with plunger 80 during the pre-test configuration 1001*a* of the circuit interrupter, e.g., GFCI device 20*d*. Additionally, the plunger 80 is not in contact with the magnetic reed switch 2103, when the circuit interrupter 20*d* is in the post-test configuration. Thus, the magnetic reed switch 2103 is a non-contact test switch. The movement of the plunger 80 is not directly measured. The solenoid coil 82 is energized without opening the switch 11.

Again, an electrical sensor such as current sensor 212 is electrically coupled to the non-contact switch test 2103 via first and second connectors/connector terminals 212*a* and 212*b*, respectively. The circuit interrupting test assembly 200*d* of the GFCI device 20*d* again further includes a test initiation circuit and a test sensing circuit, which are illustrated schematically as a combined self-test initiation and sensing circuit 244, although the test initiation features and the sensing features can be implemented by a separate test initiation circuit and a separate test sensing circuit. The current sensor 212 is also electrically coupled to the sensing features of the circuit 244.

In a similar manner as described previously, the self-test initiation and sensing circuit 244 functions as a trigger or initiator to conduct the periodic self-test sequence. The circuit 244 may include a simple resistance capacitance (RC) timer circuit, a timer chip such as a 555 timer, a microcontroller, another integrated circuit (IC) chip, or other suitable circuit. In addition, the circuit 244 also may be manually initiated by a user to trigger the self test sequence.

In one embodiment, the plunger 80 may include a permanent magnet 220 disposed on first or rear end 80*a*, or alternatively, embedded within the plunger 80 approximately at the mid-section of the cylindrically shaped plunger 80 halfway along the longitudinal axis (see plunger 80' in FIG. 19). The motion of the magnetic field due to the presence of the permanent magnet 220 enhances ability of the reed switch 2103 to detect a change in magnetic field that is indicative of movement of the plunger 80.

Alternatively, instead of including permanent magnet 220, in a similar manner as described above with respect to plunger 80' illustrated in FIGS. 18-19, the plunger 80 can be magnetic to enhance the ability of the reed switch 2103 to detect a change in magnetic field that is indicative of movement of the plunger 80.

Figure 23:
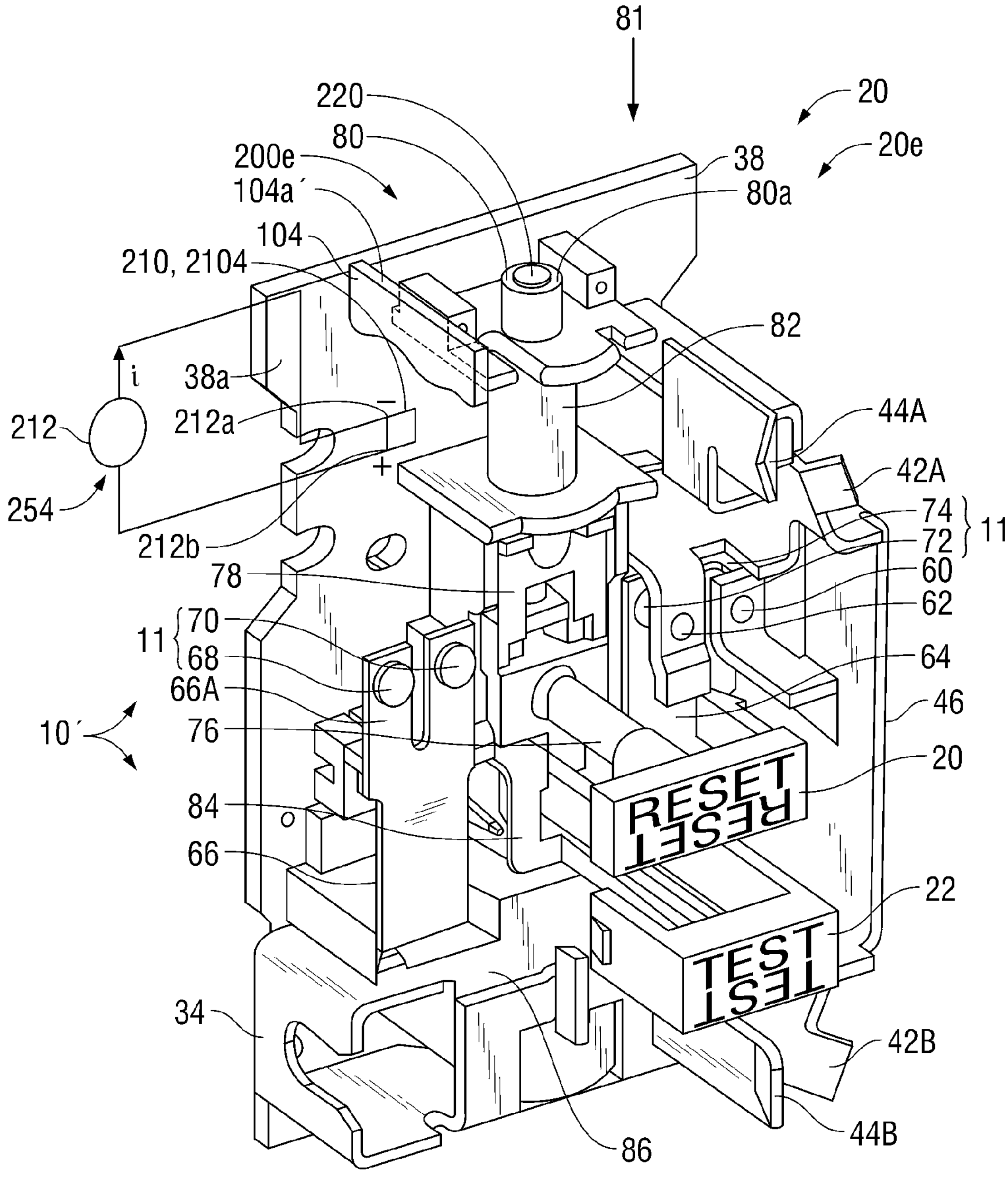
FIG. 23 is a perspective view of one embodiment of a part of a circuit interrupting device according to the present disclosure wherein a Hall-effect sensor generates a test sensing signal indicating movement of the plunger upon sensing a magnetic field generated by actuation and movement of the plunger.

FIG. 23 illustrates one embodiment of the present disclosure wherein the circuit interrupting test assembly 200 of GFCI device 20*e* is defined by a circuit interrupting test assembly 200*e* wherein at least one sensor 210, e.g., at least one Hall-effect sensor 2104, is configured and disposed, for example, as shown on the surface 38*a* of the printed circuit board 38 in proximity to the coil 82 of the solenoid coil and plunger assembly 8, to generate a test sensing signal indicating movement of the plunger 80 upon sensing a magnetic field generated by actuation and movement of the plunger 80 in the direction as indicated by arrow 81 to cause circuit interruption.

The Hall-effect sensor 2104 is not in contact with plunger 80 during the pre-test configuration 1001*a* of the circuit interrupter, e.g., GFCI device 20*e*. Additionally, the plunger 80 is not in contact with the Hall-effect sensor 2104, when the circuit interrupter is in the post-test configuration 1002*b*. Again, the movement of the plunger 80 is not directly measured. The solenoid coil 82 is energized without opening the switch 11.

Again, an electrical sensor such as current sensor 212 is electrically coupled to the non-contact test sensor 2104 via first and second connectors/connector terminals 212*a* and 212*b*, respectively. The circuit interrupting test assembly 200*e* of the GFCI device 20*e* again further includes a test initiation circuit and a test sensing circuit, which are illustrated schematically as a combined self-test initiation and sensing circuit 254, although the test initiation features and the sensing features can be implemented by a separate test initiation circuit and a separate test sensing circuit. The current sensor 212 is also electrically coupled to the sensing features of the circuit 254. Since the Hall-effect sensor 2104 detects changes in the polarity and/or voltage of a material through which an electric current is flowing in the presence of a perpendicular magnetic field, the Hall-effect sensor 2104 is electrically coupled to the power supply for the GFCI device 20*e* via the printed circuit board 38 and the test initiation and sensing circuit 254 and positioned with respect to the coil 82 so the magnetic field emitted by the coil 82 when actuated is perpendicular to the electric current flowing through the material of the Hall-effect sensor.

In a similar manner as described previously, the self-test initiation and sensing circuit 254 functions as a trigger or initiator to conduct the periodic self-test sequence. The circuit 254 may include a simple resistance capacitance (RC) timer circuit, a timer chip such as a 555 timer, a microcontroller, another integrated circuit (IC) chip, or other suitable circuit. In addition, the circuit 254 also may be manually initiated by a user to trigger the self test sequence.

In a similar manner as described above with respect to GFCI device 20*d* in FIG. 22, in one embodiment, as illustrated in FIG. 23, the plunger 80 may include a permanent magnet 220 disposed on first or rear end 80*a*, or alternatively, embedded within the plunger 80 approximately at the mid-section of the cylindrically shaped plunger 80 halfway along the longitudinal axis (see plunger 80' in FIG. 19). The motion of the magnetic field due to the presence of the permanent magnet 220 enhances ability of the Hall-effect sensor 2104 to detect a change in magnetic field that is indicative of movement of the plunger 80.

Alternatively, instead of including permanent magnet 220, in a similar manner as described above with respect to plunger 60' illustrated in FIGS. 18-19, the plunger 80 itself can be magnetized to enhance the ability of the Hall-effect sensor 2104 to detect a change in magnetic field that is indicative of movement of the plunger 80.

FIGS. 24-33 illustrate alternate embodiments of a circuit interrupter 30 according to the present disclosure wherein an additional coil is disposed with respect to the coil 82 of the circuit interrupting solenoid coil and plunger assembly 8 wherein the additional coil functions for test purposes of either moving the plunger or sensing movement of the plunger. That is, as explained in more detail below, the plunger of the circuit interrupting coil and plunger assembly is configured to move in a first direction to cause the switch 11 to open upon actuation by the circuit interrupting actuation signal, and the circuit interrupting test assembly includes at least one test coil, such that the plunger can move towards the test coil upon electrical actuation of the test coil.

Figure 24:
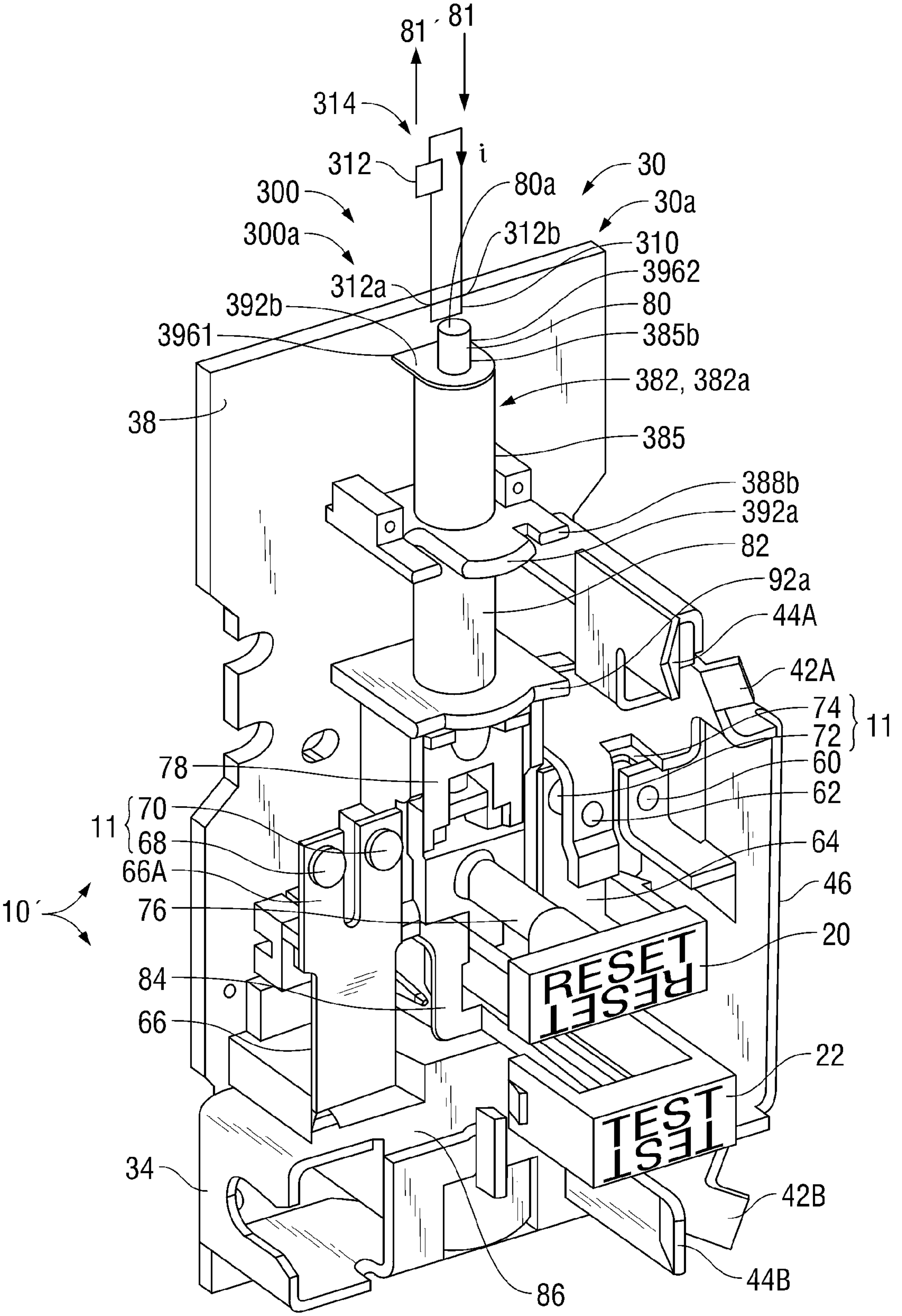
FIG. 24 is a perspective view of one embodiment of a part of a circuit interrupting device according to the present disclosure that includes, in addition to a circuit interrupting coil, at least one test coil wherein the orifice of the test coil and the orifice of the circuit interrupting coil are disposed wherein the plunger moves to and from the respective orifices upon electrical actuation of the test coil.
Figure 25:
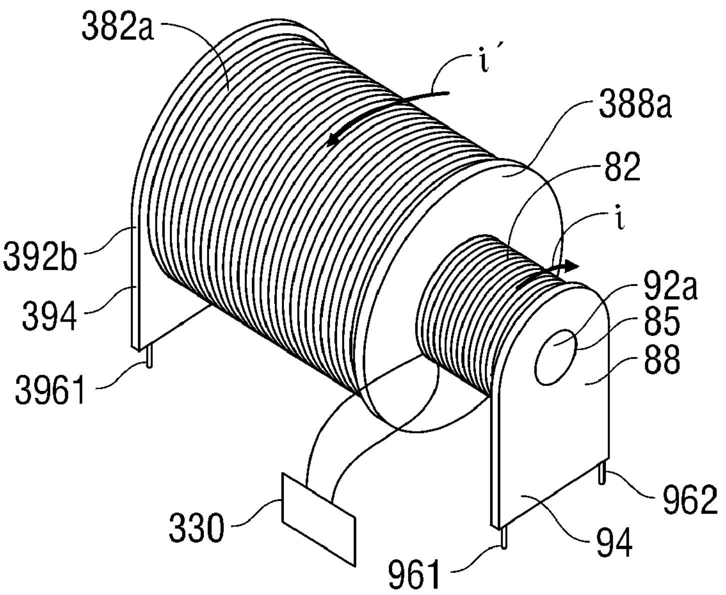
FIG. 25 is a perspective view of the test coil and the circuit interrupting coil of the circuit interrupting device of FIG. 24.
Figure 26:
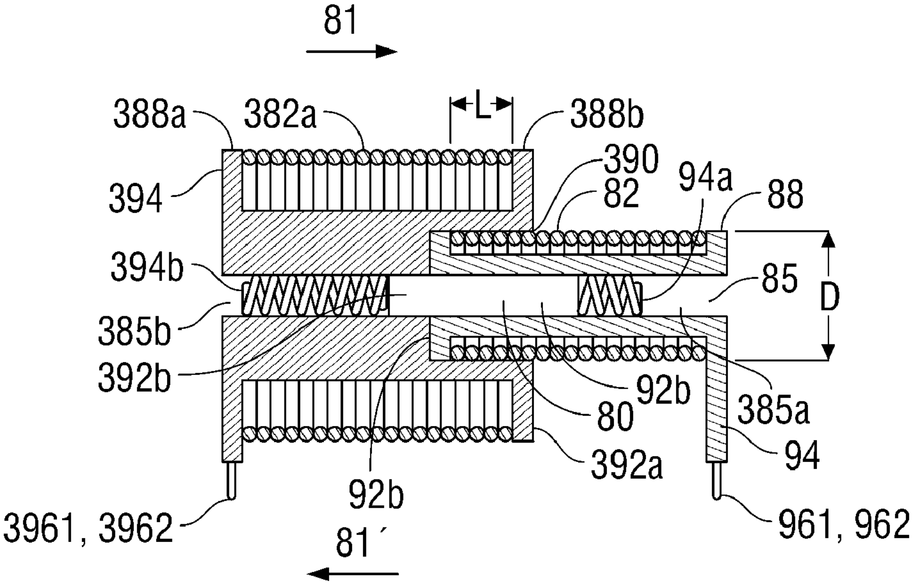
FIG. 26 is a cross-sectional view of the test coil and the circuit interrupting coil of the circuit interrupting device of FIG. 24.

More particularly, referring to FIGS. 24-26, the circuit interrupter 30, e.g., GFCI device 30*a*, includes at least one test coil that is configured and disposed with respect to the at least one circuit interrupting coil wherein the orifice of the at least one test coil and the orifice of the at least one circuit interrupting coil are disposed in a series or sequential configuration wherein the plunger moves to and from the respective orifices upon electrical actuation of the at least one test coil.

Referring particularly to FIGS. 24, 25 and 26, in conjunction with FIGS. 1-5, in a similar manner as with respect to GFCI device 10, GFCI device 30 again also includes a circuit interrupting test assembly 300 that is configured to enable an at least partial operability self test of the GFCI device 30, without user intervention, via at least partially testing operability of the coil and plunger assembly 8 and/or the fault sensing circuit. The circuit interrupting test assembly 300 includes a test initiation circuit that is configured to self initiate and conduct an at least partial operability test of the circuit interrupter, e.g., GFCI device 30, and a test sensing circuit that is configured to sense a result of the at least partial operability test of the circuit interrupter or GFCI device 30.

The circuit interrupting test assembly.300, or circuit interrupting test assembly 300*a* with respect to GFCI device 30*a* specifically illustrated in FIGS. 16-18 includes at least one test coil 382, or test coil 382*a* specifically illustrated in FIGS. 16-18. The test coil 382*a* has a centrally disposed orifice 385*a*. The test coil 382*a* and at least one fault circuit interrupting coil 82 each have a centrally disposed orifice 385*a* and 85, respectively, that is configured and disposed with respect to the other to enable the plunger 80 to move through the orifice 385*a* of the test coil 382*a* upon electrical actuation of the test coil 382*a*.

More particularly, the orifice 385*a* of the test coil 382*a* and the orifice 85 of the fault circuit interrupting coil 82 are disposed in a series or sequential configuration wherein the plunger 80 moves to and from the respective orifices 385*a* and 85 upon electrical actuation of the test coil 382*a*. That is, the test coil 382*a* is configured and disposed with respect to the plunger 80 to enable, upon electrical actuation of the test coil 382*a*, movement of the plunger 80 in a second direction, as indicated by arrow 81', that is opposite to the first direction, as indicated by arrow 81, causing the switch 11 to open in the power circuit upon actuation by the sensing circuit, which is described below.

The test coil 382*a* is electrically coupled in series with the fault circuit interrupting coil 82 and has an inductance that is greater than the inductance of the fault circuit interrupting coil 82. In other words, the ampere-turns of the test coil 382*a* is greater than the ampere-turns of the fault circuit interrupting coil 82. In addition, as illustrated in FIG. 25, the test coil 382*a* and the fault interrupting coil 82 are also configured and electrically coupled in series so that the direction of current flow i in the test coil 382*a* is opposite to the direction of current flow i' in the fault interrupting coil 382*a*, i.e., the current flow i in the test coil 382*a* is substantially 180 degrees out of phase with current flow i' in the fault interrupting coil 382*a*, to cause the resulting electromagnetic force on the plunger 80 due to the test coil 382*a* to be in a direction, e.g., as illustrated by arrow 81', that is opposite to the direction of the resulting electromagnetic force on the plunger 80 due to the fault circuit interrupting coil 382*a*, e.g., as illustrated by arrow 81.

Those skilled in the art will understand how and recognize several methods in which the winding of the coil 382*a* around its respective coil mount 388*a* and the winding of the coil 82 around its respective coil mount 88 can be effected to cause the direction of current flow i in the test coil 382*a* to be opposite to the direction of current flow in the fault interrupting coil 382*a* to cause the resulting electromagnetic force on the plunger 80 due to the test coil 382*a* to be in a direction opposite to the direction of the resulting electromagnetic force on the plunger 80 due to the fault circuit interrupting coil 382*a*. Since the inductance of the test coil 382*a* is greater than the inductance of the fault circuit interrupting coil 82, the greater inductance and resulting greater electromagnetic force effects the movement of the plunger 80 in the second direction 81' that is opposite to the first direction 81 upon electrical actuation of both the test coil 382*a* and the fault circuit interrupting coil 82.

A switch 310 is configured and disposed with respect to the test coil 382*a* wherein the switch 310 changes position upon contact with the plunger 80, thereby detecting movement of the plunger 82 in the second direction 81' that is caused by the greater inductance of the test coil 382*a*.

The circuit interrupting test assembly 300*a* of the GFCI device 30*a* includes a test initiation circuit and a test sensing circuit, which are illustrated schematically as a combined self-test initiation and sensing circuit 314, although the test initiation features and the sensing features can be implemented by a separate test initiation circuit and a separate test sensing circuit. The current sensor 312 is also electrically coupled to the sensing features of the circuit 314.

In a similar manner as described previously, the self-test initiation and sensing circuit 314 functions as a trigger or initiator to conduct the periodic self-test sequence. The circuit 314 may include a simple resistance capacitance (RC) timer circuit, a timer chip such as a 555 timer, a microcontroller, another integrated circuit (IC) chip, or other suitable circuit. In addition, the circuit 314 also may be manually initiated by a user to trigger the self test sequence.

The switch 310 closes upon contact with the plunger 80 and the closure of the switch 310 is sensed by the circuit 314. In addition, as illustrated in FIG. 25, since the test coil 382*a* is operably coupled in series with the fault circuiting interrupting coil 82, the GFCI device 30*a* may further include a short-to-ground switch 330 configured to enable and disable electrical continuity of the test coil (382*a*). More particularly, the switch 330 is electrically coupled in series in the coil wire in the transition between the test coil 382*a* and the fault circuit interrupting coil 82 and in a manner to bypass the test coil 382*a* and restore proper connectivity for the fault circuit interrupting coil 82 to perform its intended function upon a real actuation of the fault sensing circuit.

The circuit interrupting test assembly 300*a* of the GFCI device 30*a* again further includes a test initiation circuit and a test sensing circuit, which are illustrated schematically as a combined self-test initiation and sensing circuit 314, although the test initiation features and the sensing features can be implemented by a separate test initiation circuit and a separate test sensing circuit. The current sensor 312 is also electrically coupled to the sensing features of the circuit 314 (see FIG. 24).

In a similar manner as described previously, the self-test initiation and sensing circuit 314 functions as a trigger or initiator to conduct the periodic self-test sequence. The circuit 314 may include a simple resistance capacitance (RC) timer circuit, a timer chip such as a 555 timer, a microcontroller, another integrated circuit (IC) chip, or other suitable circuit. In addition, the circuit 314 also may be manually initiated by a user to trigger the self test sequence.

In a similar manner as described previously, to support the detecting and sensing members of the circuit interrupting test assembly 300 of the present disclosure, GFCI device 30 also includes rear support member 102 that is positioned or disposed on the printed circuit board 38 and with respect to the cavity 50 so that one surface 102' of the rear support member 102 may be in interfacing relationship with the first end 80*a* of the plunger 80 and may be substantially perpendicular or orthogonal to the movement of the plunger 80 as indicated by arrow 81.

Additionally, as described previously, first and second lateral support members 104*a* and 104*b*, respectively, are positioned or disposed on the printed circuit board 38 and with respect to the cavity 50 so that one surface 104*a*' and 104*b*' of first and second lateral support members 104*a* and 104*b*, respectively, may be substantially parallel to the movement of the plunger 80 as indicated by arrow 81 and in interfacing relationship with the plunger 80. Thus, the rear support member 102 and the first and second lateral support members 104*a* and 104*b*, respectively, partially form a box-like configuration around the plunger 80. The rear support member 102 and the first and second lateral support members 104*a* and 104*b*, respectively, may be unitarily formed together or be separately disposed or positioned on the circuit board 38. The printed circuit board 38 thus serves as a rear or bottom support member for the combination solenoid coil and plunger that includes the coil or bobbin 82 and the plunger 80.

Furthermore, the printed circuit board 38 also serves as rear or bottom support member for the one or more solenoid test coils 382*a*. As best shown in FIGS. 25-26, the coil 82 is wound around a generally cylindrically-shaped bobbin or coil mount 88 while the coil 382*a* is also wound around a generally cylindrically-shaped bobbin or coil mount 388*a*. The coil mount 88 includes a first end 92*a* and a second end 92*b*. The first end 88*a* is configured as a partially arch-shaped support end 94 having electrical contacts 961 and 962 that are configured in a prong-like manner to be inserted into the printed circuit board 38 to receive electrical current for power and control.

In a similar manner, the coil mount 388*a* includes a first end 392*a* and a second 392*b*. The second end 392*a* is configured as a partially arch-shaped support end 394 having electrical contacts 3961 and 3962 that are configured in a prong-like manner to be inserted into the printed circuit board 38 to receive electrical current for power and control.

The coil mount 388*a* is configured with an aperture 390 that has a diameter D and extending internally within the coil mount 388*a* from first end 392*a* towards second end 392*b* along a length L that is sufficient to enable at least partial reception and concentric enclosure of the second end 92*b* of the coil mount 88 and of the coil 82 wound around the coil mount 88. Thus the plunger 80 mounted within the orifice 85 may be at least partially encompassed simultaneously by the coil 82 of the fault circuit interrupting coil and plunger assembly 8 and by the test coil 382*a* wherein the test coil 382*a* partially overlaps the fault circuit interrupting coil 82. As described above, the test coil 382*a* has centrally disposed orifice 385*a* extending along the longitudinal centerline axis of the coil mount 388*a*. The test coil 382*a* and the fault circuit interrupting coil 82 each have centrally disposed orifice 385*a* and centrally disposed orifice 85, respectively, that are configured and disposed with respect to the other to enable the plunger 80 to move freely through the orifice 385*a* of the test coil 382 and through the orifice 85 of the fault circuit interrupting coil 82 upon electrical actuation of the test coil 382. The movement of the plunger 80 in the direction 81' that is opposite to the movement of the plunger 80 in the direction 81 which is the direction required for the plunger 80 to effect a trip of the GFCI device 30*a* is thus effected by the greater inductance of the test coil 382*a* and also by the simultaneous at least partial encompassing of the plunger 80 by the coil 82 of the fault circuit interrupting coil and plunger assembly 8 and by the test coil 382*a*.

The solenoid coil 82 of the fault circuit interrupting solenoid coil and plunger assembly 8 further includes a first spring 394*a* that is disposed at first free end 392*a* of plunger 80 and a second spring 394*b* that is disposed at free end 392*b* of the plunger 80. The first spring 394*a* is positioned is positioned to actuate a latch (not shown) during fault condition operation of the plunger 80. The second spring **394*b* is positioned at free end 392*b* of the plunger 80 so as to limit travel and impact of the plunger 80 with inner surface 102' of the rear support member 102 that may be in interfacing relationship with the free end 392*b* of the plunger 80, and to return the plunger 80** to the pre-test configuration.

Figure 27:
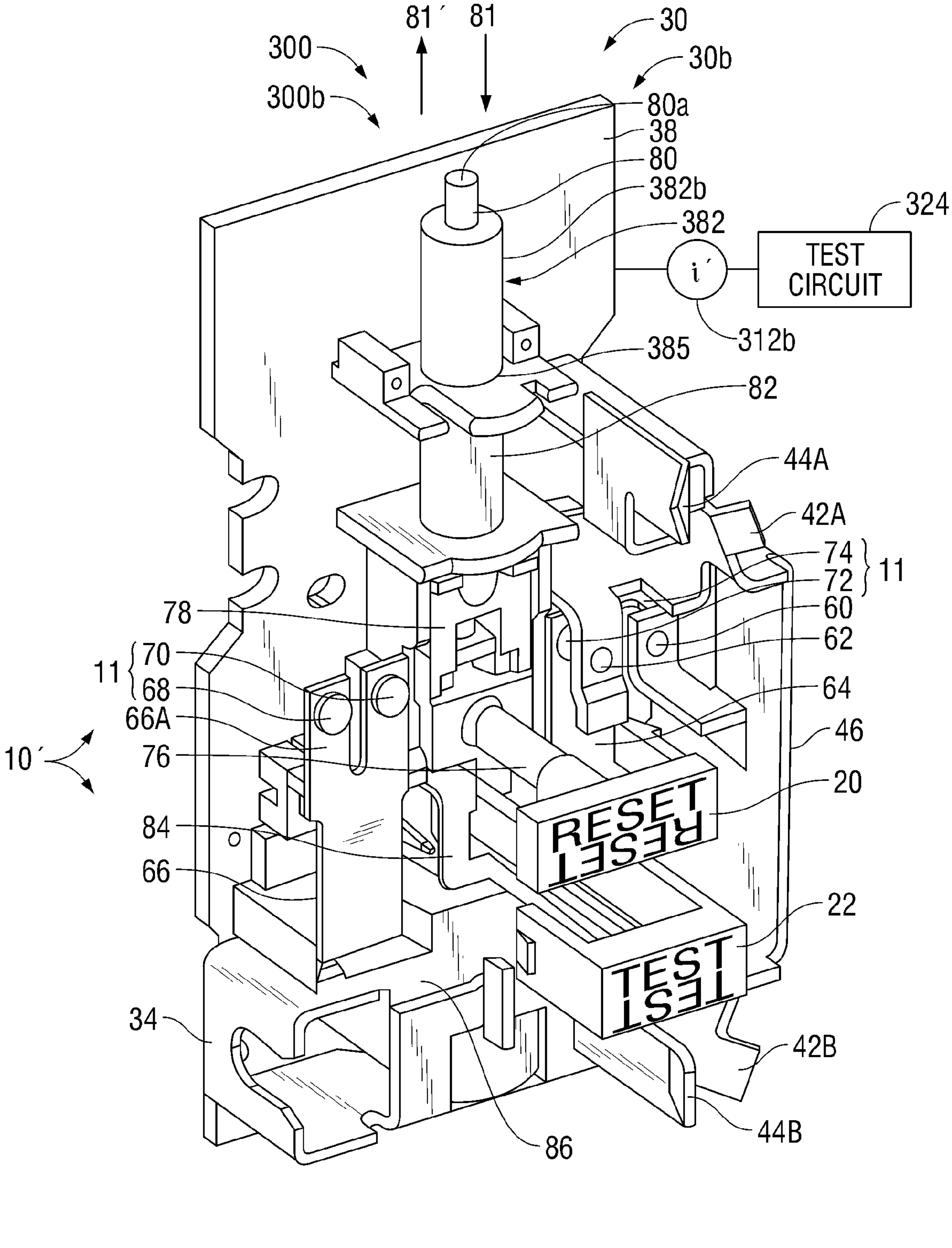
FIG. 27 is a perspective view of one embodiment of a part of a circuit interrupting device according to the present disclosure that includes, in addition to a circuit interrupting coil, at least one test coil wherein the orifice of the coils are aligned and joined at a common joint so as to enable the plunger to move in the orifices between the coils.
Figure 29:
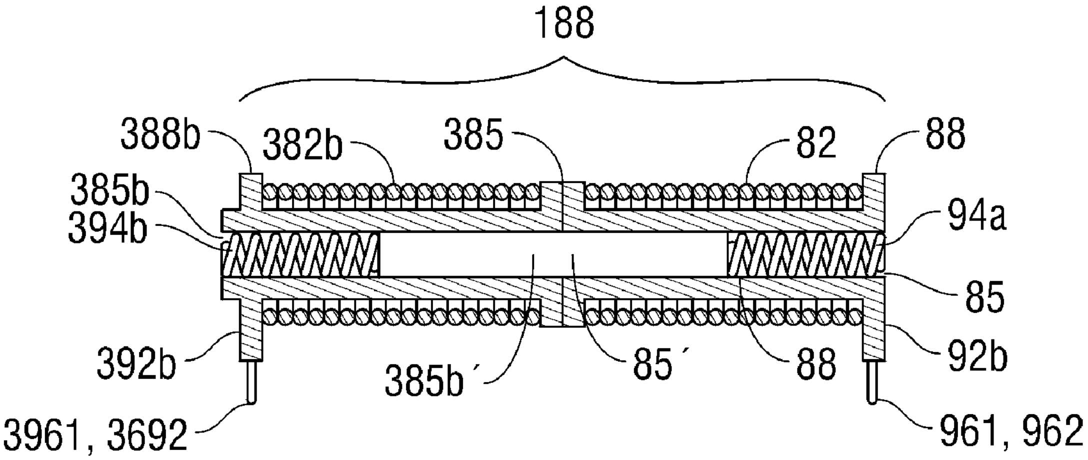
FIG. 29 is a cross-sectional view of the test coil and the circuit interrupting coil of the circuit interrupting device of FIG. 27.

Referring particularly now to FIGS. 27, 29 and 29, as described above, in conjunction with FIGS. 1-5, in a similar manner as with respect to GFCI device 10, GFCI device 30 again also includes a circuit interrupting test assembly 300 that is configured to enable an at least partial operability self test of the GFCI device 30, without user intervention, via at least partially testing operability of the coil and plunger assembly 8 and/or the fault sensing circuit. The circuit interrupting test assembly 300 includes a test initiation circuit that is configured to self initiate and conduct an at least partial operability test of the circuit interrupter, e.g., GFCI device 30, and a test sensing circuit that is configured to sense a result of the at least partial operability test of the circuit interrupter or GFCI device 30. The test initiation circuit and the test sensing circuit are illustrated as a combined test initiation and test sensing circuit 324 that is incorporated into the printed circuit board 38.

Figure 28:
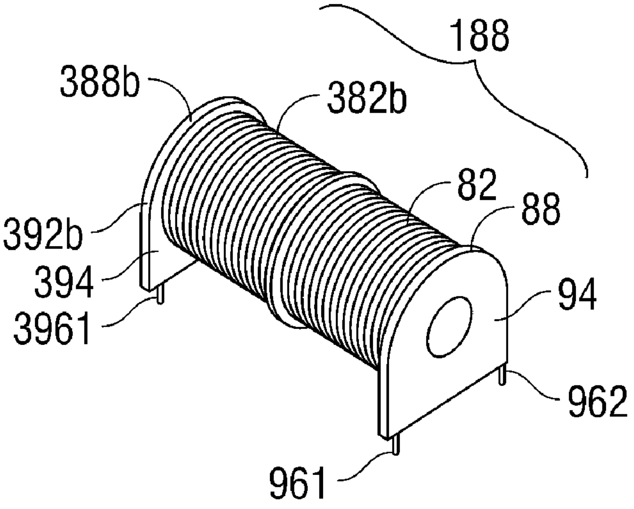
FIG. 28 is a perspective view of the test coil and the circuit interrupting coil of the circuit interrupting device of FIG. 27.

The circuit interrupting test assembly 300, or circuit interrupting test assembly **300*b* with respect to GFCI device 30*b* specifically illustrated in FIGS. 27-29 includes at least one test coil 382, or test coil 382*b*. In a similar manner, test coil 382*b* has a centrally disposed orifice 385*b*. At least one fault interrupting coil 82 has a centrally disposed orifice 85. One end 385*b*' of the centrally disposed orifice 385*b* of the test coil 382*b* and one end 85' of the centrally disposed orifice 85 of the fault circuit interrupting coil 82 are aligned and joined at a common joint 385 so as to enable the plunger 80 to move freely in the orifices 85 and 385*b* between the fault circuit interrupting coil 82 and the test coil 382*b***.

In a similar manner as described above with respect to GFCI device **30*a*, the test coil 382*b* is configured and disposed with respect to the circuit interrupting coil 82 wherein the orifice 385*b* of the test coil 382*b* and the orifice 85 of the circuit interrupting coil 82 are disposed in a series sequential configuration wherein the plunger 80 moves to and from the respective orifices 385*b* and 85 upon electrical actuation of the test coil 382*b*. Consequently, the test coil 382*b* is configured and disposed with respect to the plunger 80 to enable movement of the plunger 80 in second direction 81' that is opposite to the first direction 81 causing the switch 11 to open, upon electrical actuation of the test coil 382*b* upon actuation by the sensing circuit 324**.

The test coil **382*b* is electrically isolated from the circuit interrupting coil 82. The GFCI device 30*b* is configured to measure inductance of the circuit interrupting coil 82 after the electrical actuation of the test coil 382*b*. More particularly, the GFCI device 30*b* is configured to measure a change in inductance between the inductance of the circuit interrupting coil 82 before the electrical actuation of the test coil 382*b* and the inductance of the circuit interrupting coil 82 after the electrical actuation of the test coil 382*b***.

The circuit interrupting test assembly **300*b* of the GFCI device 30*b* includes a test initiation circuit and a test sensing circuit, which are illustrated schematically as a combined self-test initiation and sensing circuit 324 that is incorporated into printed circuit board 38, although the test initiation features and the sensing features can be implemented by a separate test initiation circuit and a separate test sensing circuit. An current sensor 312*b*, shown schematically, is also electrically coupled to the sensing features of the circuit 324 and measures the current I' through the circuit interrupting coil 82. Since voltage V is equal to the inductance L times the rate of change of current I' (V=L di/dt), the inductance L of the circuit interrupting coil 82 can be measured by measuring the voltage V across the ends of the circuit interrupting coil 82 and the rate of change of current d I'/dt. The inductance L will vary depending on how much movement of the plunger 80 has occurred during the transfer from the analogous pre-test configuration 1001*a* to the analogous post-test configuration 1002*b* (see FIGS. 6 and 9). That is, GFCI device 30*b* is configured to measure inductance L of the circuit interrupting coil 82 after the electrical actuation of the test coil 382*b***.

The circuit interrupting test assembly **300*b* of the GFCI device 30*b* again includes a test initiation circuit and a test sensing circuit, which are illustrated schematically as a combined self-test initiation and sensing circuit 324, although the test initiation features and the sensing features can be implemented by a separate test initiation circuit and a separate test sensing circuit. The current sensor 312*b* is also electrically coupled to the sensing features of the circuit 324. (See FIG. 27**)

In a similar manner as described previously, the self-test initiation and sensing circuit 324 functions as a trigger or initiator to conduct the periodic self-test sequence. The circuit 324 may include a simple resistance capacitance (RC) timer circuit, a timer chip such as a 555 timer, a microcontroller, another integrated circuit (IC) chip, or other suitable circuit. In addition, the circuit 324 also may be manually initiated by a user to trigger the self test sequence.

In a similar manner as described previously, to support the detecting and sensing members of the circuit interrupting test assembly 300 of the present disclosure, GFCI device 30 also includes rear support member 102 that is positioned or disposed on the printed circuit board 38 and with respect to the cavity 50 so that one surface 102' of the rear support member 102 may be in interfacing relationship with the first end **80*a* of the plunger 80 and may be substantially perpendicular or orthogonal to the movement of the plunger 80 as indicated by arrow 81**.

Additionally, as previously described and shown in FIGS. 2, 4 and 5, first and second lateral support members **104*a* and 104*b*, respectively, are positioned or disposed on the printed circuit board 38 and with respect to the cavity 50 so that one surface 104*a*' and 104*b*' of first and second lateral support members 104*a* and 104*b*, respectively, may be substantially parallel to the movement of the plunger 80 as indicated by arrow 81 and in interfacing relationship with the plunger 80. Thus, the rear support member 102 and the first and second lateral support members 104*a* and 104*b*, respectively, partially form a box-like configuration around the plunger 80. The rear support member 102 and the first and second lateral support members 104*a* and 104*b*, respectively, may be unitarily formed together or be separately disposed or positioned on the circuit board 38. The printed circuit board 38 thus serves as a rear or bottom support member for the combination solenoid coil and plunger that includes the coil or bobbin 82 and the plunger 80**.

Furthermore, the printed circuit board 38 also serves as rear or bottom support member for the one or more solenoid test coils **382*b*. As best shown in FIGS. 28-29, the coil 82 is wound around generally cylindrically-shaped bobbin or coil mount 88 while the coil 382*b* is also wound around generally cylindrically-shaped bobbin or coil mount 388*b*. The coil mount 88 includes a first end 92*b*. The first end 92*b* is configured as a partially arch-shaped support end 94 having electrical contacts 961 and 962 that are configured in a prong-like manner to be inserted into the printed circuit board 38** to receive electrical current for power and control.

In a similar manner, the coil mount 388*b* includes a first end 392*b*. The first end 392*b* is configured as a partially arch-shaped support end 394 having electrical contacts 3961 and 3962 that are configured in a prong-like manner to be inserted into the printed circuit board 38 to receive electrical current for power and control. The coil mounts 88 and 388 are joined at common joint 385 to form a combined coil mount 188.

Again, first spring 94*a* is disposed at first free end 92*b* of plunger 80 and second spring 394*b* is disposed at free end 392*b* of the plunger 80. The first spring 94*a* is positioned is positioned to actuate a latch (not shown) during fault condition operation of the plunger 80. The second spring 394*b* is positioned at free end 392*b* of the plunger 80 so as to limit travel and impact of the plunger 80 with inner surface 102' of the rear support member 102 that may be in interfacing relationship with the free end 392*b* of the plunger 80.

Figure 30:
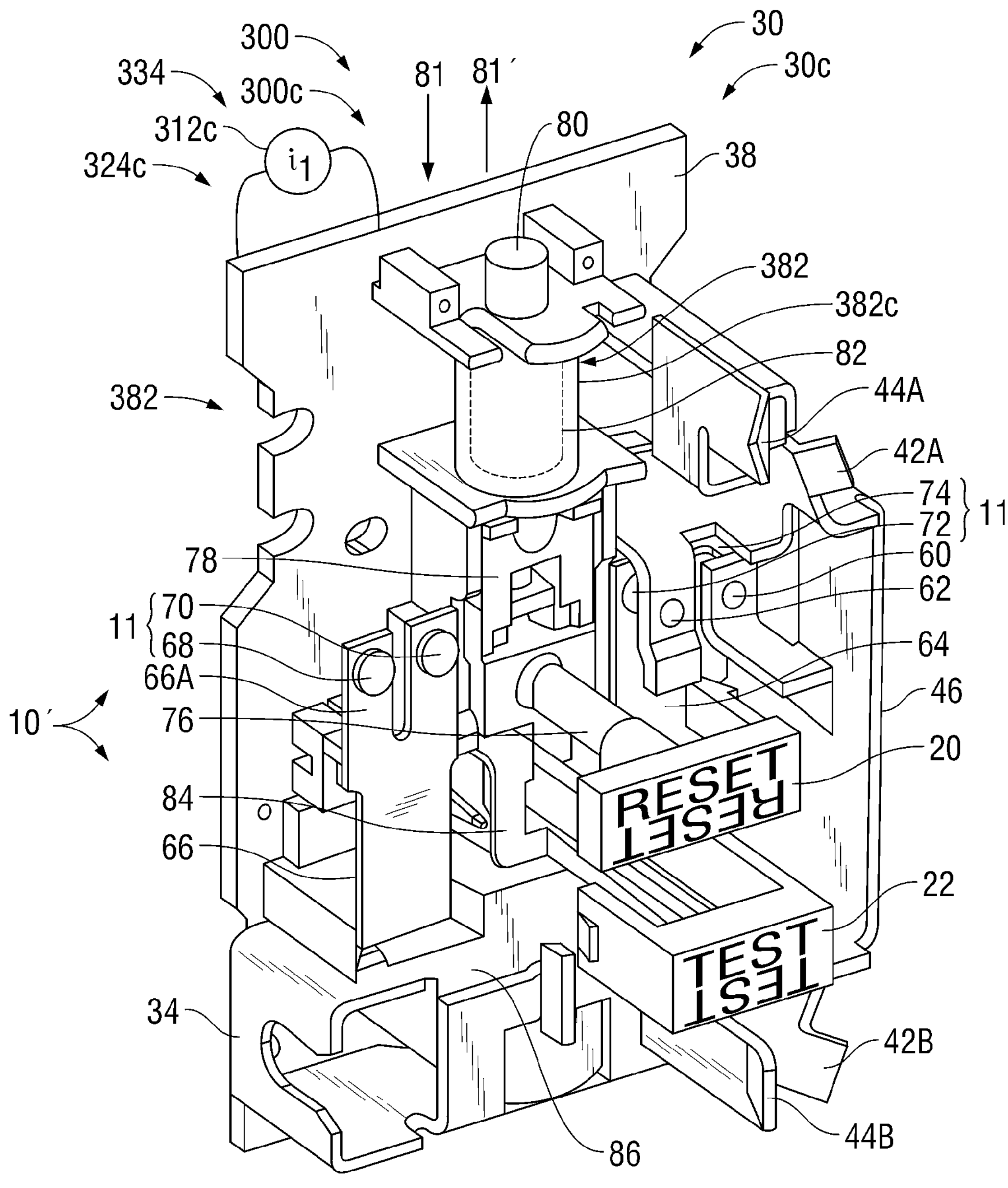
FIG. 30 is a perspective view of one embodiment of a part of a circuit interrupting device according to the present disclosure that includes, in addition to a circuit interrupting coil, at least one test coil wherein the test coil is concentrically disposed around the circuit interrupting coil such that the plunger moves through the orifice the circuit interrupting coil while the test coil measures a change in inductance.
Figure 31:
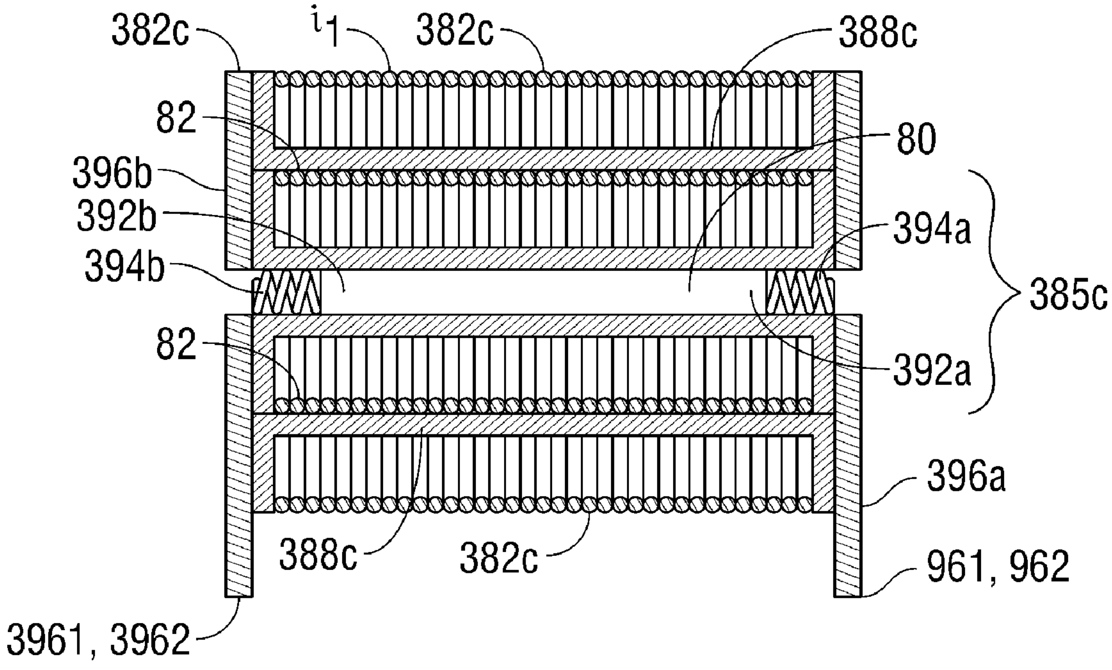
FIG. 31 is a cross-sectional view of the circuit interrupting coil and the test coil of FIG. 30.

Referring particularly now to FIGS. 30 and 31, as described above, in conjunction with FIGS. 1-5, in a similar manner as with respect to GFCI device 10, GFCI device 30 again also includes a circuit interrupting test assembly 300 that is configured to enable an at least partial operability self test of the GFCI device 30, without user intervention, via at least partially testing operability of the coil and plunger assembly 8 and/or the fault sensing circuit. The circuit interrupting test assembly 300 includes a test initiation circuit that is configured to self initiate and conduct an at least partial operability test of the circuit interrupter, e.g., GFCI device 30, and a test sensing circuit that is configured to sense a result of the at least partial operability test of the circuit interrupter or GFCI device 30.

The circuit interrupting test assembly 300, or circuit interrupting test assembly 300*c* with respect to GFCI device 30*c* specifically illustrated in FIGS. 30-31, includes at least one test coil 382, or test coil 382*c*. In a similar manner, test coil 382*c* has a centrally disposed orifice 385*c*. At least one fault interrupting coil 82 has centrally disposed orifice 85. Test coil 382*c* is configured and disposed with respect to the one or more circuit interrupting coils 82 wherein the test coil 382*c* is concentrically disposed around the circuit interrupting coil 82, and is disposed within the centrally disposed orifice 385*c* of the test coil 382*c*. Upon electrical actuation by the test coil 382*c* upon actuation by the circuit interrupting actuation signal, the plunger 80 moves through the orifice 85 of the circuit interrupting coil 82 in the first direction 81 causing the switch 11 to open or in second direction 81 that is opposite to the first direction 81. The test coil 382*c* is electrically isolated from the circuit interrupting coil 82.

The circuit interrupting device 30*c* is configured to measure inductance of the circuit interrupting coil 82 after the electrical actuation of the test coil 382*c*. The circuit interrupting device 30*c* is further configured to measure a change in inductance between the inductance of the circuit interrupting coil 82 before the electrical actuation of the test coil 382*c* and the inductance of the circuit interrupting coil 82 after the electrical actuation of the test coil 382*c*.

The circuit interrupting test assembly 300*c* of the GFCI device 30*c* includes a test initiation circuit and a test sensing circuit, which are illustrated schematically as a combined self-test initiation and sensing circuit 334 that is incorporated into printed circuit board 38, although the test initiation features and the sensing features can be implemented by a separate test initiation circuit and a separate test sensing circuit. A current sensor 312*c*, shown schematically, is also electrically coupled to the sensing features of inductance measurement circuit 324*c* (that may included within combined self-test initiation and sensing circuit 334) and measures the current i1 through the test coil 382*c*. Since voltage V is equal to the inductance L times the rate of change of current i1 (V=L di/dt), the inductance L of the test coil 382*c* can be measured by measuring the voltage V across the ends of the test coil 382*c* and the rate of change of current di1/dt. The inductance L will vary depending on how much movement of the plunger 80 has occurred during the transfer from the analogous pre-test configuration 1001*a* to the analogous post-test configuration 1002*b* (see FIGS. 6 and 9). If movement of the plunger 80 in either direction 81 or 81' has occurred (but movement that is insufficient to actuate the circuit interrupting switch 11 discussed with respect to FIG. 3), then a difference in readings of inductance of the circuit interrupting coil 82 before and after the electrical actuation of the test coil 382*c* will be indicative of movement of the plunger 80.

In a similar manner as described previously, the self-test initiation and sensing circuit 334 functions as a trigger or initiator to conduct the periodic self-test sequence. The circuit 334 may include a simple resistance capacitance (RC) timer circuit, a timer chip such as a 555 timer, a microcontroller, another integrated circuit (IC) chip, or other suitable circuit. In addition, the circuit 324*c* also may be manually initiated by a user to trigger the self test sequence.

Also in a similar manner as described previously and shown in FIGS. 2, 4 and 5, to support the detecting and sensing members of the circuit interrupting test assembly 300 of the present disclosure, GFCI device 30 also includes rear support member 102 that is positioned or disposed on the printed circuit board 38 and with respect to the cavity 50 so that one surface 102' of the rear support member 102 may be in interfacing relationship with the first end 80*a* of the plunger 80 and may be substantially perpendicular or orthogonal to the movement of the plunger 80 as indicated by arrow 81.

Additionally, as previously described and shown in FIGS. 2, 4 and 5, first and second lateral support members 104*a* and 104*b*, respectively, are positioned or disposed on the printed circuit board 38 and with respect to the cavity 50 so that one surface 104*a'* and 104*b'* of first and second lateral support members 104*a* and 104*b*, respectively, may be substantially parallel to the movement of the plunger 80 as indicated by arrow 81 and in interfacing relationship with the plunger 80. Thus, the rear support member 102 and the first and second lateral support members 104*a* and 104*b*, respectively, partially form a box-like configuration around the plunger 80. The rear support member 102 and the first and second lateral support members 104*a* and 104*b*, respectively, may be unitarily formed together or be separately disposed or positioned on the circuit board 38. The printed circuit board 38 thus serves as a rear or bottom support member for the combination solenoid coil and plunger that includes the coil or bobbin 82 and the plunger 80.

Furthermore, the printed circuit board 38 also serves as rear or bottom support member for the one or more solenoid test coils 382*c*. The coil 82 is wound around the generally cylindrically-shaped bobbin or coil mount 88 while the coil 382*c* is also wound around a generally cylindrically-shaped bobbin or coil mount 388*c*. The coil mount 88 and the coil mount 388*c* include a common first end 396*a* and a common second end 396*b*. The first end 396*a* and second end 396*b* are configured as partially arch-shaped support end having electrical contacts 961 and 962 that are configured in a prong-like manner to be inserted into the printed circuit board 38 to receive electrical current for power and control.

The solenoid coil 82 of the fault circuit interrupting solenoid coil and plunger assembly 8 further includes first spring 394*a* that is disposed at first free end 392*a* of plunger 80 and second spring 394*b* that is disposed at second free end 392*b* of the plunger 80. The first spring 394*a* is positioned is positioned is positioned to actuate a latch (not shown) during fault condition operation of the plunger 80.

The second spring 394*b* is positioned at free end 92*b* of the plunger so as to limit travel and impact of the plunger 80 with inner surface 102' of the rear support member 102 that may be in interfacing relationship with the free end 92*b*, and to return the plunger 80 to the pre-test configuration.

In a similar manner, the coil mount 388*c* includes a first end 396*a* and a second end 396*b*. The second end 392*a* is configured as a partially arch-shaped support end 394 having electrical contacts 3961 and 3962 that are configured in a prong-like manner to be inserted into the printed circuit board 38 to receive electrical current for power and control.

Figure 32:
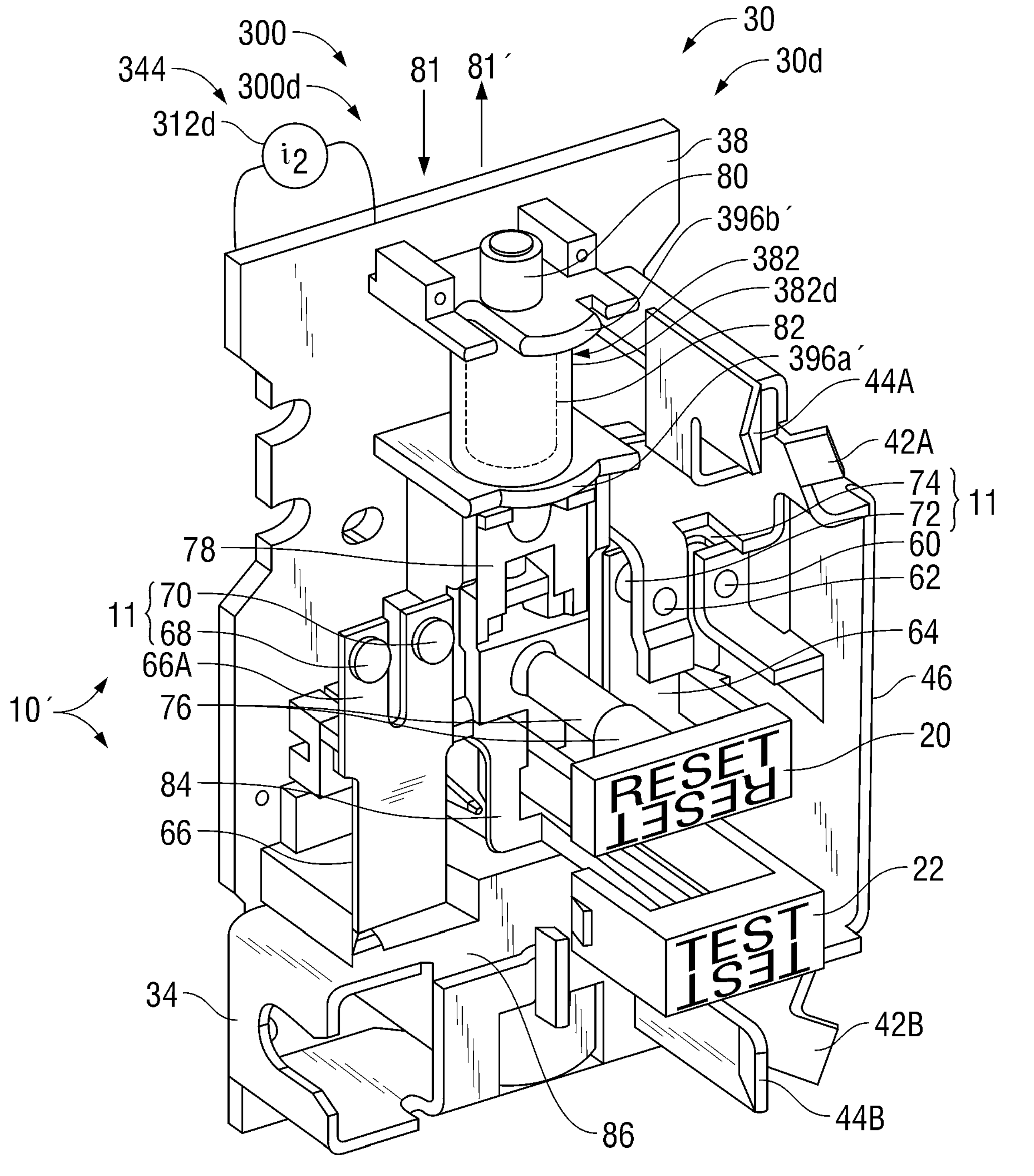
FIG. 32 is a perspective view of one embodiment of a part of a circuit interrupting device according to the present disclosure that includes, in addition to a circuit interrupting coil, at least one test coil wherein the test coil is concentrically disposed around the circuit interrupting coil such that the plunger moves through the orifice the circuit interrupting coil while the test coil measures a change in inductance and wherein the plunger is magnetic or includes a magnet.
Figure 33:
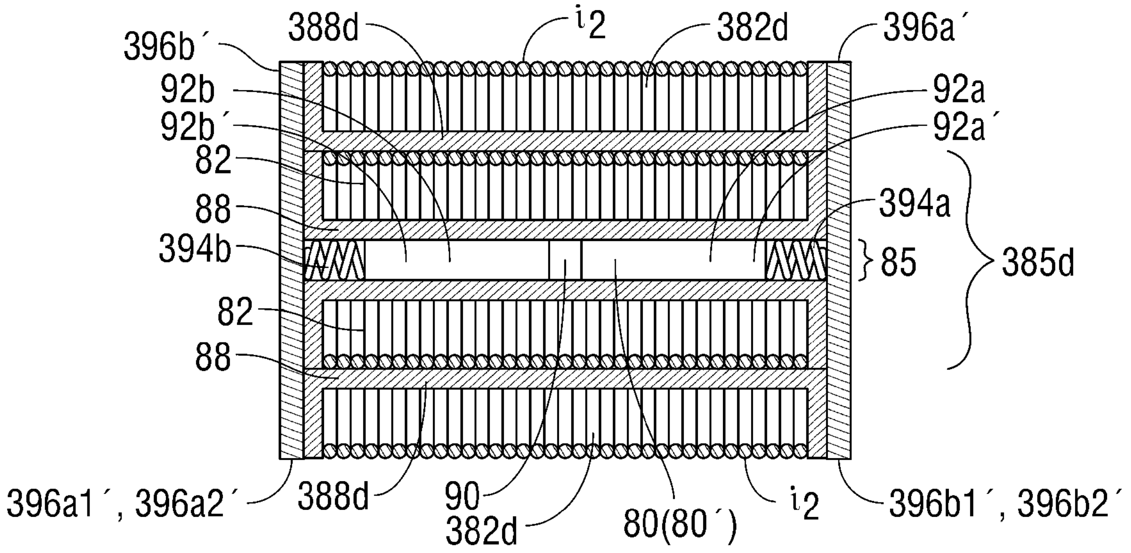
FIG. 33 is a cross-sectional view of the circuit interrupting coil and the test coil of FIG. 32.

Referring particularly now to FIGS. 32 and 33, as described above, in conjunction with FIGS. 1-5, in a similar manner as with respect to GFCI device 10, GFCI device 30 again also includes a circuit interrupting test assembly 300 that is configured to enable an at least partial operability self test of the GFCI device 30, without user intervention, via at least partially testing operability of the coil and plunger assembly 8 and/or the fault sensing circuit. The circuit interrupting test assembly 300 includes a test initiation circuit that is configured to self initiate and conduct an at least partial operability test of the circuit interrupter, e.g., GFCI device 30, and a test sensing circuit that is configured to sense a result of the at least partial operability test of the circuit interrupter or GFCI device 30.

The circuit interrupting test assembly 300, or circuit interrupting test assembly 300*d* with respect to GFCI device 30*d* specifically illustrated in FIGS. 32-33, in a similar manner to GFCI device 30*c*, includes at least one test coil 382, or test sensing coil 382. In a similar manner, test sensing coil 382*d* has a centrally disposed orifice 385*d*. Again, at least one fault interrupting coil 82 has centrally disposed orifice 85. Test sensing coil 382*d* is configured and disposed with respect to the circuit interrupting coil 82 wherein the test coil 382*d* is concentrically disposed around the circuit interrupting coil 82, and is disposed within the centrally disposed orifice 385*d* of the test coil 382*d*. Upon electrical actuation of the circuit interrupting coil 82 by the circuit interrupting actuation signal, the plunger 80 moves through the orifice 85 of the circuit interrupting coil 82 in the first direction 81 causing the switch 11 to open or in second direction 81' that is opposite to the first direction 81. The test sensing coil 382*d* is electrically isolated from the circuit interrupting coil 82.

The GFCI device 30*d* is configured to measure inductance of the test sensing coil after the electrical actuation of the circuit interrupting coil 82.

In a similar manner as with respect to GFCI devices 30*a*, 30*b* and 30*c*, the circuit interrupting test assembly 300*d* of the GFCI device 30*d* includes a test initiation circuit and a test sensing circuit, which are illustrated schematically as a combined self-test initiation and sensing circuit 344 that is incorporated into printed circuit board 38, although the test initiation features and the sensing features can be implemented by a separate test initiation circuit and a separate test sensing circuit. A current sensor 312*d*, shown schematically, is also electrically coupled to the sensing features of the circuit 344 and measures the current i2 through the test sensing coil 382*d*. Since voltage V is equal to the inductance L times the rate of change of current i2 (V=L di/dt), the inductance L of the test sensing coil 382*d* can be measured by measuring the voltage V across the ends of the test coil 382*d* and the rate of change of current di2/dt. The inductance L will vary depending on how much movement of the plunger 80 has occurred during the transfer from the analogous pre-test configuration 1001*a* to the analogous post-test configuration 1002*b* (see FIGS. 6 and 9) based on the electrical actuation of the circuit interrupting coil 82. Therefore, via electrical actuation of the circuit interrupting coil 82 by the test initiation and sensing circuit 344, the GFCI device 30*d* is configured such that the test initiation and sensing circuit 344 then measures a change in inductance between the inductance of the test sensing coil 382*d* before the electrical actuation of the circuit interrupting coil and 82 the inductance of the test sensing coil 382*d* after the electrical actuation of the circuit interrupting coil 82. If movement of the plunger 80 in either direction 81 or 81' has occurred, then a difference in readings of inductance of the test sensing coil 382*d* before and after the electrical actuation of the circuit interrupting coil 82 will be indicative of movement of the plunger 80.

In a manner as described above with respect to GFCI device 20*a* in FIGS. 18-19, to enhance the sensitivity of the test initiation and sensing circuit 344, the plunger 80 of FIGS. 32-33 may be replaced by magnetic plunger 80', wherein as previously described, the plunger 80' is made from a magnetized material, e.g., iron or nickel or other suitable magnetic material, or the plunger 80' includes a magnet 90 that is disposed either internally within an interior space (not shown) of the plunger 80' or is disposed between a first plunger segment 92*a* and a second plunger segment 92*b*. In the exemplary embodiment illustrated in FIG. 19, as also applied to FIG. 33, the plunger 80' therefore comprises the first plunger segment 92*a*, the magnet 90, and the second plunger segment 92*b*. The magnet 90 may be a permanent magnet or alternatively an electromagnet. Those skilled in the art will recognize that conductor leads (not shown) can be operatively coupled to a power supply (not shown) either continuously when the GFCI device 20*a* is in a pre-test configuration similar to pre-test configuration 1001*a* illustrated in FIG. 6 (the exception being that no sensor 1000 is present in the embodiment of GFCI device 20*a*) or alternatively when the GFCI device 20*a* is in a post-test configuration similar to post-test configuration 1002*b* illustrated in FIG. 9 (again, the exception being that no sensor 1000 is present in the embodiment of GFCI device 20*a*).

In a similar manner as described previously, the self-test initiation and sensing circuit 344 functions as a trigger or initiator to conduct the periodic self-test sequence. The circuit 344 may include a simple resistance capacitance (RC) timer circuit, a timer chip such as a 555 timer, a microcontroller, another integrated circuit (IC) chip, or other suitable circuit. In addition, the circuit 324*c* also may be manually initiated by a user to trigger the self test sequence.

Also in a similar manner as described previously, to support the detecting and sensing members of the circuit interrupting test assembly 300 of the present disclosure, GFCI device 30 also includes rear support member 102 that is positioned or disposed on the printed circuit board 38 and with respect to the cavity 50 so that one surface 102' of the rear support member 102 may be in interfacing relationship with the first end 80*a* of the plunger 80 or free end 92*b* of plunger 80' and may be substantially perpendicular or orthogonal to the movement of the plunger 80 or 80' as indicated by arrow 81.

Additionally, as described previously and shown in FIGS. 2, 4 and 5, first and second lateral support members 104*a* and 104*b*, respectively, are positioned or disposed on the printed circuit board 38 and with respect to the cavity 50 so that one surface 104*a'* and 104*b'* of first and second lateral support members 104*a* and 104*b*, respectively, may be substantially parallel to the movement of the plunger 80 or 80' as indicated by arrow 81 and in interfacing relationship with the plunger 80 or 80'. Thus, the rear support member 102 and the first and second lateral support members 104a and 104b, respectively, partially form a box-like configuration around the plunger 80 or 80'. The rear support member 102 and the first and second lateral support members 104a and 104b, respectively, may be unitarily formed together or be separately disposed or positioned on the circuit board 38. The printed circuit board 38 thus serves as a rear or bottom support member for the combination solenoid coil and plunger that includes the coil or bobbin 82 and the plunger 80 or 80'.

Furthermore, the printed circuit board 38 also serves as rear or bottom support member for the one or more solenoid test sensing coils 382d. The coil 82 is wound around a generally cylindrically-shaped bobbin or coil mount 88 while the coil 382d is also wound around a generally cylindrically-shaped bobbin or coil mount 388d. The coil mount 88 and the coil mount 388d include a common first end 396a' and a common second end 396b'. The first end 396a' and second end 396b' are configured as partially arch-shaped shaped support ends having electrical contacts 396a1', 396a2' and 396b1', 396b2', respectively that are configured in a prong-like manner to be inserted into the printed circuit board 38 to receive electrical current for power and control.

The solenoid coil 82 of the fault circuit interrupting solenoid coil and plunger assembly 8 further includes first spring 394a that is disposed at first free end 92a of plunger 80' (or of plunger 80, not shown) and second spring 394b that is disposed at second free end 92b of the plunger 80' (or of plunger 80, not shown). The first spring 394a is positioned to actuate a latch (not shown) during fault condition operation of the plunger 80'.

The second spring 394b is positioned at free end 92b of the second plunger segment 92b so as to limit travel and impact of the plunger 80' with inner surface 102' of the rear support member 102 that may be in interfacing relationship with the free end 92b' of the second plunger segment 92b, and to return the plunger 80 to the pre-test configuration.

Again in a similar manner, the coil mount 388c includes a first end 396a and a second end 396b. The second end 392a is configured as a partially arch-shaped support end 394 having electrical contacts 3961 and 3962 that are configured in a prong-like manner to be inserted into the printed circuit board 38 to receive electrical current for power and control.

Referring now to FIGS. 34-36, again in conjunction with FIGS. 1-5, there is illustrated a circuit interrupter, e.g., GFCI device 40, in which a moving mechanism interferes with travel of the plunger to prevent the plunger from opening the switch 11 during the self-test of the GFCI device 40. More particularly, GFCI device 40 includes the fault circuit interrupting combined coil and plunger assembly 8 that includes bobbin (with coil wire) 82 having cavity 50 (see FIG. 5) in which elongated cylindrical plunger. 80 is slidably disposed.

In a similar manner as with respect to GFCI device 10, GFCI device 40 again also includes a circuit interrupting test assembly 400 that is configured to enable an at least partial operability self test of the GFCI device 40, without user intervention, via at least partially testing operability of at least one of the coil and plunger assembly 8 and of the fault sensing circuit (see FIGS. 1-5 and FIG. 34). The circuit interrupting test assembly 400 includes a test initiation circuit that is configured to initiate and conduct an at least partial operability test of the circuit interrupter, e.g., GFCI device 40, and a test sensing circuit that is configured to sense a result of the at least partial operability test of the circuit interrupter or GFCI device 40.

Figure 35:
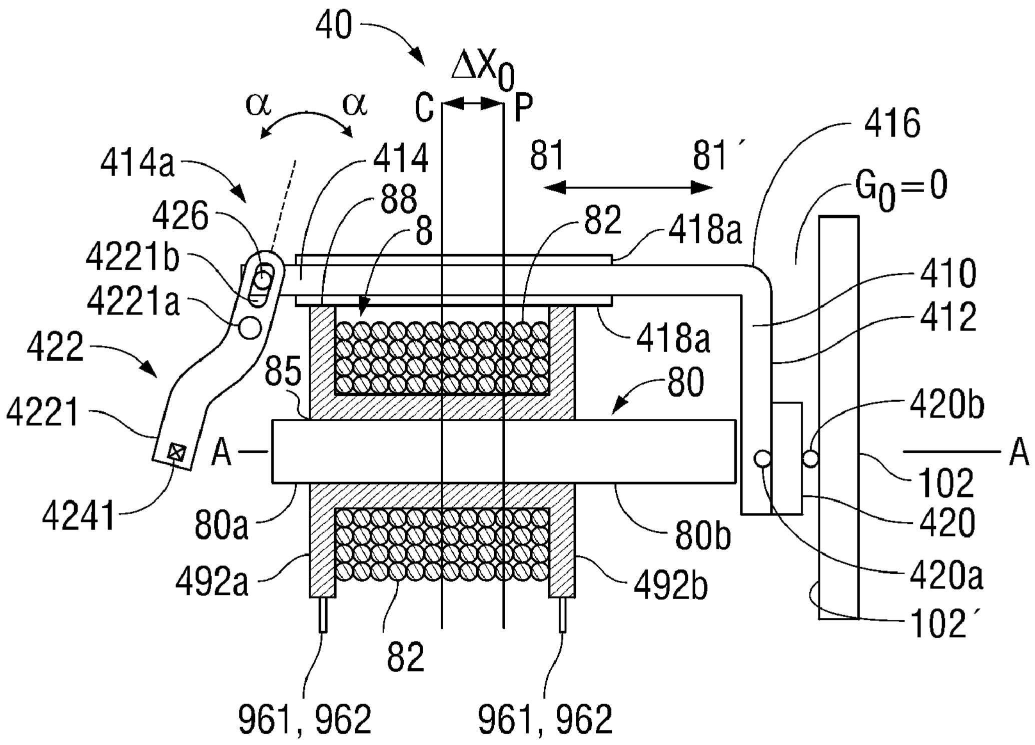
FIG. 35 is a cross-sectional view of one embodiment of a part of a circuit interrupting device according to FIG. 34 in a pre-test or non-actuated configuration in which the moving mechanism maintains a rotating member in a position that does not interfere with movement of the plunger in the pre-test or non-actuated configuration.
Figure 36:
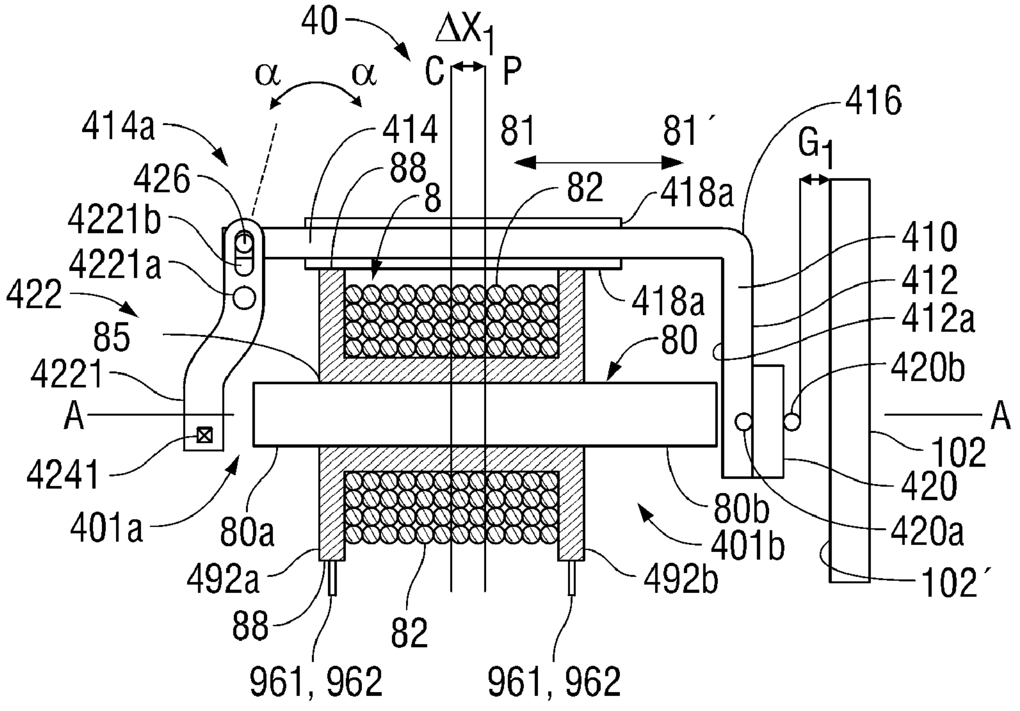
FIG. 36 is a cross-sectional view of the circuit interrupting device according to FIG. 35 in a post-test configuration illustrating the moving mechanism driving the rotating member to interfere with movement of the plunger in the post-test configuration.
Figure 37:
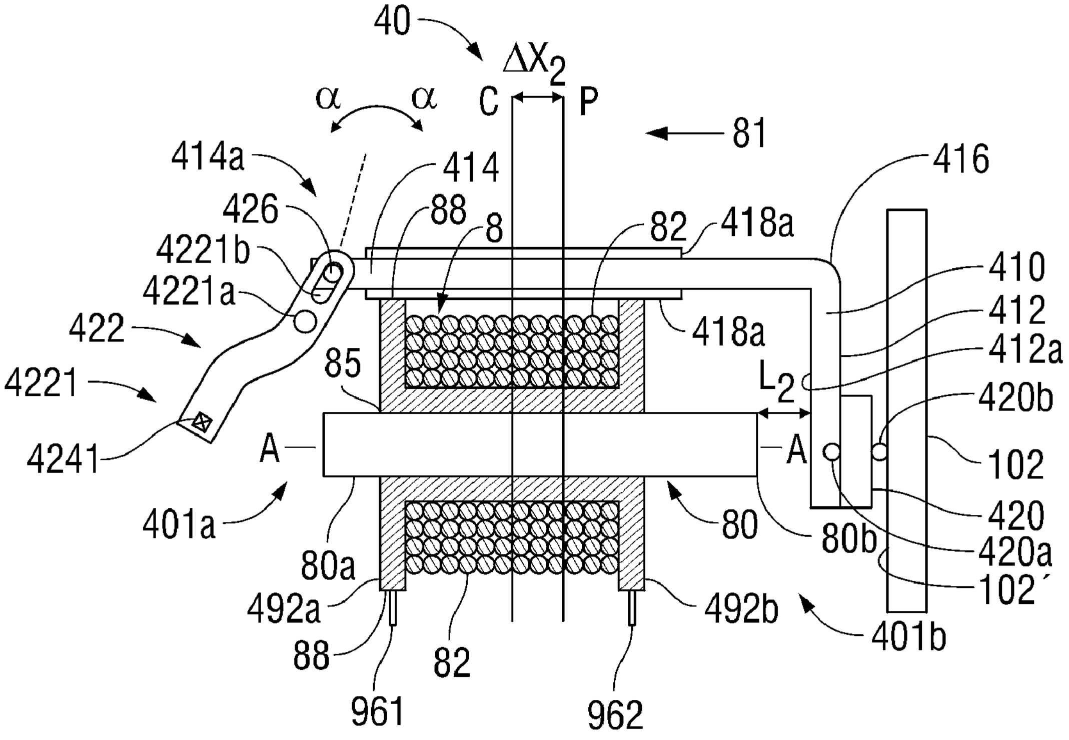
FIG. 37 is a cross-sectional view of the circuit interrupting device according to FIG. 35 in a fault actuation configuration in which the moving mechanism maintains the rotating member in a position that does not interfere with movement of the plunger in the fault actuation configuration.

In a similar manner as described previously, the printed circuit board 38 also serves as rear or bottom support member for the solenoid coil 82. As best shown in FIGS. 35-37, the coil 82 is wound around generally cylindrically-shaped bobbin or coil mount 88. The coil mount 88 includes a first end 492a and a second end 492b. The first end 492a and the second end 492b are configured as partially arch-shaped support ends having electrical contacts 961 and 962 that are configured in a prong-like manner to be inserted into the printed circuit board 38 to receive electrical current for power and control.

As described previously, the solenoid coil 82 has centrally disposed orifice 85 that is configured and disposed to enable the plunger 80 to move through the orifice 85 upon transfer of the circuit interrupting device 40 from the pre-test configuration to the post-test configuration. The orifice 85 defines a forward end or downstream end 85a and a rear end or upstream end 85b of the solenoid coil 82. The plunger 80 moves away from, or through, the rear end 85b towards the forward end 85a during the fault actuation of the plunger 80.

In a similar manner as described previously, to support the detecting and sensing members of the circuit interrupting test assembly 400 of the present disclosure, GFCI device 40 also includes rear support member 102 that is positioned or disposed on the printed circuit board 38 and with respect to the cavity 50. However, one surface 102' of the rear support member 102 is now in interfacing relationship with the second end 80b of the plunger 80 and may be substantially perpendicular or orthogonal to the movement of the plunger 80 as indicated by arrow 81.

Additionally, first and second lateral support members 104a and 104b, respectively, are positioned or disposed on the printed circuit board 38 and with respect to the cavity 50 so that one surface 104a' and 104b' of first and second lateral support members 104a and 104b, respectively, may be substantially parallel to the movement of the plunger 80 as indicated by arrow 81 and in interfacing relationship with the plunger 80. Thus, the rear support member 102 and the first and second lateral support members 104a and 104b, respectively, partially form a box-like configuration around the plunger 80. The rear support member 102 and the first and second lateral support members 104a and 104b, respectively, may be unitarily formed together or be separately disposed or positioned on the circuit board 38. The printed circuit board 38 thus serves as a rear or bottom support member for the combination solenoid coil and plunger that includes the coil or bobbin 82 and the plunger 80.

As mentioned, the circuit interrupting test assembly 400 of the GFCI device 40 again includes a test initiation circuit and a test sensing circuit, which are illustrated schematically as a combined self-test initiation and sensing circuit 404, although again the test initiation features and the sensing features can be implemented by a separate test initiation circuit and a separate test sensing circuit.

Referring to FIGS. 34 and 35-37, the solenoid coil and plunger assembly 8 forms a first magnetic pole 401a in the vicinity of the first end 492a and a second magnetic pole 401b in the vicinity of the second end 492b when the coil 82 is energized (see FIGS. 36 and 37). The polarity of the first magnetic pole 401a and of the second magnetic pole 401b varies depending upon phase of flow of electrical current through the solenoid coil 82 when the coil 82 is energized.

Figure 34:
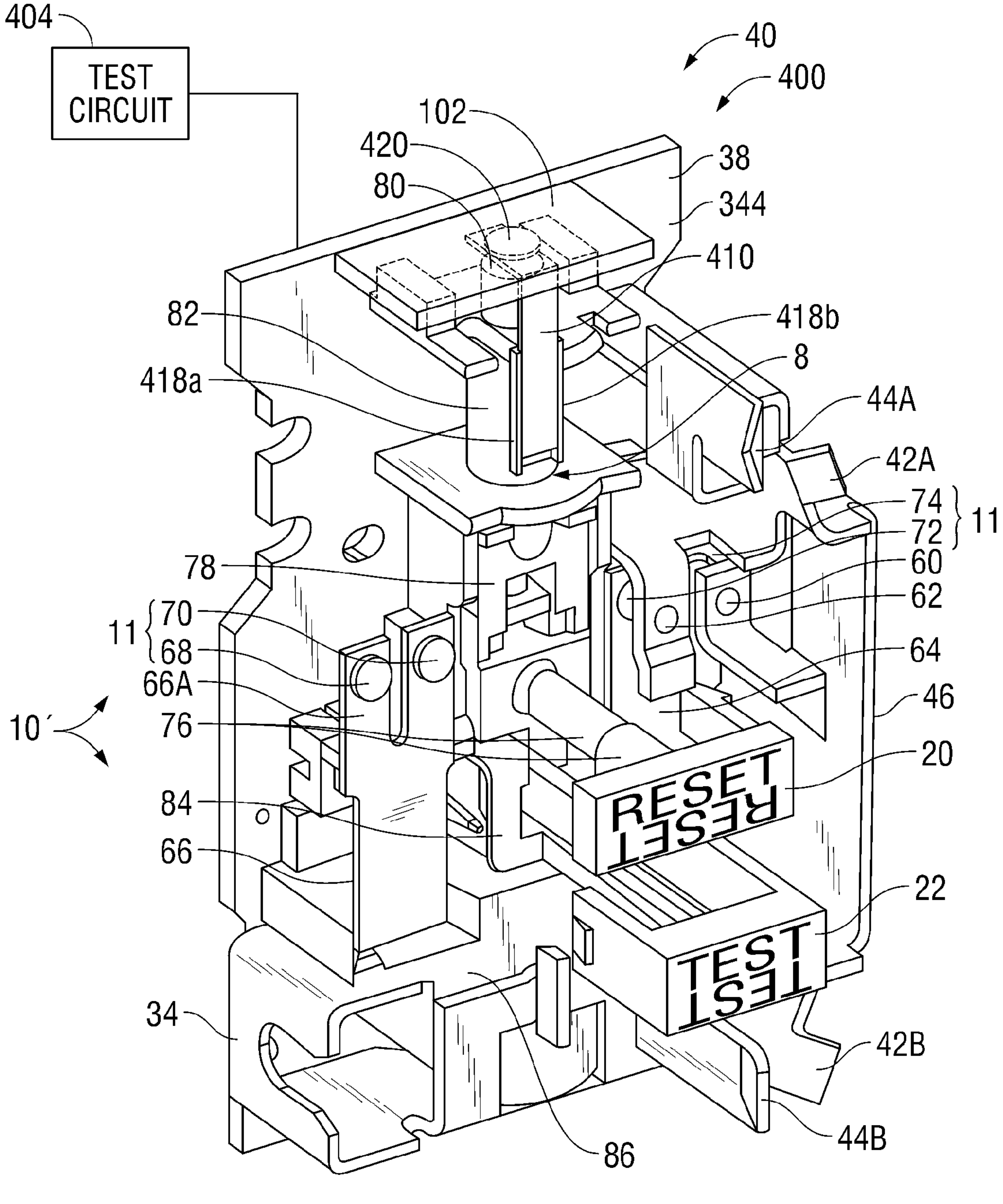
FIG. 34 is a perspective view of one embodiment of a part of a circuit interrupting device in which a moving mechanism interferes with travel of the plunger to prevent the plunger from actuating the GFCI device during a transfer from a pre-test configuration or non-actuated configuration to a post-test configuration.

The test assembly 400 further includes a movable support member 410 that is positioned with respect to the stationary coil 82 and is configured to move with respect to the solenoid coil and plunger assembly, e.g., the stationary coil 82, depending upon the polarity of the first magnetic pole 401a and of the second magnetic pole 401b. More particularly, the movable support member 410 may be configured as an L-shaped bracket having a substantially planar leg section 412 and a substantially planar back section 414 that are joined via a bend or joint 416 to form the L-shape via a generally 90-degree angle between the leg section 412 and the back section 414. As best illustrated in FIG. 34, the back section 414 is disposed over the coil 82 in guides or rails 418*a* and 418*b* that are supported by a suitable supporting member (not shown) of the GFCI device 40 such that the leg section 412 is in interfacing relationship with respect to the second end 492*b* of the coil 82 and the rear support member 102, and is disposed there between. The back section 414 therefore interfaces with the windings of the coil 82 and is movable longitudinally along centerline axis A-A of the coil and plunger assembly 8. Since the plunger 80 is disposed in centrally-disposed orifice 85 of the bobbin 88, the leg section 412 also interfaces with the second end 80*b* of the plunger.

The movable support member 410 further includes a magnetic member 420, e.g., a permanent magnet, disposed with respect to the solenoid coil 82 wherein a magnetic force is generated between the magnetic member 420 and the first magnetic pole 401*a* and/or the second magnetic pole 401*b* formed when the coil 82 is energized. The magnetic force effects movement of the movable support member 410 with respect to the solenoid coil 82. More particularly, the leg section 412 includes a front surface 412*a* that interfaces with the second or rear end 80*b* of the plunger 80 and a rear surface 412*b* that interfaces with the rear surface 102' of the rear support member 102. The magnetic member 420, in the form of a permanent magnet in the exemplary embodiment illustrated in FIGS. 34-37, is characterized by a first magnetic pale 420*a* and a second magnetic pole 420*b*. The magnetic member 420 is disposed on the leg section 412 such that the first magnetic pole 420*a* is in contact with rear surface 412*b* and such that second magnetic pole 420*b* is in interfacing relationship with the rear support member 102. The magnetic member 420 is fixedly attached to the leg section 412 so as to force movement of the movable support member 410 along the centerline axis A-A of the coil and plunger assembly 8 when a magnetic force is established between the second magnetic pole 401*b* formed by the coil and plunger assembly 8 in the vicinity of the second end 85*b* when the coil 82 is energized and the first magnetic pole 420*a*.

The movable support member 410 further includes a plunger movement interference member 422, e.g., a hinged arm, as illustrated in FIGS. 35-37. The plunger movement interference member 422 is operatively coupled to the movable support member 410 such that the movement of the movable support member 410 with respect to the solenoid coil 82 in at least one direction along the centerline axis A-A, e.g., in the fault actuation direction 81, effects interference by the plunger movement interference member 422 with the movement of the plunger 80.

Conversely, the plunger movement interference member 422 is operatively coupled to the movable support member 410 such that the movement of the movable support member 410 with respect to the solenoid coil 82 in at least another direction along the centerline axis A-A, e.g., in a direction that is opposite to the fault actuation direction 81, avoids interference by the plunger movement interference member 422 with movement of the plunger 80.

As illustrated in FIGS. 35-37, the plunger movement interference member 422 is configured as a hinged arm 4221 to rotate, via a stationary hinge pin 4221*a* that includes a slot 4221*b*. Forward end 414*a* of the back section 414 includes a pin 426 that engages with slot 4221*b* and is free to move within the slot 4221*b*. Thus the hinged arm 4221 rotates at forward end 414*a* with respect to the movable support member 410 in the direction indicated by arrows a-a around pin 426 to effect the interference by the plunger movement interference member 422, e.g., hinged arm 4221, with movement of the plunger 80 by establishing contact with the forward end 80*a* of the plunger during the post-test configuration of the GFCI device 40 as illustrated in FIG. 37.

Thus, the plunger movement interference member 422 is disposed on the movable support member 410 to interfere with the movement of the plunger 80 on the forward end 85*a* of the solenoid coil 82.

The magnetic member 420 has at least two magnetic poles 420*a* and 420*b*, . The magnetic member 420 is disposed on the movable support member 410, and more particularly on the leg section 412, such that at least one pole 420*a* or 420*b* of the magnetic member 420 interfaces with the first magnetic pole 401*a* and/or the second magnetic pole 401*b* of the solenoid coil and plunger assembly 8 that is formed when the coil 82 is energized.

Thus, magnetic member 420 is disposed on the movable support member 410 to exert the magnetic force between the movable support member 410 and the solenoid coil 82 in the vicinity of the upstream end 85*b* of the orifice 85 to effect movement of the movable support member 410 with respect to the solenoid coil 82.

The plunger 80 defines a longitudinal centerline position P along the centerline axis A-A of the plunger that is movable with the movement of the plunger, while the solenoid coil 82 defines a stationary centerline position C along the centerline axis A-A that coincides with the orifice 85. Since the longitudinal centerline position P is variable, the distance between the longitudinal centerline position P and the stationary centerline position C defines a difference in distance ΔX between the stationary centerline position C and the longitudinal centerline position P.

In the pre-test or non-actuated configuration of the GFCI device 40 illustrated in FIG. 35, the movable support member 410 is in a retracted position such that the magnetic member 420 fixedly attached or mounted on the leg section 412 and the leg section 412 are stopped from further movement in a direction opposite to the fault actuation direction 81 by the rear support member 102. The hinged arm 4221 is in an elevated position that avoids interference by the plunger movement interference member 422, e.g., the hinged arm 4221. The hinged arm 4221 includes a plunger movement test detection switch or sensor 4241 that is configured to detect movement of the plunger 80 when the hinged arm 4221 establishes contact with the forward end 80*a* of the plunger during the post-test configuration of the GFCI device 40 as illustrated in FIG. 37. The solenoid coil 82 is not energized so that neither the first magnetic pole 401*a* nor the second magnetic pole 401*b* is formed in this configuration. Thus, no magnetic force is established between the solenoid coil 82 and the magnetic member 420.

The magnetic member 420 is in contact with the rear surface 102' of the rear support member 102, thereby preventing further movement of the movable support member 410 and the rear end 80*b* of the plunger 80 is in contact with the leg section 412, and more particularly with forward surface 412*a* of leg section 412.

The difference in distance between the longitudinal centerline position P and the stationary centerline position C for the pre-test or non-actuated configuration is ΔX0.

FIG. 36 illustrates the post-test configuration of the GFCI device 40. The coil 82 is energized by an electrical current flowing through the coil in a direction such that the plunger 80 is actuated due to the magnetic field created by the coil 82 and that is induced in the electrically conductive plunger 80 such that the magnetic or longitudinal center P of the plunger 80 moves towards the magnetic or longitudinal center C of the coil 80, and therefore along the centerline A-A towards the downstream end 85*a* of the coil and plunger assembly 8 in the fault actuation direction 81, such that the difference in, distance between the longitudinal centerline position P and the stationary centerline position C for the post-test configuration is ΔX1. The distance ΔX1 is less than the distance ΔX0 of the pre-test or non-actuated configuration illustrated in FIG. 35. In addition, as described above, the magnetic member 420 is disposed on the movable support member 410 to exert the magnetic force between the movable support member 410 and the solenoid coil 82 in the vicinity of the upstream end 85*b* of the orifice 85 to effect movement of the movable support member 410 with respect to the solenoid coil 82. As described previously, the hinged arm 4221 rotates at forward end 414*a* of the back section 414 with respect to the movable support member 410 to effect the interference by the plunger movement interference member 422, e.g., hinged arm 4221, with movement of the plunger 80 by establishing contact with the forward end 80*a* of the plunger during the post-test configuration of the GFCI device 40 as illustrated in FIG. 37. The movable support member 410 and the plunger 80 move concurrently and co-directionally along the centerline A-A such that a gap G1 is formed between the magnetic member 420 and the rear support member 102.

FIG. 37 illustrates the fault actuation configuration of the GFCI device 40. In a similar manner as with respect to the post-test configuration described with respect to FIG. 36, the coil 82 is energized by an electrical current flowing through the coil in a direction such that the plunger 80 is actuated due to the magnetic field created by the coil 82 and that is induced in the electrically conductive plunger 80 such that the magnetic or longitudinal center P of the plunger 80 moves towards the magnetic or longitudinal center C of the coil 80, and therefore along the centerline A-A towards the downstream end 85*a* of the coil and plunger assembly 8 in the fault actuation direction 81, such that the difference in distance between the longitudinal centerline position P and the stationary centerline position C for the fault actuation configuration is ΔX2. The fault actuation configuration distance is ΔX2 is less than the post-test configuration distance ΔX1 and also is less than the distance ΔX0 of the pre-test or non-actuated configuration illustrated in FIG. 35.

During the transfer of the GFCI device 40 to the fault actuation configuration, the plunger movement interference member 422, e.g., hinged arm 4221, remains in an elevated configuration so as not to interfere with movement of the plunger 80. The elevated configuration of the plunger movement interference member 422 may be substantially identical to the elevated configuration of the plunger movement interference member 422 in the pre-test configuration illustrated in FIG. 35.

As described previously, the magnetic member 420 remains in contact with the rear surface 102' of the rear support member 102, thereby preventing movement of the movable support member 410 along the centerline A-A towards the downstream end 85*a* of the coil and plunger assembly 8 in the fault actuation direction 81. However, in contrast to the post-test configuration of the GFCI device 40 illustrated in FIG. 36, the movement of the plunger 80 and the rear end 80*b* of the plunger 80 along the centerline A-A towards the downstream end 85*a* of the coil and plunger assembly 8 in the fault actuation direction 81 causes a gap L2 to form between the rear or upstream end 80*b* of the plunger and the leg section 412 of the movable support member 410, and more particularly between the forward surface 412*a* of leg section 412.

As can be appreciated from the foregoing description of the configurations of GFCI device 40 as illustrated in FIGS. 35-37, the longitudinal center of the piston P is not aligned with the longitudinal center of the solenoid coil C for any of the configurations.

FIGS. 38, 38A, 39 and 40 illustrate a similar GFCI device 40' according to one embodiment of the present disclosure that is in all respects identical to the GFCI device 40 described above with respect to FIGS. 35-37 with the exception that plunger movement interference member 422 is configured to translate with respect to movable support member 410' to effect the interference by the plunger movement interference member 422 with movement of the plunger, rather than rotate as described above with respect to GFCI device 40. Only the forward end of movable support member 410' differs from the forward end of movable support member 410. As a result, only the differences between the movable support members 410 and 410' will be described.

Figure 38:
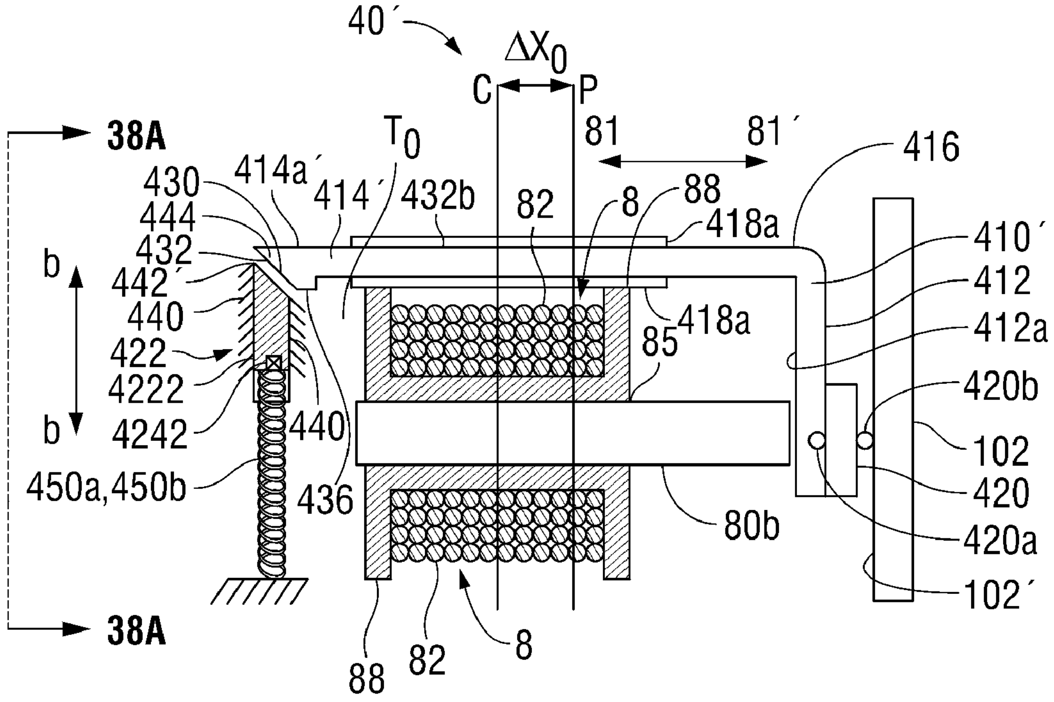
FIG. 38 is a cross-sectional view of one embodiment of a part of a circuit interrupting device according to FIG. 34 in a pre-test or non-actuated configuration in which the moving mechanism maintains a translating member in a position that does not interfere with movement of the plunger in the pre-test or non-actuated configuration.
Figure 38A:
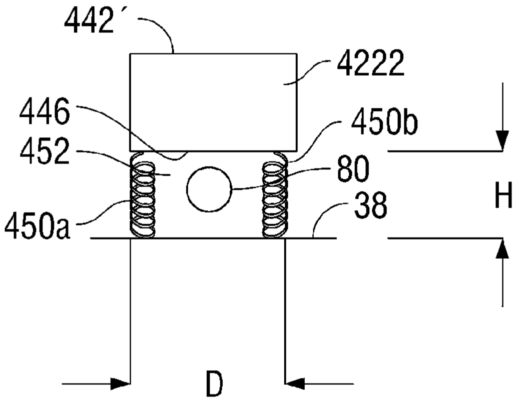
FIG. 38A is view of the translating member in the pre-test or non-actuated configuration as viewed from direction 38A of FIG. 38.
Figure 38B:
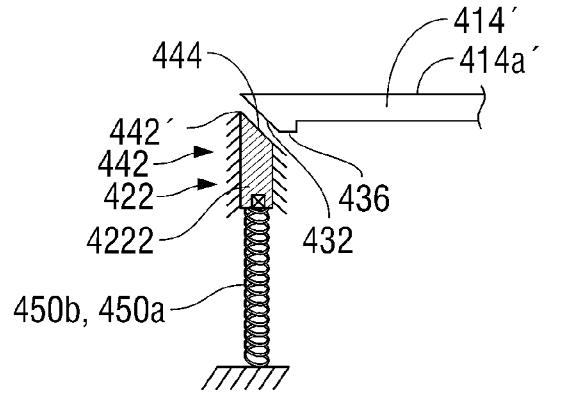
FIG. 38B is side view of the translating member and a portion of the moving mechanism of FIG. 38A.

FIGS. 38, 38A and 38B illustrate the pre-test or non-actuated configuration of GFCI device 40' that is analogous to the pre-test or non-actuated configuration of GFCI device 40 of FIG. 35. Movable support member 410' now includes a forward end 414*a*' of back section 414'. The back section 414' includes an upper surface 432*b* that is distal to the coil 82 and a lower surface 432*a* that is proximal to the coil 82.

Tip 430 of forward end 414*a*' is formed by a sloped surface 432 that intersects upper surface 432*b* at an acute angle and is also formed by a protrusion 434 having a substantially planar surface 436 that intersects sloped surface 432 at an oblique angle and wherein the surface 436 is further proximal to the coil 82 as compared to the lower surface 432*a*, and may be substantially parallel to the lower surface 432*a*.

The GFCI device 40' also includes as plunger movement interference member 422 a translating plate-like member 4222 that is slidingly disposed in a guide channel 440 that is disposed, configured and dimensioned to enable reciprocal translation of the translating plate-like member 4222 in a direction that is transverse to the forward or downstream end 80*a* of the plunger 80, as indicated by the arrow b-b. Upper end 442 of the plate-like member 4222 is formed by a sloped surface 444 that at least partially interfaces with the sloped surface 432 of the movable support member 410'. The sloped surface 444 forms a tip 442' of the upper end 442.

Lower end 446 of the translating plate-like member 4222 is supported by first and second compression springs 450*a* and 450*b* that are disposed on printed circuit board 38 at a distance D spaced apart to form an aperture or passageway 452 under the lower end 446 of the plate-like member 4222 to enable the forward end 80*a* of the plunger 80 to pass through the aperture or passageway 452 under the lower end 446 when the translating plate-like member 4222 is in an elevated distance H above the PCB 38, as shown in FIGS. 38A-38B.

In a similar manner as described above with respect to GFCI device 40, the difference in distance between the longitudinal centerline position P and the stationary centerline position C for the pre-test or non-actuated configuration is ΔX0.

As described in more detail below with respect to FIG. 40, the plunger 80 passes through the aperture or passageway 452 under the lower end when the GFCI device 40' is transferred to the fault actuation configuration.

Figure 39:
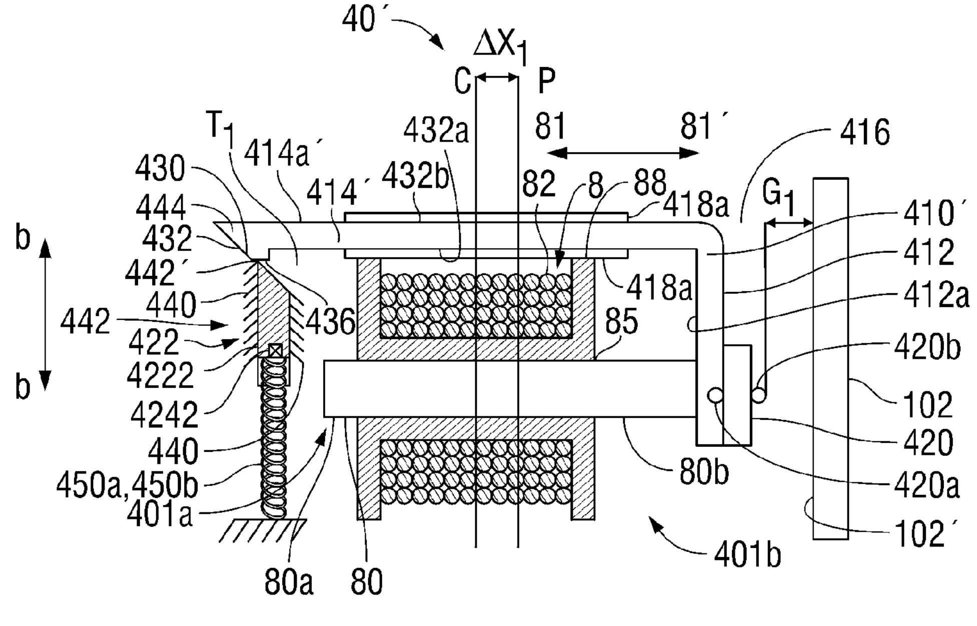
FIG. 39 is a cross-sectional view of the circuit interrupting device according to FIG. 38 in a post-test configuration illustrating the moving mechanism driving the translating member to interfere with movement of the plunger in the post-test configuration.

FIG. 39 illustrates the post-test configuration of the GFCI device 40' that is analogous to the post-test configuration of GFCI device 40 illustrated in FIG. 36. Again, the coil 82 is energized by an electrical current flowing through the coil in a direction such that the plunger 80 is actuated due to the magnetic field created by the coil 82 and that is induced in the electrically conductive plunger 80 such that the magnetic or longitudinal center P of the plunger 80 moves towards the magnetic or longitudinal center C of the coil 80, and therefore along the centerline A-A towards the downstream end 85*a* of the coil and plunger assembly 8 in the fault actuation direction 81, such that the difference in distance between the longitudinal centerline position P and the stationary centerline position C for the post-test configuration is ΔX1. The distance ΔX1 is less than the distance ΔX0 of the pre-test or non-actuated configuration illustrated in FIG. 38. In addition, as described above, the magnetic member 420 is disposed on the movable support member 410' to exert the magnetic force between the movable support member 410' and the solenoid coil 82 in the vicinity of the upstream end 85*b* of the orifice 85 to effect movement of the movable support member 410 with respect to the solenoid coil 82.

As the movable support member 410' advances forward in the fault actuation direction 81 under the magnetic force, the sloped surface 432 of the tip 430 exerts a force on the sloped surface 444 that forms the upper end 442 of the plate-like member 4222. As the tip 430 of movable support member 410' continues to advance forward, the sloped surface 432, acting on the sloped surface 444, forces the plate-like member 4222 to translate in a downward direction towards the PCB 38. The plate-like member 4222 translates in a downward direction while guided by the guide channel 440, thereby compressing the springs 450*a* and 450*b*. The tip 430 continues to move forward until the sloped surface 432 overrides the tip 442' of the upper end 442 of the plate-like member 4222 such that the substantially planar surface 436 of the forward end 414*a*' of the movable support member 410' eventually interfaces with and holds in position the tip 442' of the plate-like member 4222. Since the plate-like member 4222 has moved downward in the direction of arrow b-b towards the printed circuit board 38 against the compressive force of the springs 450*a* and 450*b* such that the lower end 446 is now at a distance H' above the PCB 38, the area of the aperture or passageway 452 (H' times D) is correspondingly reduced and the plate-like member 4222 is now in a position to interfere with further forward motion of the forward end 80*a* of the plunger 80. In a similar manner as with respect to GFCI device 40, the movable support member 410' and the plunger 80 move concurrently and co-directionally along the centerline A-A such that gap G1 is formed between the magnetic member 420 and the rear support member 102.

The plate-like member 4222 further includes a test sensor or sensing switch 4242 that is disposed and configured on the plate-like member 4222 to emit a signal upon contact of the forward end 80*a* of the plunger 80 with the plate-like member 4222 during the transfer from the pre-test configuration illustrated in FIG. 38 to the post-test configuration illustrated in FIG. 39.

Figure 40:
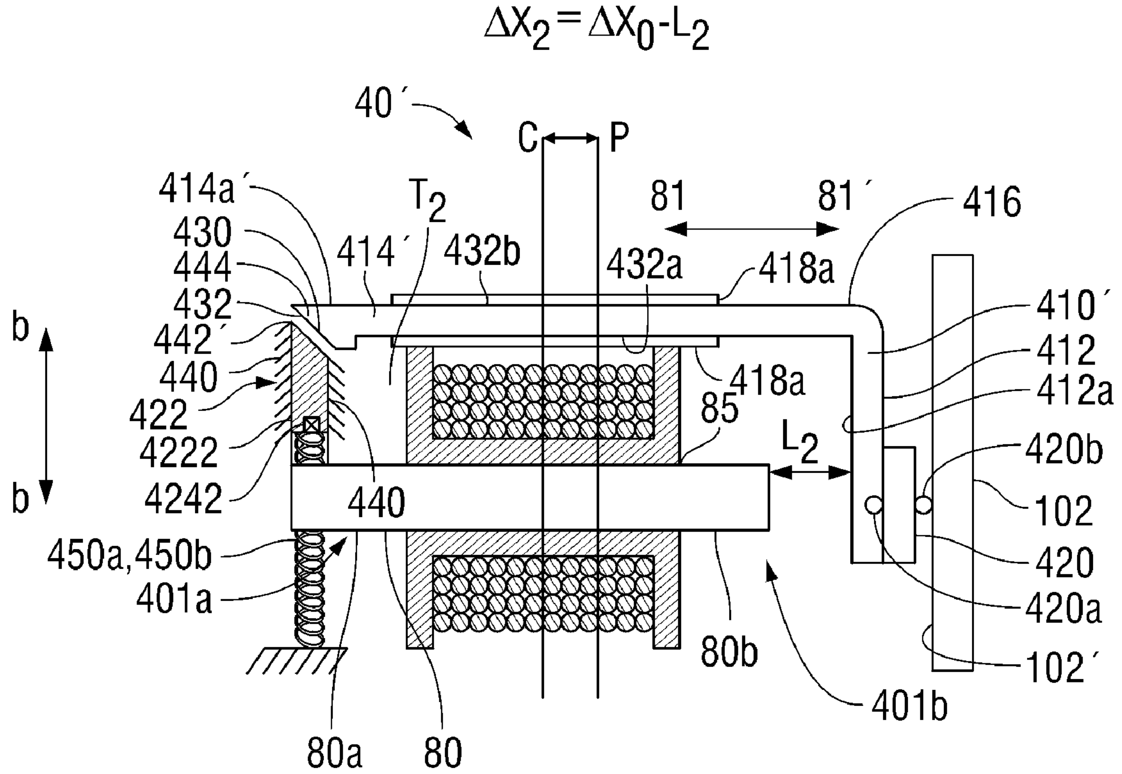
FIG. 40 is a cross-sectional view of the circuit interrupting device according to FIG. 38 in a fault actuation configuration in which the moving mechanism maintains the translating member in a position that does not interfere with movement of the plunger in the fault actuation configuration.

FIG. 40 illustrates the fault actuation configuration of the GFCI device 40' that is analogous to the fault actuation configuration of GFCI device 40 illustrated in FIG. 37. During the transfer of the GFCI device 40' to the fault actuation configuration, the plunger movement interference member 422, e.g., translating plate-like member 4222, remains in an elevated configuration so as not to interfere with movement of the plunger 80. Again, the elevated configuration of the plunger movement interference member 422 may be substantially identical to the elevated configuration of the plunger movement interference member 422 in the pre-test configuration illustrated in FIG. 38. Again, movement of the movable support member 410' during the transfer of the GFCI device 40' from the pre-test configuration illustrated in FIG. 38 to the fault actuation configuration illustrated in FIG. 40 is prevented. The movement of the plunger 80 and the rear end 80*b* of the plunger 80 along the centerline A-A towards the downstream end 85*a* of the coil and plunger assembly 8 in the fault actuation direction 81 causes a gap L2 to form between the rear or upstream end 80*b* of the plunger and the leg section 412 of the movable support member 410, and more particularly between the forward surface 412*a* of leg section 412.

In the fault actuation configuration illustrated in FIG. 40 that is analogous to the fault actuation configuration of GFCI device 40 illustrated in FIG. 37, the forward end 80*a* of the plunger 80 advances in the fault actuation direction 81 such that the forward end 80*a* is disposed in the aperture or passageway 452 and under the lower end 446 of the plate-like member 4222. In a similar manner as with respect to the post-test configuration described with respect to FIG. 39, the coil 82 is energized by an electrical current flowing through the coil in a direction such that the plunger 80 is actuated due to the magnetic field created by the coil 82 and that is induced in the electrically conductive plunger 80 such that the magnetic or longitudinal center P of the plunger 80 moves towards the magnetic or longitudinal center C of the coil 80, and therefore along the centerline A-A towards the downstream end 85*a* of the coil and plunger assembly 8 in the fault actuation direction 81, such that the difference in distance between the longitudinal centerline position P and the stationary centerline position C for the fault actuation configuration is ΔX2. Again, the fault actuation configuration distance ΔX2 is less than the post-test configuration distance ΔX1 and also is less than the distance ΔX0 of the pre-test or non-actuated configuration illustrated in FIG. 38.

Again, the movement of the plunger 80 and the rear end 80*b* of the plunger 80 along the centerline A-A towards the downstream end 85*a* of the coil and plunger assembly 8 in the fault actuation direction 81 causes gap L2 to form between the rear or upstream end 80*b* of the plunger and the leg section 412 of the movable support member 410', and more particularly between the forward surface 412*a* of leg section 412.

As also can be appreciated from the foregoing description of the configurations of GFCI device 40' as illustrated in FIGS. 38, 38A, 38B, 39 and 40, the longitudinal center P of the plunger or piston 80 is not aligned with the longitudinal center C of the solenoid coil 82 for any of the configurations.

Referring again, for example, to FIGS. 18-19, the present disclosure relates also to a method of testing a circuit interrupting device 20, e.g., GFCI device 20*a*, that includes the steps of: generating an actuation signal; causing the plunger 80' to move in response to the actuation signal, without causing the switch 11, that when in the closed position enables flow of electrical current through the circuit interrupting device 20, e.g., GFCI device 20*a*, to open; measuring the movement of the plunger 80'; and determining whether the movement reflects at least a partial movement of the plunger 80' in a test direction 83, from a pre-test configuration similar to pre-test configuration 1001*a* illustrated in FIG. 6 (the exception being that no sensor 1000 is present in the embodiment of GFCI device 20*a*) to a post-test configuration similar to post-test configuration 1002*b* illustrated in FIG. 9 (again, the exception being that no sensor 1000 is present in the embodiment of GFCI device 20*a*), without opening the switch 11. The method may be performed wherein the plunger 80' moves in the fault direction 81 during operation of the circuit interrupting device 20, and the step of causing the plunger 80' to move in response to the actuation signal is performed by causing the plunger 80' to move in test direction 83 or 83'. The test direction 83' may be in the same direction as the fault direction 81. Alternatively, test direction 83 is in a direction different from the fault direction 81 and specifically test direction 83 of the plunger 80' may be in a direction opposite to the fault direction 81.

As described above with respect to, for example, FIGS. 18-19, wherein the plunger 80' has a magnetic field associated therewith, e.g., the plunger is made from a magnetic material or includes magnetic member 90 (see FIG. 19), the step of detecting if the plunger 80' has moved is performed by measuring at least partial movement of the plunger 80' by detecting movement of the magnetic field associated with the plunger from the pre-test configuration 1002*a* to the post-test configuration 1002*b* (see FIGS. 8-9).

Referring for example to FIG. 20, the method of testing may be performed wherein the circuit interrupting device 20*b* includes test switch 210 associated with movement of the plunger 80, and the step of detecting if the plunger 80 has moved is performed by mechanically actuating the test switch 210, e.g., contact switch 2101, by movement of the plunger 80. In another embodiment, the method of testing may be performed wherein the step of detecting if the plunger 80 has moved is performed by emitting a signal to the circuit interrupting coil 82 for a duration of time less than that required to open the circuit interrupting switch 11 and/or has a voltage level less than that required to open the switch 11, and measuring a change in inductance between the inductance of the one or more circuit interrupting coils 82 in the pre-test configuration 1002*a* and the inductance of the one or more circuit interrupting coils 82 in the post-test configuration 1002*b* (see FIGS. 8-9).

In still another embodiment, referring again to FIG. 21, the method of testing may be performed wherein the circuit interrupting device 20*c* includes at least one circuit interrupting coil 82 causing the movement of the plunger 80 in response to the actuation signal and at least one piezoelectric element or member 2102 generating a test sensing signal indicating movement of the plunger 80 upon sensing an acoustic signal generated by actuation and movement of the plunger 80 without opening the circuit interrupting switch 11. The step of detecting if the plunger 80 has moved is performed by the piezoelectric element or member 2102 sensing the acoustic signal generated by the actuation and movement of the plunger 80 without opening the circuit interrupting switch 11.

Referring to FIGS. 22-23, again the circuit interrupting device 20*d*, 20*e* includes plunger 80 having a magnetic field associated therewith, e.g., the plunger is made from a magnetic material or includes magnetic member 90 (see FIG. 19), and the step of detecting if the plunger 80 or 80' has moved may be performed by measuring inductance of the solenoid coil 82 after electrical actuation of the coil.

In one embodiment, the step of detecting if the plunger 80 has moved is performed by measuring at least partial movement of the plunger 80 by sensing a magnetic field generated by circuit interrupting coil 82 of the circuit interrupting device 20 caused by a test sensing signal to coil 82. The step of sensing a magnetic field generated by circuit interrupting coil 82 may be performed by magnetic reed switch 2103 (FIG. 22) or Hall-effect sensor 2104 (FIG. 23) sensing the magnetic field generated by the circuit interrupting coil 82.

Alternatively, the method of testing circuit interrupting device 20 may be performed without directly sensing at least partial movement of the plunger 80. The method therein includes generating a test sensing signal indicating actuation of the coil 82 upon sensing a magnetic field generated by the coil 82. Again, the step of sensing a magnetic field generated by the coil 82 may be performed by magnetic reed switch 2103 (FIG. 22) or Hall-effect sensor 2104 (FIG. 23) sensing the magnetic field generated by the circuit interrupting coil 82.

Referring again to the embodiments of circuit interrupting device 30 illustrated in FIGS. 24-33, another embodiment of the method of testing may be performed wherein the circuit interrupting device 30 includes at least one circuit interrupting coil 82 causing the movement of the plunger 80 and at least one test coil 382 such that the plunger 80 moves towards the test coil 382 upon electrical actuation of the test coil 382. The method of testing comprises the step of causing the plunger 80 to move through an orifice, e.g., the centrally disposed orifice 385*a* of test coil 382*a* in FIGS. 24-26, of the test coil 382 upon electrical actuation of the test coil 382.

In another embodiment of the method of testing the circuit interrupting device 30 of FIGS. 24-33, the plunger 80 has a magnetic field associated therewith, e.g., the plunger is made of a magnetic material or includes magnetic member 90 (see FIG. 33). The step of detecting if the plunger 80 has moved is performed by measuring at least partial movement of the plunger 80 by detecting a change in inductance in the one or more test coils 382 caused by the movement of the magnetic field associated with the plunger 80 with respect to the one or more test coils 382 from the pre-test configuration to the post-test configuration, in the direction as indicated by arrow 81' in FIGS. 24, 27, 30 and 32.

Referring again to FIGS. 34-40, in still another embodiment of the method of testing, the solenoid coil and plunger assembly 8 of the circuit interrupting device 40 forms a first magnetic pole 401*a* and a second magnetic pole 401*b* when the coil 82 is energized, and the polarity of the first magnetic pole 401*a* and of the second magnetic pole 401*b* varies depending upon phase of flow of electrical current through the solenoid coil 82 when the coil is energized. The method of testing further comprises the step of moving movable support member 410 that is configured to move with respect to the solenoid coil and plunger assembly 8 depending upon the polarity of the first magnetic pole 401*a* and of the second magnetic pole 401*b* that varies depending upon the phase of flow of electrical current through the solenoid coil 82 when the coil 82 is energized.

The method of testing includes the movable support member 410 further comprising magnetic member 420 disposed with respect to the solenoid coil 82 wherein a magnetic force is generated between the magnetic member 420 and one of the first and second magnetic poles 401*a* and 401*b*, respectively, formed when the coil 82 is energized. Thus the method further comprises the step of effecting movement of the movable support member 420 with respect to the solenoid coil 82 by generating a magnetic force between the magnetic member 420 and one of the first and second magnetic poles 401*a* and 401*b*, respectively, formed when the coil 82 is energized.

In one embodiment, the method of testing may further include the step of moving the movable support member 410 with respect to the solenoid coil 82 in at least one direction 81 or 81' to effect interference by plunger movement interference member 422 with the movement of the plunger 80. In one embodiment, the method of testing may further include the step of moving the movable support member 410 with respect to the solenoid coil 82 in at least one direction 81 or 81' to avoid interference by the plunger movement interference member 422 with movement of the plunger 80.

The foregoing different embodiments of a circuit interrupting device according to the present disclosure are configured with mechanical components that break one or more conductive paths to cause the electrical discontinuity. However, the foregoing different embodiments of a circuit interrupting device may also be configured with electrical circuitry and/or electromechanical components to break either the phase or neutral conductive path or both paths. That is, although the components used during circuit interrupting and device reset operations are electromechanical in nature, electrical components, such as solid state switches and supporting circuitry, as well as other types of components capable or making and breaking electrical continuity in the conductive path may also be used.

Further, those skilled in the art will recognize that although the foregoing description has been directed specifically to a ground fault circuit interrupting device, as discussed above, the disclosure may also relate to other circuit interrupting devices, including arc fault circuit interrupting (AFCI) devices, immersion detection circuit interrupting (IDCI) devices, appliance leakage circuit interrupting (ALCI) devices, circuit breakers, contactors, latching relays, and solenoid mechanisms.

Although the present disclosure has been described in accordance with the embodiments shown, one of ordinary skill in the art will readily recognize that there could be variations to the embodiments and these variations would be within the spirit and scope of the present disclosure. Accordingly, many modifications may be made by one of ordinary skill in the art without departing from the spirit and scope of the appended claims.

What is claimed is:

1. A circuit interrupting device comprising:

a first conductor;

a second conductor a switch between the first conductor and the second conductor;

the switch is disposed to selectively connect and disconnect the first conductor and the second conductor;

a circuit interrupter disposed to generate a circuit interrupting actuation signal;

a solenoid coil and plunger assembly disposed to open the switch, wherein the solenoid coil and plunger assembly is actuatable by the circuit interrupting actuation signal wherein movement of the plunger causes the switch to open; and a test assembly configured to enable a test of the circuit interrupter, to initiate at least a partial movement of the plunger in a test direction, from a pre-test configuration to a post-test configuration, without opening the switch.

2. The circuit interrupting device according to claim 1, wherein the test assembly comprises:

a test initiation circuit configured to initiate and conduct the test of the circuit interrupter; and a test sensing circuit configured to sense a result of he test of the circuit interrupter.

3. The circuit interrupting device according to claim 2, wherein the plunger of the coil and plunger assembly is configured to move in a first direction to cause the switch to open upon actuation by the fault sensing circuit, and wherein the plunger is magnetic and the test sensing circuit comprises a magnetic pickup sensor disposed to detect the movement of the magnetic plunger.

4. The circuit interrupting device according to claim 3, wherein the magnetic plunger is one of (a) formed of a magnetized material and (b) includes a permanent magnet.

5. The circuit interrupting device according to claim 4, wherein when the magnetic plunger includes a permanent magnet, the permanent magnet is one of: (a) disposed internally within an interior space of the plunger and (b) disposed between a first plunger segment and a second plunger segment.

6. The circuit interrupting device according to claim 4, wherein the circuit interrupting device is configured to measure inductance of the solenoid coil after the electrical actuation thereof.

7. The circuit interrupting device according to claim 6, wherein the circuit interrupting device is further configured to measure a change in inductance between the inductance of the at least one circuit interrupting coil in the pre-test configuration and the inductance of the at least one circuit interrupting coil in the post-test configuration.

8. The circuit interrupting device according to claim 2, where the plunger of the coil and plunger assembly is configured to move in a first direction to cause the switch to open upon actuation by the circuit interrupting actuation signal;

at least one sensor disposed such that when the circuit interrupter is in a pre-test configuration, the plunger is one of (a) in contact with the at least one sensor, and (b) not in contact with the at least one sensor; and wherein, when the circuit interrupter is in a post-test configuration, the plunger is one of (a) in contact with the at least one sensor, and (b) not in contact with the at least one sensor.

9. The circuit interrupting device according to claim 8, wherein the least one sensor comprises at least one electrical element.

10. The circuit interrupting device according to claim 9, wherein the switch between the first conductor and the second conductor is a circuit interrupting switch and wherein the at least one electrical element includes at least one test switch mechanically actuated by at least partial movement of the plunger to generate a test sensing signal indicating the at least partial movement of the plunger without opening the circuit interrupting switch.

11. The circuit interrupting device according to claim 10, wherein the test initiation circuit emits a signal lasting for a duration of time less than that required to open the circuit interrupting switch.

12. The circuit interrupting device according to claim 11, wherein the test initiation circuit includes one of a metal oxide semiconductor field effect transistor (MOSFET) and a bipolar transistor that emits the signal for a duration of time sufficient to only partially actuate the coil and plunger assembly.

13. The circuit interrupting device according to claim 10, wherein the test initiation circuit emits a signal having a voltage level less than that required to open the circuit is interrupting switch.

14. The circuit interrupting device according to claim 12, wherein the test initiation circuit includes one of a metal oxide semiconductor field effect transistor (MOSFET) and a bipolar transistor that emits the signal having a voltage level sufficient to not more than partially actuate the coil and plunger assembly.

15. The circuit interrupting device according to claim 9, wherein the at least one electrical element includes at least one piezoelectric element configured to generate a test sensing signal indicating movement of the plunger upon sensing an acoustic signal generated by actuation and movement of the plunger without opening the circuit interrupting switch.

16. The circuit interrupting device according to claim 9, wherein the plunger is magnetic and wherein the at least one electrical element includes at least one magnetic reed-type switch configured to generate a test sensing signal indicating actuation of the cult interrupting coil upon sensing motion of a magnetic field generated by the magnetic plunger.

17. The circuit interrupting device according to claim 9, wherein the plunger is magnetic and wherein the at least one electrical element includes at least one Hall-effect sensor configured to generate a test sensing signal indicating actuation of the circuit interrupting coil upon sensing motion of a magnetic field generated by the magnetic plunger.

18. A circuit interrupting device comprising:

a first conductor;

a second conductor a switch between the first conductor and the second conductor;

the switch is disposed to selectively connect and disconnect the first conductor and the second conductor;

a circuit interrupter disposed to generate a circuit interrupting actuation signal;

a solenoid coil and plunger assembly disposed to open the switch, the solenoid coil and plunger assembly is actuatable by the circuit interrupting actuation signal wherein movement of the plunger causes the switch to open;

a test assembly configured to enable a test of the circuit interrupter energize the solenoid coil without opening the switch; and at least one sensor configured to generate a test sensing signal indicating actuation of the circuit interrupting coil upon sensing a magnetic field generated by the circuit interrupting coil.

19. The circuit interrupting device according to claim 18, wherein test assembly comprises:

a test initiation circuit configured to initiate and conduct the test of he circuit interrupter; and a test sensing circuit configured to sense a result of the test of the circuit interrupter.

20. The circuit interrupting device according to, claim 19, wherein the at least one sensor includes at least one magnetic reed-type switch configured to generate a test sensing signal indicating actuation of the circuit interrupting coil upon sensing a magnetic field generated by the circuit interrupting coil.

21. The circuit interrupting device according to claim 19, wherein the at least one electrical element includes at least one Hall-effect sensor configured to generate a test sensing signal indicating actuation of the circuit interrupting coil upon sensing a magnetic field generated by the circuit interrupting coil.

22. The circuit interrupting device according to claim 2, wherein the plunger of the circuit interrupting coil and plunger assembly is configured to move in a first direction to cause the switch to open upon actuation by the circuit interrupting actuation signal, and wherein the circuit interrupting test assembly comprises at least one test coil, such that the plunger can move towards the at least one test coil upon electrical actuation of the test coil, the at least one test coil and the at least one circuit interrupting coil each having a centrally disposed orifice configured and disposed with respect to each other to enable the plunger to move through the orifice of the at least one test coil upon electrical actuation of the test coil.

23. The circuit interrupting device according to claim 22, wherein the at least one test coil is configured and disposed with respect to the at least one circuit interrupting coil wherein the orifice of the at least one test coil and the orifice of the at least one circuit interrupting coil are disposed in a sequential configuration wherein the plunger moves to and from the respective orifices upon electrical actuation of the at least one test coil.

24. The circuit interrupting device according to claim 23, wherein the at least one test coil is configured and disposed with respect to the plunger to enable, upon electrical actuation of the at least one test coil, movement of the plunger in a second direction that is opposite to the first direction causing the switch to open upon actuation by the sensing circuit.

25. The circuit interrupting device according to claim 24, wherein the at least one test coil is electrically coupled in series with the at least one circuit interrupting coil.

26. The circuit interrupting device according to claim 25, where the at least one test coil has an inductance that is greater than the inductance of the at least one circuit interrupting coil.

27. The circuit interrupting device according to claim 26 wherein the test coil and the circuit interrupting coil are configured and electrically coupled in series such that the current flow in the test coil is substantially 180 degrees out of phase with the current flow in the circuit interrupting coil to cause the resulting electromagnetic force on the plunger due to the test coil to be in a second direction that is opposite to the first direction of the resulting electromagnetic force on the plunger due to the circuit interrupting coil.

28. The circuit interrupting device according to claim 27, wherein the inductance of the at least one test coil being greater than the inductance of the at least one circuit interrupting coil such that the resulting electromagnetic force effects the movement of the plunger in the second direction that is opposite to the first direction upon electrical actuation of the at least one test coil and the at least one circuit interrupting coil.

29. The circuit interrupting device according to claim 27, further comprising:

a switch configured and disposed with respect to the at least one test coil wherein the switch opens or closes upon contact with the plunger thereby detecting movement of the plunger in the second direction.

30. The circuit interrupting device according to claim 28, wherein the at least one test coil electrically coupled in series with the at least one circuiting interrupting coil further comprises a short-to-ground switch configured to enable and disable electrical continuity of the at least one test coil.

31. The circuit interrupting device according to claim 23, wherein the at least one test coil is electrically isolated from the at least one circuit interrupting coil.

32. The circuit interrupting device according to claim 31, wherein upon electrically actuating the at least one test coil, the at least one test coil effects movement of the plunger in a second direction that is opposite to the first direction causing the switch to open upon actuation by the circuit interrupting actuation signal.

33. The circuit interrupting device according to 32, wherein the circuit interrupting device is configured to measure inductance of the at least one circuit interrupting coil after the electrical actuation of the at least one test coil by a voltage sensor configured and disposed to measure a change in voltage across the coil.

34. The circuit interrupting device according to claim 33, wherein the circuit interrupting device is further configured to measure a change in inductance between the inductance of the at least one circuit interrupting coil before the electrical actuation of the at least one test coil and the inductance of the at least one circuit interrupting coil after the electrical actuation of the at least one test coil.

35. The circuit interrupting device according to claim 22, wherein the at least one test coil is configured and disposed with respect to the at least one circuit interrupting coil wherein the at least one test coil is concentrically disposed around the at least one circuit interrupting coil, wherein the at least one circuit interrupting coil is disposed within the orifice of the at least one test coil and wherein the plunger is configured and disposed to move through the orifice of the at least one circuit interrupting coil in one of the first direction causing the switch to open upon actuation by the circuit interrupting actuation signal and a second direction that is opposite to the first direction.

36. The circuit interrupting device according to claim 35, wherein the at least one test coil is electrically isolated from the at least one circuit interrupting coil.

37. The circuit interrupting device according to claim 36, wherein the circuit interrupting device is configured such that the plunger moves through the orifice of the at least one circuit interrupting coil in one of the first direction and the second direction that is opposite to the first direction upon electrical actuation of the at least one test coil.

38. The circuit interrupting device according to 37, wherein the circuit interrupting device is configured to measure inductance of the at least one circuit interrupting coil after the electrical actuation of the at least one test coil.

39. The circuit interrupting device according to claim 38, wherein the circuit interrupting device is further configured to measure a change in inductance between the inductance of the at least one circuit interrupting coil before the electrical actuation of the at least one test coil and the inductance of the at least one circuit interrupting coil after the electrical actuation of the at least one test coil.

40. The circuit interrupting device according to claim 37, wherein the circuit interrupting device is configured to measure inductance of the at least one test coil after the electrical actuation of the at least one circuit interrupting coil.

41. The circuit interrupting device according to claim 40, wherein the plunger is magnetic.

42. The circuit interrupting device according to claim 40, wherein the circuit interrupting device is further configured to measure a change in inductance between the inductance of the at least one test coil before the electrical actuation of the at least one circuit interrupting coil and the inductance of the at least one test coil after the electrical actuation of the at least one circuit interrupting coil.

43. The circuit interrupting device according to claim 42, wherein the plunger is magnetic.

44. The circuit interrupting device according to claim 1, wherein the solenoid coil and plunger assembly forms a first magnetic pole and a second magnetic pole when the coil is energized, and wherein the polarity of the first magnetic pole and of the second magnetic pole varies depending upon phase of flow of electrical current through the solenoid coil when the coil is energized, and wherein the test assembly further comprises:

a movable support member configured to move with respect to the solenoid coil and plunger assembly depending upon the polarity of the first magnetic pole and of the second magnetic pole that varies depending upon the direction of flow of electrical current through the solenoid coil when the coil is energized.

45. The circuit interrupting device according to claim 44, wherein the movable support member further comprises a magnetic member disposed with respect to the solenoid coil wherein a magnetic force is generated between the magnetic member and one of the first and second magnetic poles formed when the coil is energized, the magnetic force effecting movement of the movable support member with respect to the solenoid coil.

46. The circuit interrupting device according to claim 45, wherein the movable support member further comprises a plunger movement interference member, wherein the plunger movement interference member is operatively coupled to the movable support member such that the movement of the movable support member with respect to the solenoid coil in at least one direction effects interference by the plunger movement interference member with the movement of the plunger, and wherein the plunger movement interference member is operatively coupled to the movable support member such that the movement of the movable support member with respect to the solenoid coil in at least another direction avoids interference by the plunger movement interference member with movement of the plunger.

47. The circuit interrupting device according to claim 46, wherein the plunger movement interference member is configured to one of (a) rotate with respect to the movable support member to effect the interference by the plunger movement interference member with movement of the plunger, and (b) translate with respect to the movable support member to effect the interference by the plunger movement interference member with movement of the plunger.

48. The circuit interrupting device according to claim 46, wherein the movement of the plunger causing the switch to open defines a fault actuation direction of the plunger, and wherein the at least one direction of movement of the movable support member that effects interference by the plunger movement interference member with movement of the plunger is in the fault actuation direction of the plunger.

49. The circuit interrupting device according to claim 46, wherein the movement of the plunger causing the switch to open defines a fault actuation direction of the plunger, and wherein the at least another direction of movement of the movable support member with respect to the solenoid coil that avoids interference by the plunger movement interference member with movement of the plunger is in a direction opposite to the fault actuation direction of the plunger.

50. The circuit interrupting device according to claim 46, wherein the solenoid coil has a centrally disposed orifice configured and disposed to enable the plunger to move through the orifice of the solenoid coil upon transfer of the circuit interrupting device from the pre-test configuration to the post-test configuration, the orifice defining an upstream end and a downstream end of the solenoid coil, the plunger moving away from the upstream end towards the downstream end during the fault actuation of the plunger, and wherein the plunger movement interference member is disposed on the movable support member to interfere with the movement of the plunger on the downstream end of the solenoid coil.

51. The circuit interrupting device according to claim 46, wherein the solenoid coil has a centrally disposed orifice configured and disposed to enable the plunger to move through the orifice of the solenoid coil upon transfer of the circuit interrupting device from the pre-test configuration to the post-test configuration, the orifice defining an upstream end and a downstream end of the solenoid coil, the plunger moving away from the upstream end towards the downstream end during the fault actuation of the plunger, and wherein the magnetic member is disposed on the movable support member to exert the magnetic force between the movable support member and the solenoid coil in the vicinity of the upstream end of the orifice to effect movement of the movable support member with respect to the solenoid coil.

52. The circuit interrupting device according to claim 51, wherein the magnetic member is disposed on the movable support member to exert the magnetic force at an end of the solenoid coil that coincides with the upstream end of the orifice.

53. The circuit interrupting device according to claim 52, the magnetic member having at least two magnetic poles, wherein the magnetic member is disposed on the movable support member such that at least one pole of the magnetic member interfaces with one of the first magnetic pole and the second magnetic pole of the solenoid coil and plunger assembly formed when the coil is energized.

54. The circuit interrupting device according to claim 47, further comprising a switch configured and disposed with respect to the plunger wherein the switch changes state upon contact by the plunger indicating thereby sufficient movement of the plunger to perform a circuit interrupting function.

55. The circuit interrupting device according to claim 1, wherein the test assembly is configured to enable a self test of the circuit interrupter via self testing at least partially movement of the plunger without opening the switch.

56. The circuit interrupting device according to claim 1, wherein the circuit interrupting device is one of the group consisting of a (a) a ground fault circuit interrupting (GFCI) device; (b) an arc fault circuit interrupting (ACFI) device; (c) immersion detection circuit interrupting (IDCI) device; (d) appliance leakage circuit interrupting (ALCI) device; (e) circuit breaker; (f) contactor; (g) latching relay; and (h) solenoid mechanism.

57. A method of testing a circuit interrupting device comprising the steps of generating an actuation signal;

causing a plunger to move in response to said actuation signal, without causing a switch to open, when the switch is in the closed position, flow of electrical current through said circuit interrupting device is enabled;

detecting if said plunger has moved; and if said plunger has moved, determining whether said movement reflects at least a partial movement of the plunger in a test direction, from a pre-test configuration to a post-test configuration, without opening the switch.

58. The method of testing according to claim 57, wherein the plunger moves in a fault direction during operation of the circuit interrupting device, and wherein the step of causing the plunger to move in response to said actuation signal is performed by causing the plunger to move in a test direction.

59. The method of testing according to claim 58, wherein the test direction is in the same direction as the fault direction.

60. The method of testing according to claim 58, wherein the test direction is in a direction different from the fault direction.

61. The method of testing according to claim 58, wherein the test direction of the plunger is in a direction opposite to the fault direction.

62. The method of testing according to claim 57, wherein the plunger has a magnetic field associated therewith, wherein the step of detecting if said plunger has moved is performed by:

measuring at least partial movement of the plunger by detecting movement of the magnetic field associated with the plunger from the pre-test configuration to the post-test configuration.

63. The method of testing according to claim 57, wherein the circuit interrupting device includes a plunger having a magnetic field associated therewith, wherein the step of detecting if said plunger has moved is performed by:

measuring inductance of a solenoid coil after electrical actuation thereof.

64. The method of testing according to claim 57, wherein the circuit interrupting device includes a test switch associated with movement of the plunger, wherein the step of detecting if said plunger has moved is performed by:

mechanically actuating the test switch by movement of the plunger.

65. The method of testing according to claim 57, wherein the circuit interrupting device includes et least one circuit interrupting coil configured to move the plunger, Wherein the step of detecting if said plunger has moved is performed by:

Emitting a signal to the circuit interrupting coil one of (a) lasting for a duration of time less than that required to open the switch; and (b) having a voltage level less than that required to open the switch; and measuring a change in inductance between the inductance of the at least one circuit interrupting coil in the pre-test configuration and the inductance of the at least one circuit interrupting coil in the post-test configuration.

66. The method of testing according to claim 57, wherein the circuit interrupting device includes at least one circuit interrupting coil causing the movement of the plunger in response to said actuation signal and at least one piezoelectric element generating a test sensing signal indicating movement of the plunger upon sensing an acoustic signal generated by actuation and movement of the plunger without opening the circuit interrupting switch, wherein the step of detecting if said plunger has moved is performed by:

the at least one piezoelectric element sensing an acoustic signal generated by the actuation and movement of the plunger without opening the circuit interrupting switch.

67. The method of testing according to claim 57, wherein the circuit interrupting device includes at least one circuit interrupting coil causing the movement of the plunger and at least one test coil such that the plunger moves towards the at least one test coil upon electrical actuation of the test coil, the method comprising the step of causing the plunger to move through an orifice of the at least one test coil upon electrical actuation of the test coil.

68. The method of testing according to claim 67, wherein the plunger has a magnetic field associated therewith, wherein the step of detecting if said plunger has moved is performed by:

measuring at least partial movement of the plunger by detecting a change in inductance in the at least one test coil caused by the movement of the magnetic field associated with the plunger with respect to the at least one test coil from the pre-test configuration to the post-test configuration.

69. The method of testing according to claim 57, wherein a solenoid coil and plunger assembly of the circuit interrupting device forms a first magnetic pole and a second magnetic pole when the coil is energized, and wherein the polarity of the first magnetic pole and of the second magnetic pole varies depending upon phase of flow of electrical current through the solenoid coil when the coil is energized, and wherein the method further comprises the step of:

moving a movable support member configured to move with respect to the solenoid coil and plunger assembly depending upon the polarity of the first magnetic pole and of the second magnetic pole that varies depending upon the direction of phase of electrical current through the solenoid coil when the coil is energized.

70. The method of testing according to claim 69, wherein the movable support member further comprises a magnetic member disposed with respect to the solenoid coil wherein a magnetic force is generated between the magnetic member and one of the first and second magnetic poles formed when the coil is energized, and wherein the method further comprises the step of:

effecting movement of the movable support member with respect to the solenoid coil by generating a magnetic force between the magnetic member and one of the first and second magnetic poles formed when the coil is energized.

71. The method of testing according to claim 70, wherein the movable support member further comprises a plunger movement interference member, and wherein the method further comprises the step of:

moving the movable support member with respect to the solenoid coil in at least one direction to effect interference by the plunger movement interference member with the movement of the plunger.

72. The method of testing according to claim 70, wherein the movable support member further comprises a plunger movement is interference member, and wherein the method further comprises the step of:

moving the movable support member with respect to the solenoid coil in at least one direction to avoid interference by the plunger movement interference member with movement of the plunger.

73. The method of testing according to claim 57, wherein the step of detecting if said plunger has moved is performed by:

measuring at least partial movement of the plunger by sensing a magnetic field generated by a circuit interrupting coil of the circuit interrupting device.

74. The method of testing according to claim 73, wherein the step of sensing a magnetic field generated by a circuit interrupting coil of the circuit interrupting device is performed by one of (a) a magnetic reed switch and (b) a Hall-effect sensor sensing the magnetic field generated by the circuit interrupting coil.

75. A method of testing a circuit interrupting device comprising:

generating an actuation signal;

causing a plunger to move in response to said actuation signal via a solenoid coil and plunger assembly disposed to open a switch, the actuation signal not causing the switch to open, wherein when the switch is in the closed position, flow of electrical current through said circuit interrupting device is enabled; and generating a test sensing signal indicating actuation of the coil upon sensing a magnetic field generated by the coil.

76. The method of testing according to claim 75, wherein the step of sensing a magnetic field generated by the coil is performed by one of (a) a magnetic reed switch and (b) a Hall-effect sensor sensing the magnetic field generated by the coil.

77. A test assembly for a circuit interrupting device, the circuit interrupting device comprising:

a first conductor;

a second conductor a switch between the first conductor and the second conductor;

the switch is disposed to selectively connect and disconnect the first conductor and the second conductor;

a circuit interrupter disposed to generate a circuit interrupting actuation signal; and a solenoid coil and plunger assembly disposed to open the switch, wherein the solenoid coil and plunger assembly is actuatable by the circuit interrupting actuation signal wherein movement of the plunger causes the switch to open;

the test assembly comprising at least one of (a) an electrical circuit and (b) support member, the test assembly configured and disposed to enable a test of the circuit interrupter, to initiate at least a partial movement of the plunger in a test direction, from a pre-test configuration to a post-test configuration, without opening the switch.

78. The test assembly according to claim 77, wherein the test assembly comprises an electrical circuit wherein the electrical circuit is an electrical test circuit.

* * * * *